(12) United States Patent
Abledu

(10) Patent No.: US 8,167,235 B2
(45) Date of Patent: May 1, 2012

(54) WHIRLING WHEEL AIRBORNE VEHICLES

(76) Inventor: Kodzo Obed Abledu, Pasadena, CA (US)

( * ) Notice: Subject to any disclaimer, the term of this patent is extended or adjusted under 35 U.S.C. 154(b) by 487 days.

(21) Appl. No.: 12/416,794

(22) Filed: Apr. 1, 2009

(65) Prior Publication Data
US 2009/0250557 A1    Oct. 8, 2009

Related U.S. Application Data

(60) Provisional application No. 61/072,694, filed on Apr. 2, 2008.

(51) Int. Cl.
*B64C 15/00* (2006.01)
(52) U.S. Cl. .................... 244/23 A; 244/53 R
(58) Field of Classification Search ............ 244/23 A, 244/53 R, 58; 416/121, 123, 130; 60/412; 92/72
See application file for complete search history.

(56) References Cited

U.S. PATENT DOCUMENTS

| | | | | |
|---|---|---|---|---|
| 2,420,796 A * | 5/1947 | Raschke | ............ | 244/17.13 |
| 3,273,654 A * | 9/1966 | Pinnes | ............ | 416/142 |
| 3,700,189 A * | 10/1972 | Timperman | ............ | 244/12.4 |
| 4,606,697 A * | 8/1986 | Appel | ............ | 415/4.4 |
| 5,440,176 A * | 8/1995 | Haining | ............ | 290/54 |

* cited by examiner

*Primary Examiner* — Joshua J Michener
*Assistant Examiner* — Brian M O'Hara
(74) *Attorney, Agent, or Firm* — John K. Park; Park Law Firm

(57) ABSTRACT

A sliding-arm whirling wheel thruster includes first and second whirling wheels and a housing. The first whirling wheel is disposed about a first rotational axis, and the second whirling wheel about a second rotational axis parallel to the first rotational axis. The housing comprises an arc over an enclosed space into which the first and second whirling wheels fit. The air blown outward by each of the whirling wheels is amassed inside the housing so as to make a pressure difference between inside and outside of the housing. The relative position of the first rotational axis to the second rotational axis is configured to be controlled. The airborne vehicle is lifted by buoyant force caused by the pressure difference.

21 Claims, 48 Drawing Sheets

WHIRLING WHEEL AIRBORNE VEHICLES

RELATED APPLICATION

This application is a corresponding non-provisional application of U.S. Provisional Patent Application Ser. No. 61/072,694 for "Whirling Wheel Airborne Vehicles" filed on Apr. 2, 2008.

BACKGROUND OF THE INVENTION

The present invention relates to whirling wheel airborne vehicles. More particularly, this invention relates to whirling wheel airborne vehicles using whirling wheel arrangements for thrust production.

SUMMARY OF THE INVENTION

An objective of the invention is to provide whirling wheel airborne vehicles.

Another object of the invention is to provide whirling wheel airborne vehicles using whirling wheel arrangements for thrust production.

An aspect of the invention provides a sliding-arm whirling wheel thruster.

The thruster comprises first and second whirling wheels and a housing.

The first whirling wheel is disposed about a first rotational axis, and the second whirling wheel is disposed about a second rotational axis. The second rotational axis is parallel to the first rotational axis.

The housing comprises an arc over an enclosed space into which the first and second whirling wheels fit.

The air is blown outward by each of the whirling wheels is amassed inside the housing so as to make a pressure difference between inside and outside of the housing.

The relative position of the first rotational axis to the second rotational axis is configured to be controlled. The airborne vehicle is lifted by buoyant force caused by the pressure difference.

Each of the first and second whirling wheels may comprise: a hub disposed along a corresponding rotational axis; a plurality of fan-like radial spokes, each of which extending from the hub; a flat rim portion provided around the plurality of fan-like radial spokes; and a plurality of vanes disposed on both sides of the flat rim portion and configured to push air radially outward.

Each of the fan-like radial spokes may comprise a tilted surface to push air in a predetermined direction.

Each of the plurality of vanes may comprise one or more radially tilted surface. Each of the plurality of vanes may comprise a triangular projection disposed on the flat rim portion.

Alternatively, each of the plurality of vanes may comprise a straight plate, a curved plate, and a fat triangular projection disposed on the flat rim portion.

The housing may comprise: a back plate; a cover, enclosing an enclosed space at a top portion and side portions along with the back plate at a rear portion, into which the first and second whirling wheels are fit; a front bar disposed in parallel to the back plate and installed at two arms extending from the cover; a first motor mounted on the front bar and configured to provide power to the first whirling wheel; a second motor mounted on the back plate and configured to provide power to the second whirling wheel; and a first repositioning slider disposed onto the front bar and configured to allow the first whirling wheel repositioned along a horizontal direction.

The cover may comprise a top arc-shaped portion and two side flat portions.

The sliding-arm whirling wheel thruster may further comprise: a second repositioning slider disposed onto the rear bar and configured to allow the second whirling wheel repositioned along a horizontal direction; and a repositioning slot disposed on the back plate and configured to allow the second whirling wheel repositioned against the first whirling wheel. The repositioning slot may comprise a vertical slot and horizontal slot arranged so as to form a cross-shape.

The sliding-arm whirling wheel thruster may further comprise: a first actuator disposed on the front bar and configured to actuate sliding motion of the first whirling wheel and the first motor along the first repositioning slider; and a second actuator disposed on the back plate and configured to actuate sliding motion of the second whirling wheel and the second motor along the repositioning slot.

The first and second rotational axes of the first and second whirling wheels may be displaced vertically and horizontally with the second whirling wheel lower than the first whirling wheel so as to create the enclosed space that is enclosed by a top of the second whirling wheel, the second whirling wheel, the cover, and the first whirling wheel.

As the whirling wheels rotate, the plurality of fan-like spokes of the whirling wheels may pull in air and compress against the second whirling wheel and the plurality of vanes deflect the air outwards so as to create a volume of compressed air under the cover, and the compressed air escapes from the volume along an inner wall of the housing, substantially from beneath an inner surface of the cover.

The one or more tilted surfaces of the vanes may be curved such that the deflected air increases pressure against the cover.

The buoyant force may be controlled by controlling the pressure difference through control parameters including angular speed of the whirling wheels, relative positions of the first and second rotational axes, and horizontal tilting the sliding-arm whirling wheel thruster. A net vertical force may be obtained by aligning the first and second whirling wheels vertically without horizontal displacement between the first and second rotational axes.

A horizontal force to a right side may be obtained by sliding the first whirling wheel to the right and sliding the second whirling wheel to the left.

A horizontal force to a left side may be obtained by sliding the first whirling wheel to the left and sliding the second whirling wheel to the right.

A horizontal force to a right side may be obtained by aligning the first whirling wheel and the second whirling wheel vertically without a horizontal displacement of the first and second rotational axes against the housing and tilting the whole sliding-arm whirling wheel thruster to the right.

A horizontal force to a left side may be obtained by aligning the first whirling wheel and the second whirling wheel vertically without a horizontal displacement of the first and second rotational axes against the housing and tilting the whole sliding-arm whirling wheel thruster to the left.

The sliding-arm whirling wheel thruster may further comprise: a mounting plate on which the back plate is mounted so as to allow the back plate to tilt sideways; and a vertical beam to which the mounting plate anchors so as to provide a given vertical direction against which the back plate tilts.

In certain embodiments of the invention, the housing may comprise: a back plate; a cover, enclosing an enclosed space at a top portion and side portions along with the back plate at a rear portion, into which the first and second whirling wheels are fit; and a steering vane disposed in a lower portion of the enclosed space below the first and second whirling wheels perpendicularly to the first and second rotational axes and configured to be tilted so as to produce an outward or inward component of force as the downward air blow from the whirling wheels impinges on a surface of the steering vane.

Another aspect of the invention provides a whirling wheel airborne vehicle comprising: a fuselage; and a plurality of the above sliding-arm whirling wheel thrusters, disposed on the fuselage. Each of the plurality of the sliding-arm whirling wheel thrusters is configured to reposition the first and second whirling wheels and to be tilted sideways to obtain controlled buoyant force for flying the whirling wheel airborne vehicle.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
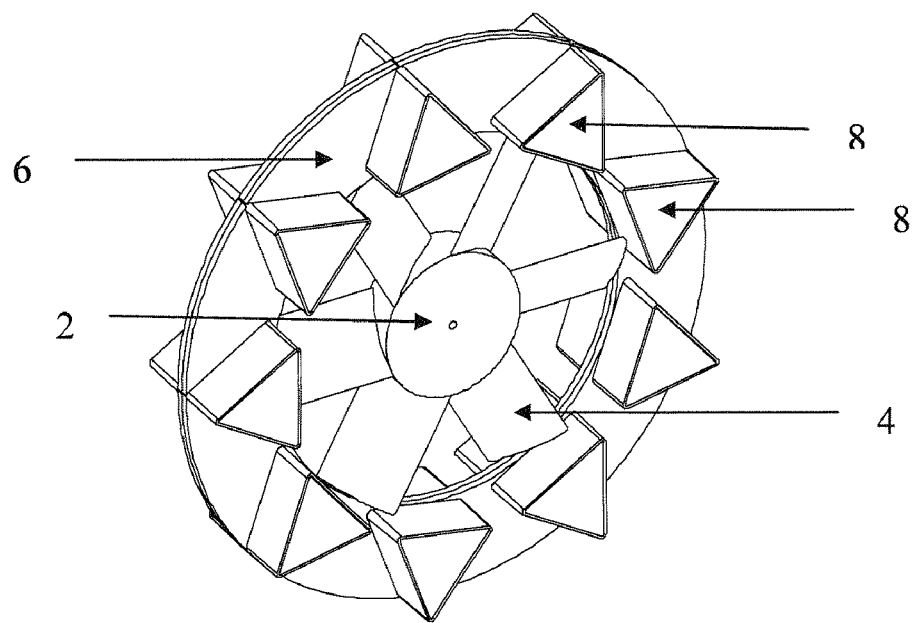
FIG. 1 is a perspective view of a whirling wheel according to an embodiment of the present invention.

An aspect of the invention provides a sliding-arm whirling wheel thruster. FIGS. 1-22 show the sliding-arm whirling wheel thrusters.

The thruster comprises first and second whirling wheels 100, 120 and a housing 130.

The first whirling wheel 100 is disposed about a first rotational axis, and the second whirling wheel 120 is disposed about a second rotational axis. The second rotational axis is parallel to the first rotational axis.

The housing 130 comprises an arc 24 over an enclosed space into which the first and second whirling wheels 100, 120 fit.

The air is blown outward by each of the whirling wheels 100, 120 is amassed inside the housing 130 so as to make a pressure difference between inside and outside of the housing 130.

The relative position of the first rotational axis to the second rotational axis is configured to be controlled. The airborne vehicle is lifted by buoyant force caused by the pressure difference.

Each of the first and second whirling wheels 100, 120 may comprise: a hub 2 disposed along a corresponding rotational axis; a plurality of fan-like radial spokes 4, each of which extending from the hub 2; a flat rim portion 6 provided around the plurality of fan-like radial spokes 4; and a plurality of vanes 8 disposed on both sides of the flat rim portion 6 and configured to push air radially outward.

Each of the fan-like radial spokes 4 may comprise a tilted surface to push air in a predetermined direction.

Each of the plurality of vanes 8 may comprise one or more radially tilted surface. Each of the plurality of vanes 8 may comprise a triangular projection disposed on the flat rim portion 6.

Alternatively, each of the plurality of vanes 8 may comprise a straight plate, a curved plate, and a fat triangular projection disposed on the flat rim portion 6 as shown in FIGS. 1, 9, 10, and 11.

The housing 130 may comprise: a back plate 22; an arc or cover 24, enclosing an enclosed space at a top portion and side portions along with the back plate 22 at a rear portion, into which the first and second whirling wheels 100, 120 are fit; a front bar 10 disposed in parallel to the back plate 22 and installed at two arms 26, 26' extending from the cover 24; a first motor 18 mounted on the front bar 10 and configured to provide power to the first whirling wheel; 100 a second motor 18' mounted on the back plate 22 and configured to provide power to the second whirling wheel 120; and a first repositioning slider 14 disposed onto the front bar 10 and configured to allow the first whirling wheel 100 repositioned along a horizontal direction.

The cover 24 may comprise a top arc-shaped portion and two side flat portions.

Figure 2:
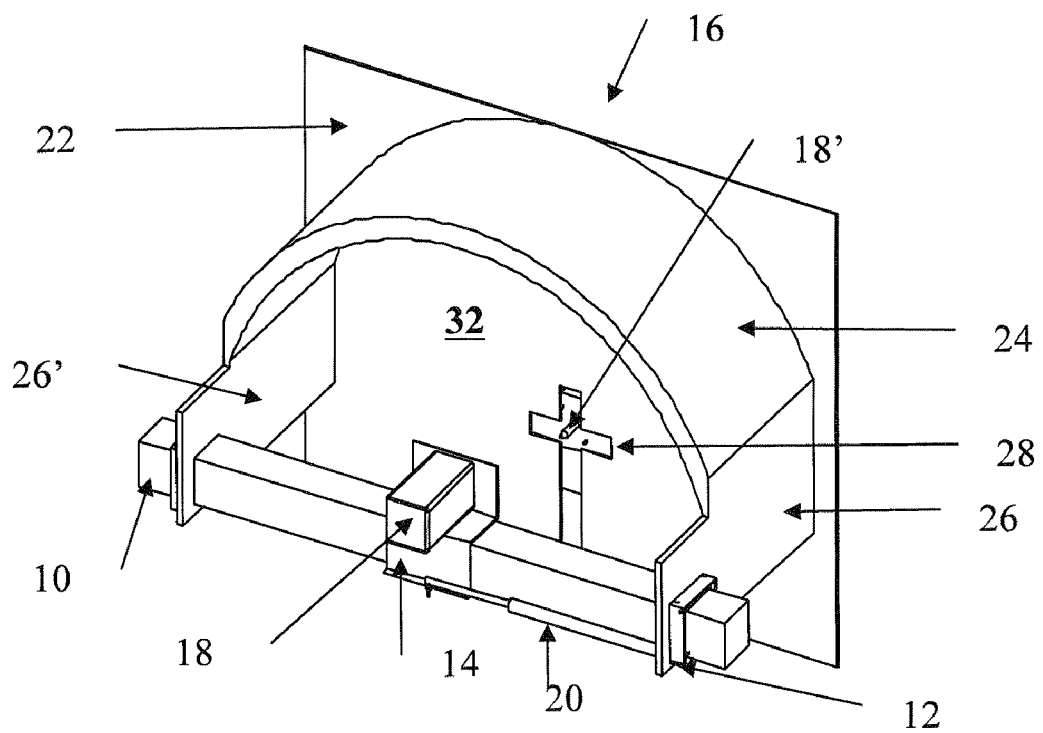
FIG. 2 is an isometric view of the front of a housing of a whirling wheel.
Figure 3:
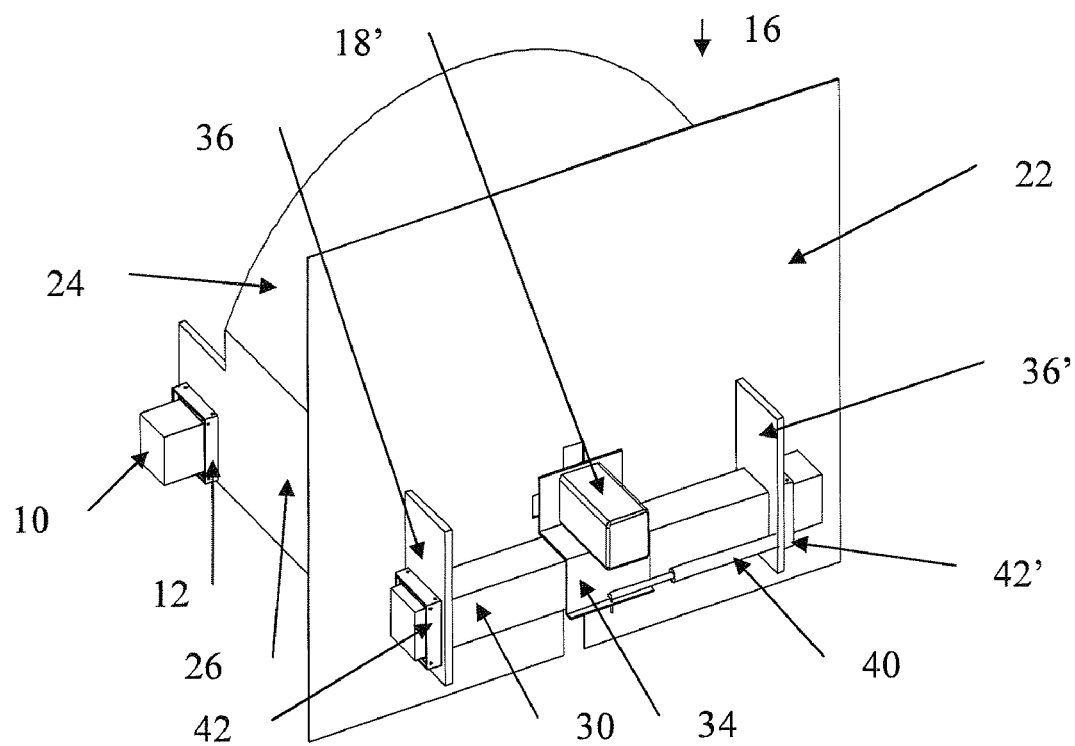
FIG. 3 is a rear view of FIG. 2.

Referring to FIG. 3, the sliding-arm whirling wheel thruster may further comprise: a second repositioning slider 34 disposed onto the rear bar 30 and configured to allow the second whirling wheel 120 repositioned along a horizontal direction; and a repositioning slot 28 disposed on the back plate 22 and configured to allow the second whirling wheel 120 repositioned against the first whirling wheel 100. The repositioning slot 28 may comprise a vertical slot and horizontal slot arranged so as to form a cross-shape as shown in FIG. 2.

The sliding-arm whirling wheel thruster may further comprise: a first actuator 20 disposed on the front bar 10 and configured to actuate sliding motion of the first whirling wheel 100 and the first motor 18 along the first repositioning slider 14; and a second actuator 40 disposed on the back plate 22 and configured to actuate sliding motion of the second whirling wheel 120 and the second motor 18' along the repositioning slot 28.

The first and second rotational axes of the first and second whirling wheels 100, 120 may be displaced vertically and horizontally with the second whirling wheel 120 lower than the first whirling wheel 100 so as to create the enclosed space that is enclosed by a top of the second whirling wheel 120, the second whirling wheel 120, the cover 24, and the first whirling wheel 100.

As the whirling wheels 100, 120 rotate, the plurality of fan-like spokes 4 of the whirling wheels 100, 120 may pull in air and compress against the second whirling wheel 120 and the plurality of vanes 8 deflect the air outwards so as to create a volume of compressed air under the cover 24, and the compressed air escapes from the volume along an inner wall of the housing 130, substantially from beneath an inner surface of the cover 24.

The one or more tilted surfaces of the vanes 8 may be curved such that the deflected air increases pressure against the cover 24.

The buoyant force may be controlled by controlling the pressure difference through control parameters including angular speed of the whirling wheels 100, 120, relative positions of the first and second rotational axes, and horizontal tilting the sliding-arm whirling wheel thruster. A net vertical force may be obtained by aligning the first and second whirling wheels 100, 120 vertically without horizontal displacement between the first and second rotational axes.

A horizontal force to a right side may be obtained by sliding the first whirling wheel 100 to the right and sliding the second whirling wheel 120 to the left.

A horizontal force to a left side may be obtained by sliding the first whirling wheel 100 to the left and sliding the second whirling wheel 120 to the right.

A horizontal force to a right side may be obtained by aligning the first whirling wheel 100 and the second whirling wheel 120 vertically without a horizontal displacement of the first and second rotational axes against the housing 130 and tilting the whole sliding-arm whirling wheel thruster to the right.

A horizontal force to a left side may be obtained by aligning the first whirling wheel 100 and the second whirling wheel 120 vertically without a horizontal displacement of the first and second rotational axes against the housing 130 and tilting the whole sliding-arm whirling wheel thruster to the left.

Figure 19A:
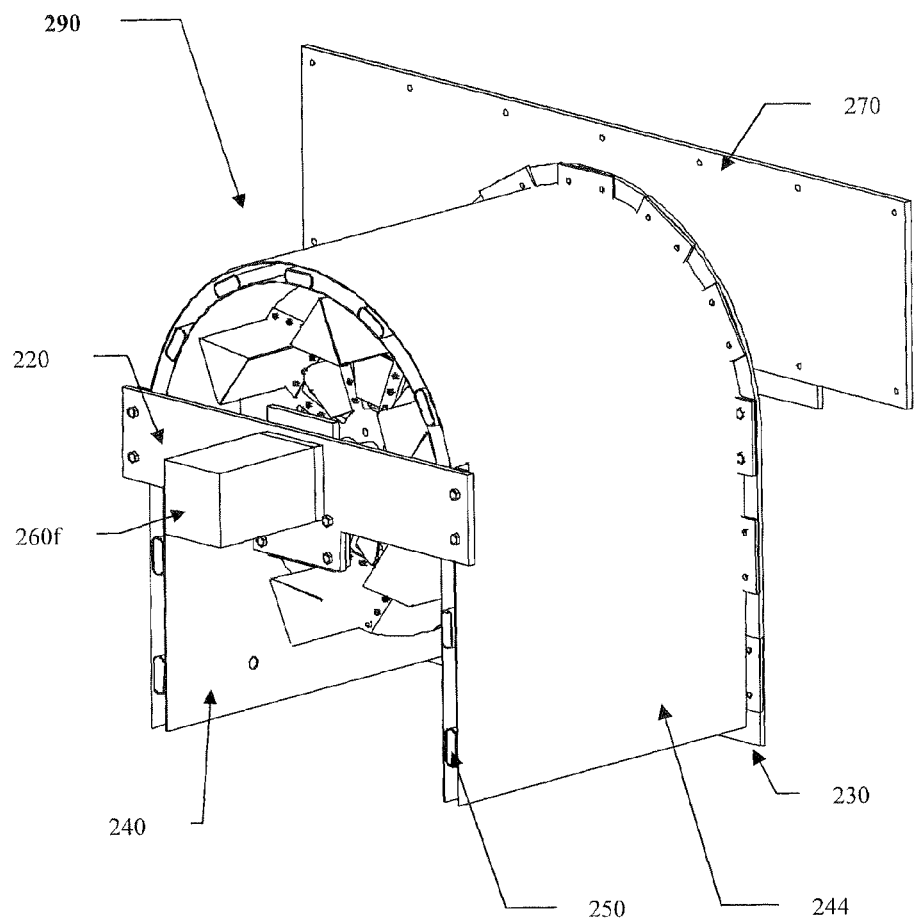
FIG. 19a is a perspective view showing whirling wheel arrangement with outer housing.
Figure 19B:
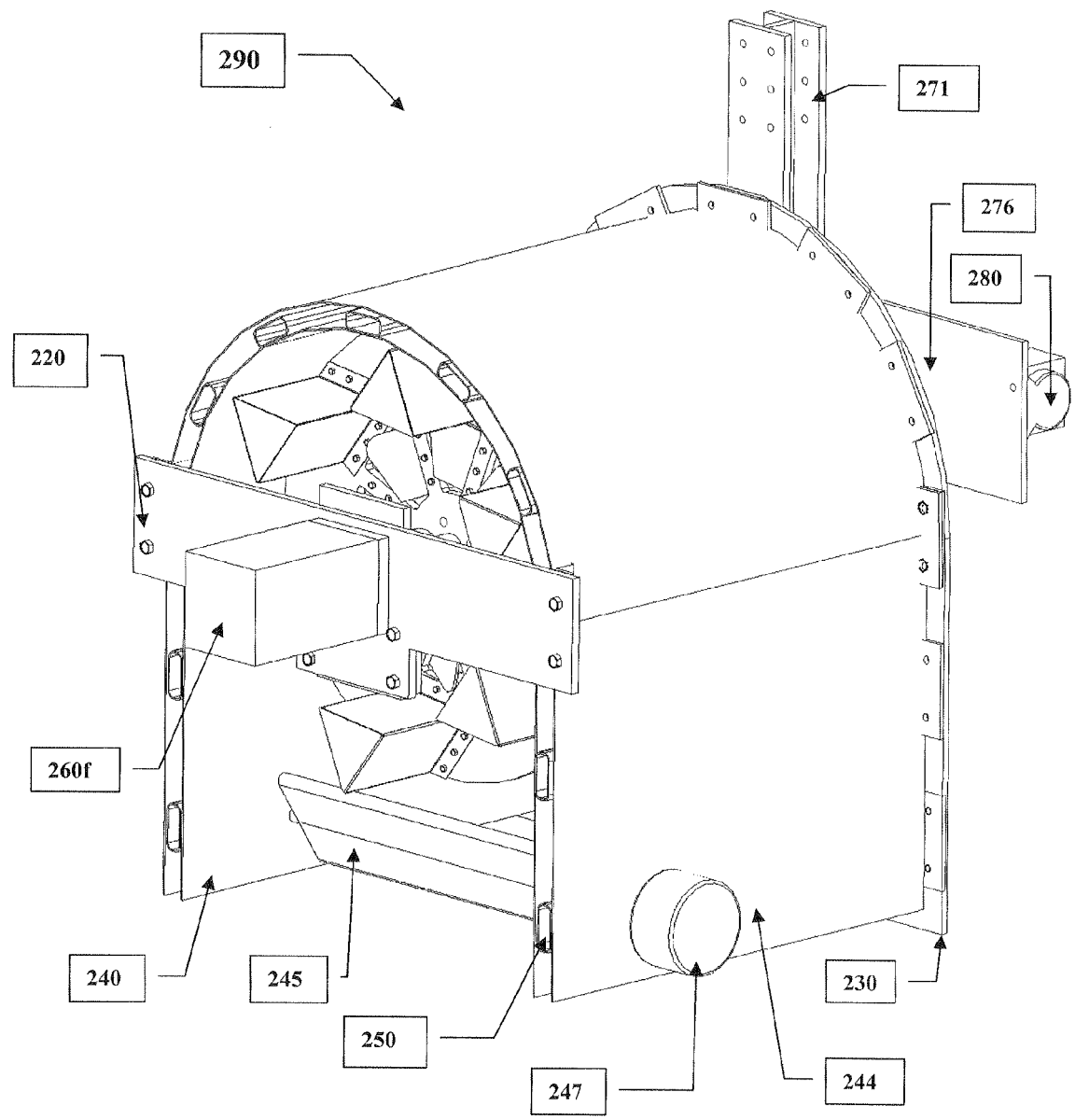
FIG. 19b is a perspective view showing whirling wheel arrangement with outer housing, a steering vane tilted outwards, and an I-beam mounting bar.
Figure 20A:
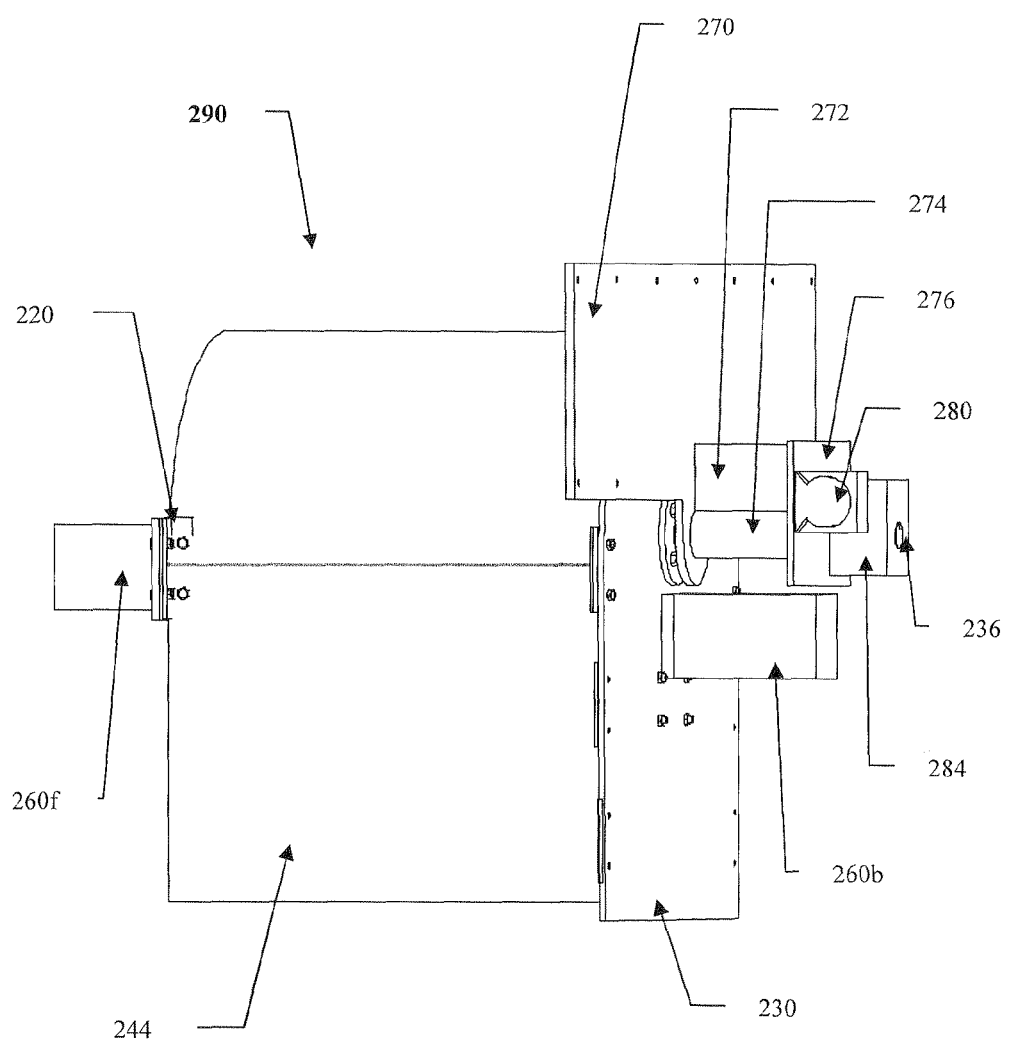
FIG. 20a is a perspective view showing a back of the whirling wheel arrangement showing the mechanism that tilts the outer housing.
Figure 20A:
Figure 20B:
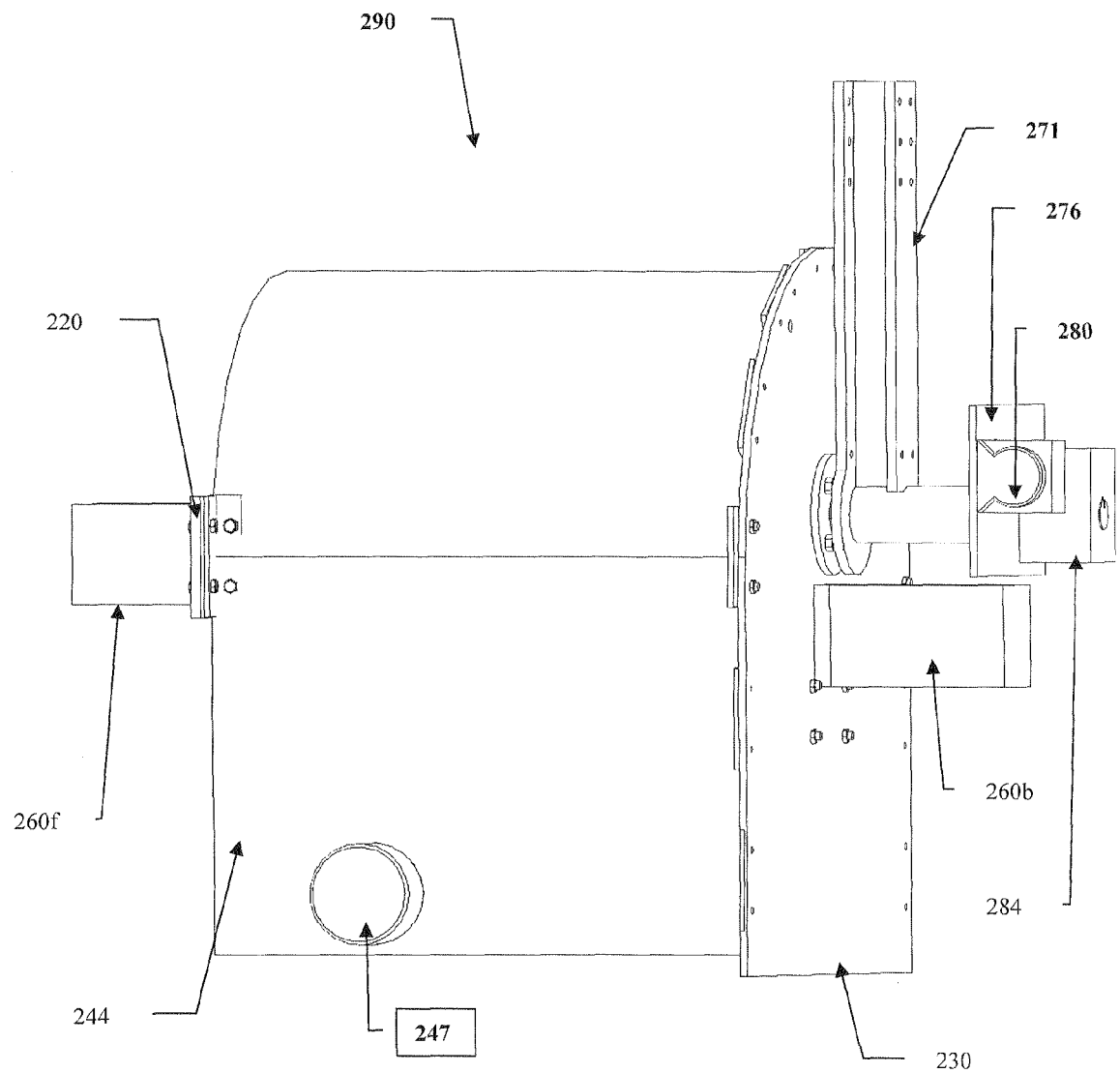
FIG. 20b is a perspective view showing a back of the whirling wheel arrangement showing the mechanism that tilts the outer housing.

The sliding-arm whirling wheel thruster may further comprise: a mounting plate 270 on which the back plate 230 is mounted so as to allow the back plate 230 to tilt sideways; and a vertical beam 271 to which the mounting plate 270 anchors so as to provide a given vertical direction against which the back plate 230 tilts as shown in FIGS. 19a, 19b, and 20b.

Figure 19C:
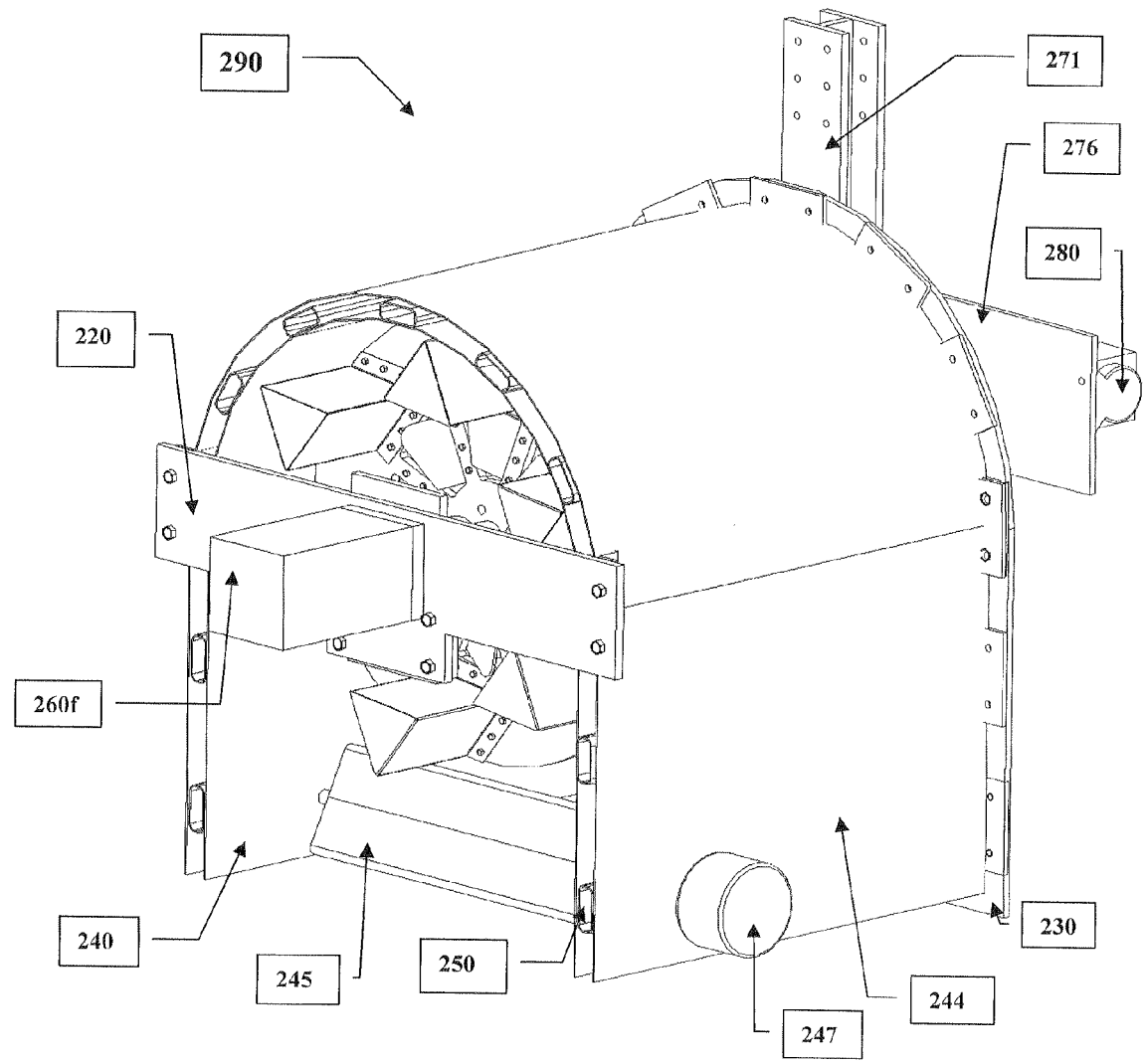
FIG. 19c is a perspective view showing whirling wheel arrangement with outer housing, a steering vane tilted inwards, and an I-beam mounting bar.

In certain embodiments of the invention as shown in FIG. 19c, the housing may comprise: a back plate; a cover, enclosing an enclosed space at a top portion and side portions along with the back plate at a rear portion, into which the first and second whirling wheels are fit; and a steering vane 245 disposed in a lower portion of the enclosed space below the first and second whirling wheels perpendicularly to the first and second rotational axes and configured to be tilted so as to produce an outward or inward component of force as the downward air blown from the whirling wheels impinges on a surface of the steering vane 245.

Another aspect of the invention provides a whirling wheel airborne vehicle comprising: a fuselage; and a plurality of the above sliding-arm whirling wheel thrusters, disposed on the fuselage. Each of the plurality of the sliding-arm whirling wheel thrusters is configured to reposition the first and second whirling wheels and to be tilted sideways to obtain controlled buoyant force for flying the whirling wheel airborne vehicle.

This invention deals with vertical-takeoff-and-landing (VTOL) vehicles for transportation.

Part A: Sliding-Arm Whirling Wheel Thrusters

Figure 10:
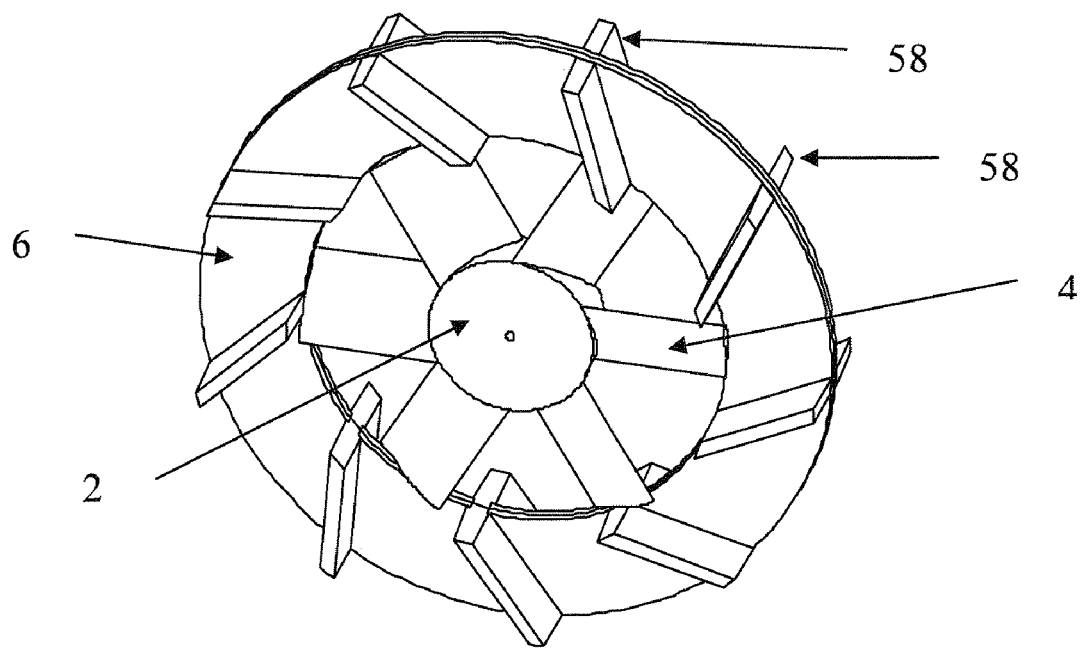
FIG. 10 is a perspective view of a whirling wheel with slanted vanes according to still another embodiment of the invention.
Figure 11:
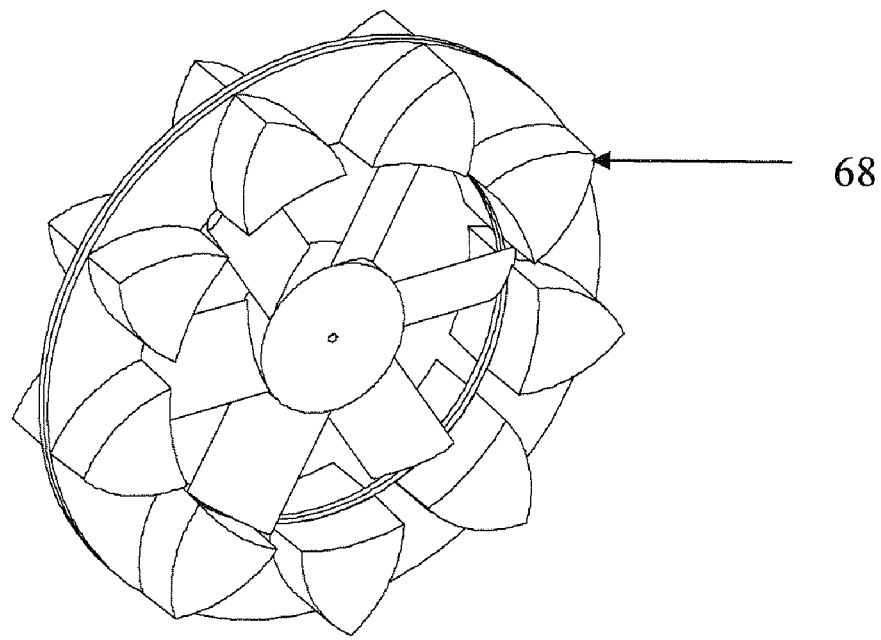
FIG. 11 is a perspective view of a whirling wheel with contoured triangular vanes according to another embodiment of the invention.

This portion deals with whirling wheel arrangements for thrust production. The whirling wheel arrangement is for continuously compressing air into a confined space under an arced surface in order to produce thrust under the surface. FIG. 1 shows one form of the wheel utilized in this arrangement. Other possible forms of the wheel are also shown in FIGS. 9-12. Each wheel has a hub 2, fan-like radial spokes 4, a flat rim 6, and various shaped vanes on both sides of the flat rim. In FIG. 1, the vanes 8 are triangular in shape. In alternate designs shown in FIG. 9, the vanes 48 are straight radial projections. In FIG. 10, the vanes 58 are slanted projections on the rim. In FIG. 11, the vanes 68 are contoured triangular projections with curved profiles and in FIG. 12, the vanes 78 are curved projections from the flat surface of the rim.

FIG. 2 shows the housing of the wheels. The housing consists of a square tube 10 which has a motor 18 mounted on it by means of mounting plate 14. The square tube 10 slides within roller housings 12 mounted on the two arms 26 and 26' of the wheel housing 16. An actuator arm 20 is attached to the motor mount plate 14 and is used to actuate the sliding motion of the square tube 10 through the roller housing 12. The shaft of another motor 18' mounted on the back of the housing 16 comes through a slot 28 in the back plate 22 of the housing. The wheel housing has an arc 24 over an enclosed space 32 into which a multiplicity of wheels would fit.

FIG. 3 shows the back of the housing with another motor 18' mounted on another square tube 30 by means of a mounting plate 34. The tube 30 slides through roller housings 42 and 42' affixed onto projections 36 and 36' at the back of the housing. A linear actuator 40 attached to the motor mounting plate 34 is used to slide the square tube 30 and motor 18' located at the back of the housing 16.

Figure 4:
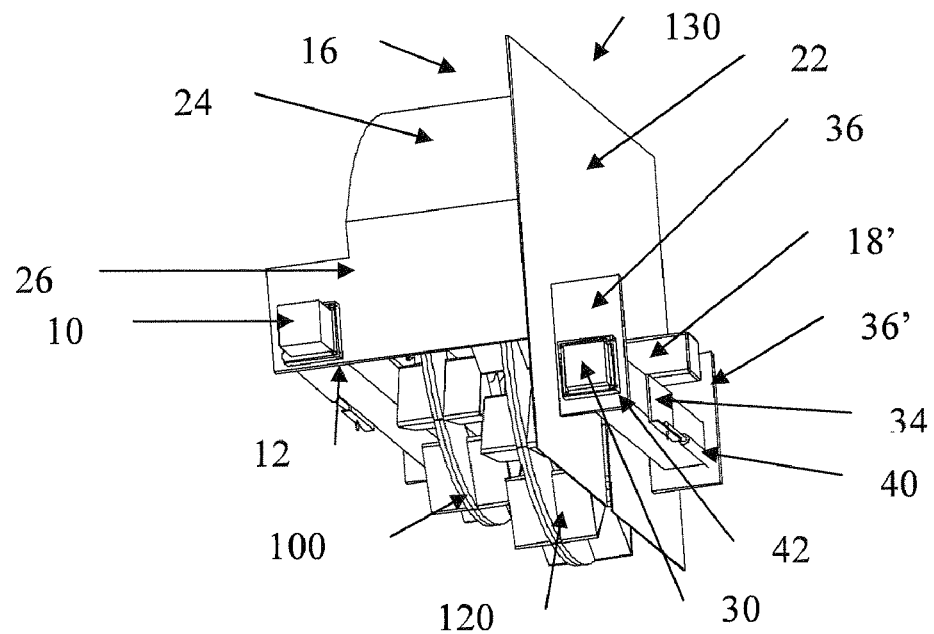
FIG. 4 is a perspective view of two whirling wheels installed in the housing of a whirling wheel.

FIG. 4 illustrates the arrangement of two whirling wheels 100 and 120 inside the housing 16. The front wheel 100 is driven by the front motor 18 (shown in FIG. 2) and the back wheel 120 is driven by the back motor 18'. The axes of the two wheels are displaced vertically with the back wheel 120 lower than the front wheel 100. This arrangement creates a space located between the top of the back wheel 120, the back plate 22, the arc 24, and the front wheel 100.

Figure 5:
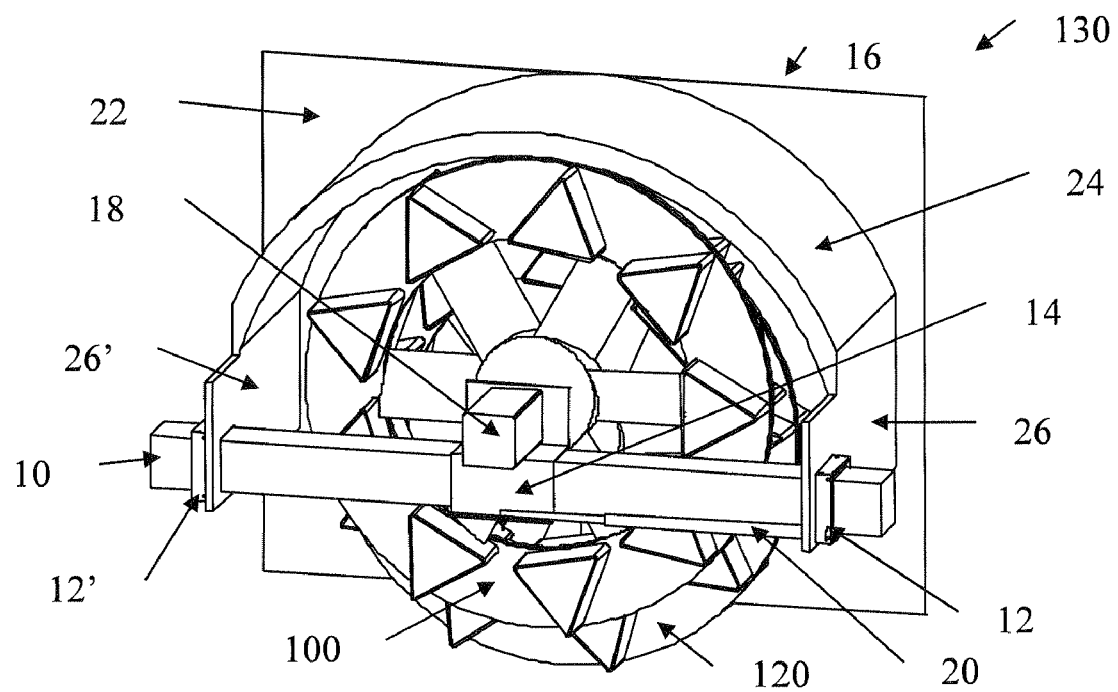
FIG. 5 is a perspective front view of whirling wheels mounted in the housing.

FIG. 5 shows a frontal view of the whirling wheel arrangement 130.

As the wheels 100 and 120 turn, the fan-like spokes 4 (shown FIG. 1) of both wheels pull in air and compress it against the back panel 22. At the same time the vanes 8 on the rims deflect air outwards. This creates a volume of compressed air under the arc 24. Compressed air escapes from this volume all along the inner walls of the housing. Most of this compressed air comes out from beneath the inside surface of the arc 24. Some compressed air also comes vertically downwards along the back plate 22. The deflection of air by the vanes 8 increases the pressure exerted against the arc 24.

The pressure difference between the underside of the arc 24 and the outer surface creates a net force on the body of the whirling wheel arrangement 130.

Figure 6:
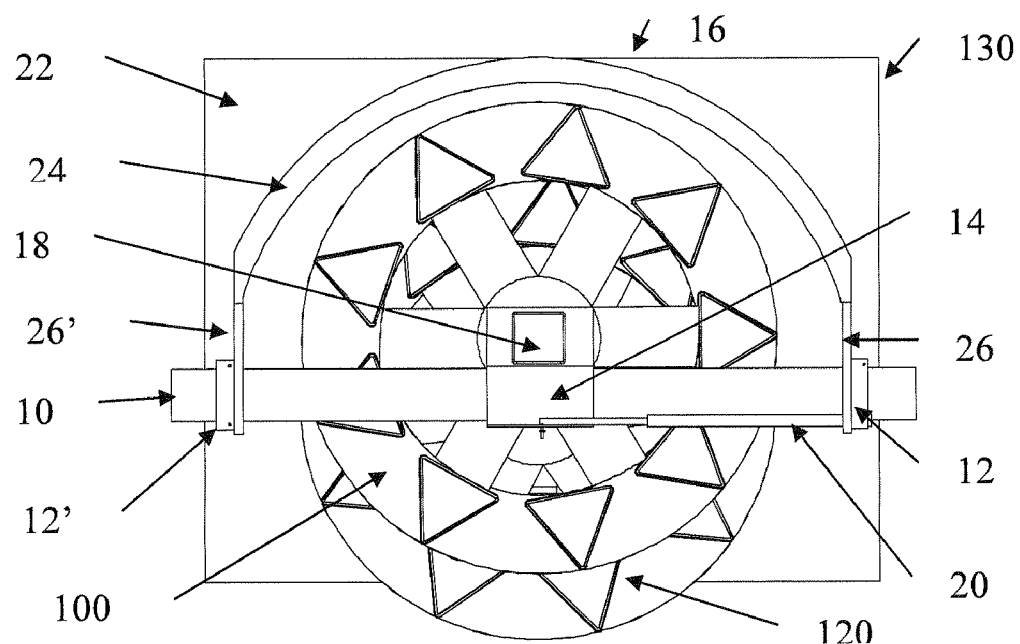
FIG. 6 is a perspective front view of whirling wheels aligned to produce upward force on housing.

FIG. 6 shows an alignment of the two wheels 100 and 120 of the wheel and housing assembly 130 to produce a net vertical force as the wheels turn. In this arrangement, the two wheels 100 and 120 are aligned vertically without any horizontal displacement between the axes of the wheels.

Figure 7:
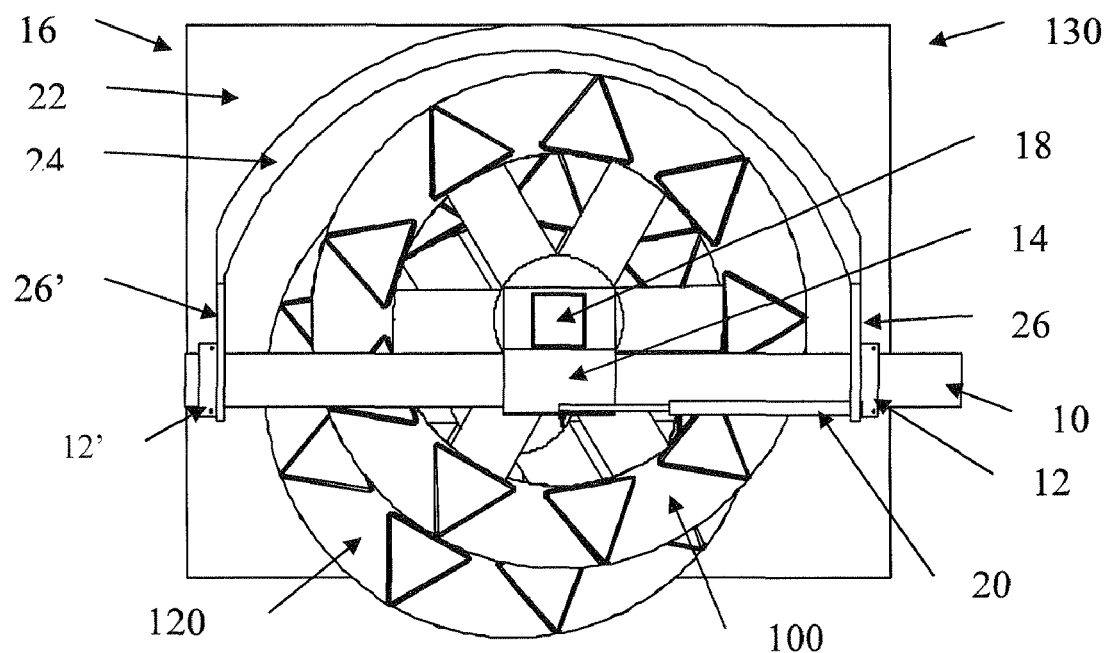
FIG. 7 is a perspective front view of whirling wheels displaced to produce both upward force and lateral force to the right on the housing.

FIG. 7 shows an alignment of the two wheels that would produce both a vertical force and force directed to the right. In this arrangement, the front wheel 100 is slid towards the right and the back wheel towards the left. This results in the vanes 8 (shown in FIG. 1) of the front wheel compressing the escaping air against the right side of the arc 24 more than the left side due to their proximity to the right inside surface of arc. The same effect would be obtained if the back wheel 120 was fixed and only the front wheel slid to the right. The sliding of the rotating front and back wheels is accomplished by the actuator arms 20 and 40 moving their respective wheels.

Figure 8:
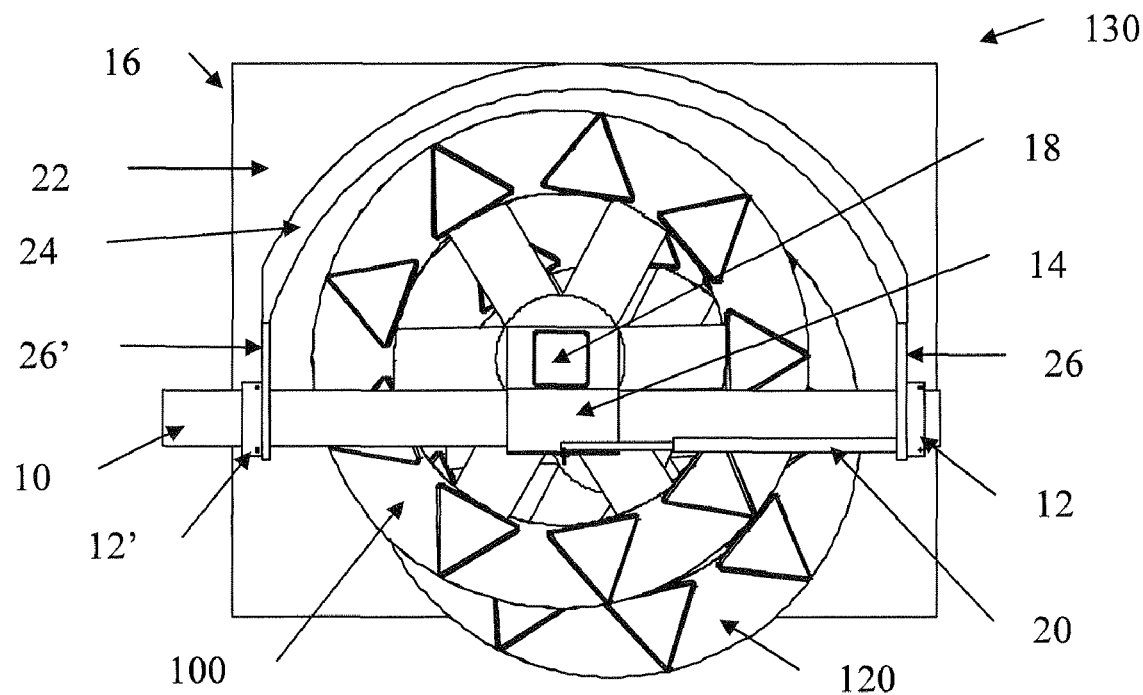
FIG. 8 is a perspective front view of whirling wheels displaced to produce both upward force and lateral force to the left on the housing.

FIG. 8 shows an alignment that would produce both a vertical force and a force directed to the left. In this arrangement, the front wheel 100 is slid towards the left side of the inner surface of the arc 24 while the back wheel 120 is slid to the right. The same effect would be obtained if the back wheel was fixed and only the front wheel slid left.

Figure 9:
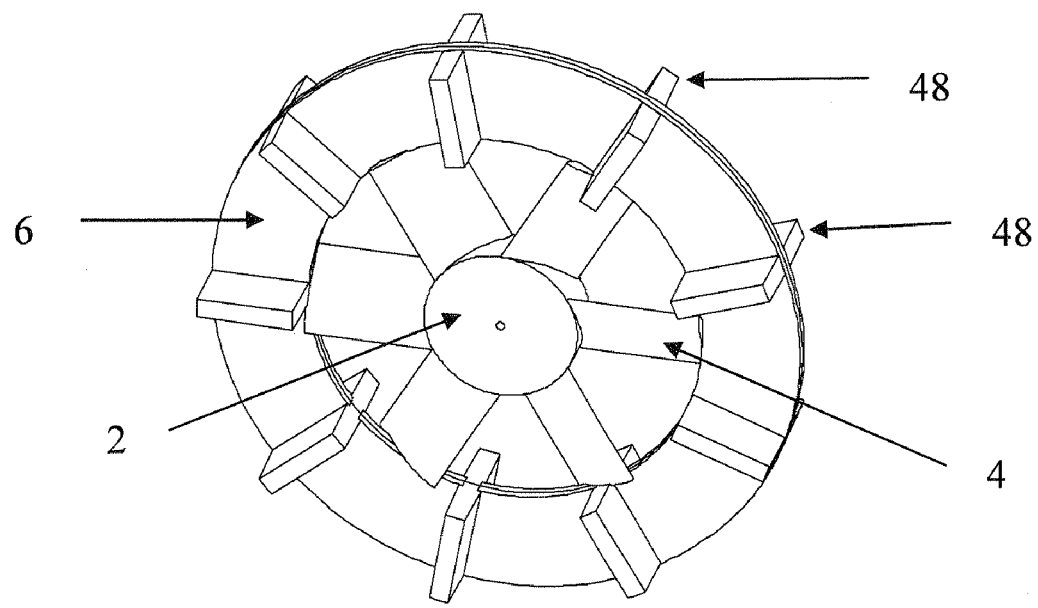
FIG. 9 is a perspective view of a whirling wheel with radial vanes according to another embodiment of the invention.

FIG. 9 shows an alternate design of a whirling wheel. In this design, the outward deflection of air is accomplished by straight vanes 48 that protrude from the flat surface of the rim.

FIG. 10 shows an alternate design of a whirling wheel. In this design, the outward deflection of air is accomplished by slanted vanes 58 that protrude from the flat surface of the rim.

FIG. 11 shows an alternate design of a whirling wheel. In this design, the outward deflection of air is accomplished by contoured triangular vanes 68 that protrude from the flat surface of the rim.

Figure 12:
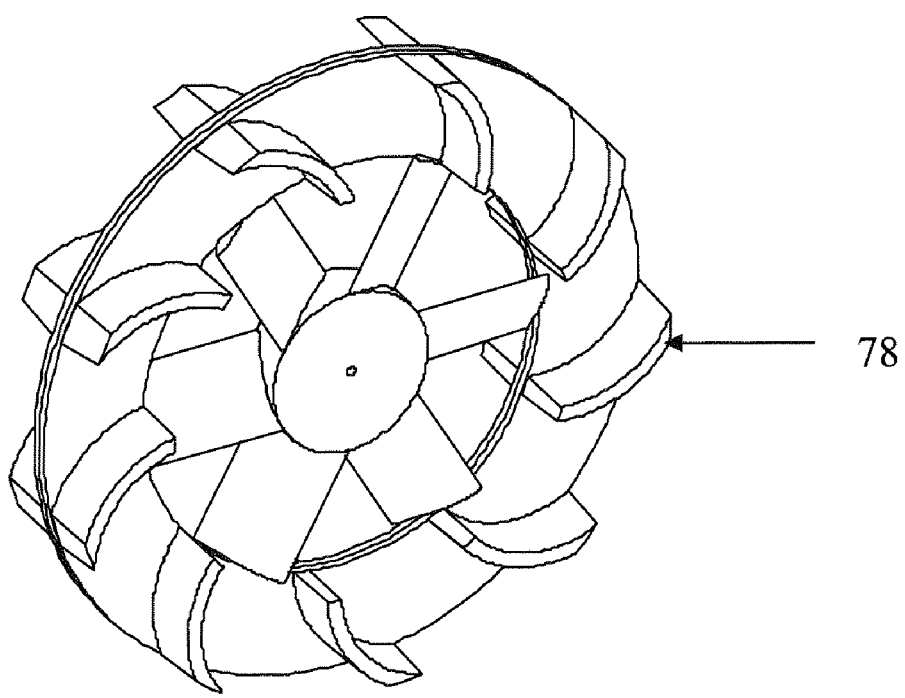
FIG. 12 is a perspective view of a whirling wheel with curved vanes according to still another embodiment of the invention.

FIG. 12 shows an alternate design of a whirling wheel. In this design, the outward deflection of air is accomplished by vanes with curved profiles 78 that protrude from the flat surface of the rim.

Part B: Tilting-Body Whirling Wheel Thrusters

Figure 13:
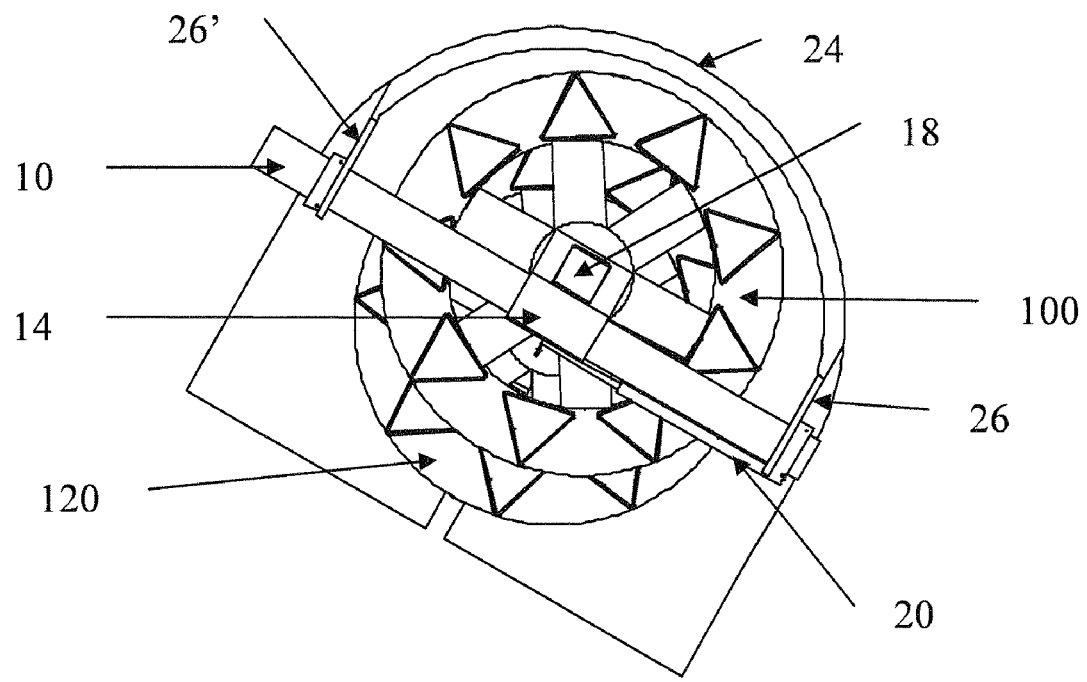
FIG. 13 is a perspective view showing right tilt of whirling wheel housing resulting in thrusts upwards and to the right.

FIG. 13 shows an alternate way of achieving a force directed upward and toward the right. In this arrangement, the housing of the whirling wheel is rotated about an axis parallel to the axis of the back wheel 120 with the arc side of the housing pointing right. The wheels 100 and 120 do not need to slide. Therefore, the actuator arms 20 and 40 and roller housings 12, 42 and 42' could be eliminated in this arrangement.

Figure 14:
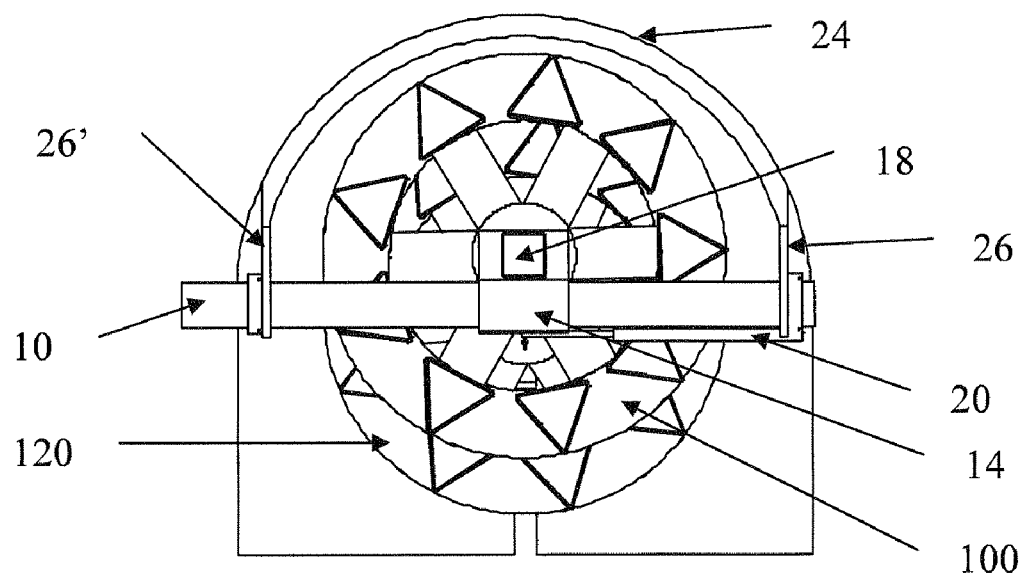
FIG. 14 is a perspective view showing upright positioning of whirling wheel housing resulting in vertical thrust.

FIG. 14 shows the orientation of the housing of the whirling wheel that would produce a purely vertical force. The housing is upright and symmetrically surrounds the two rotating wheels 100 and 120.

Figure 15:
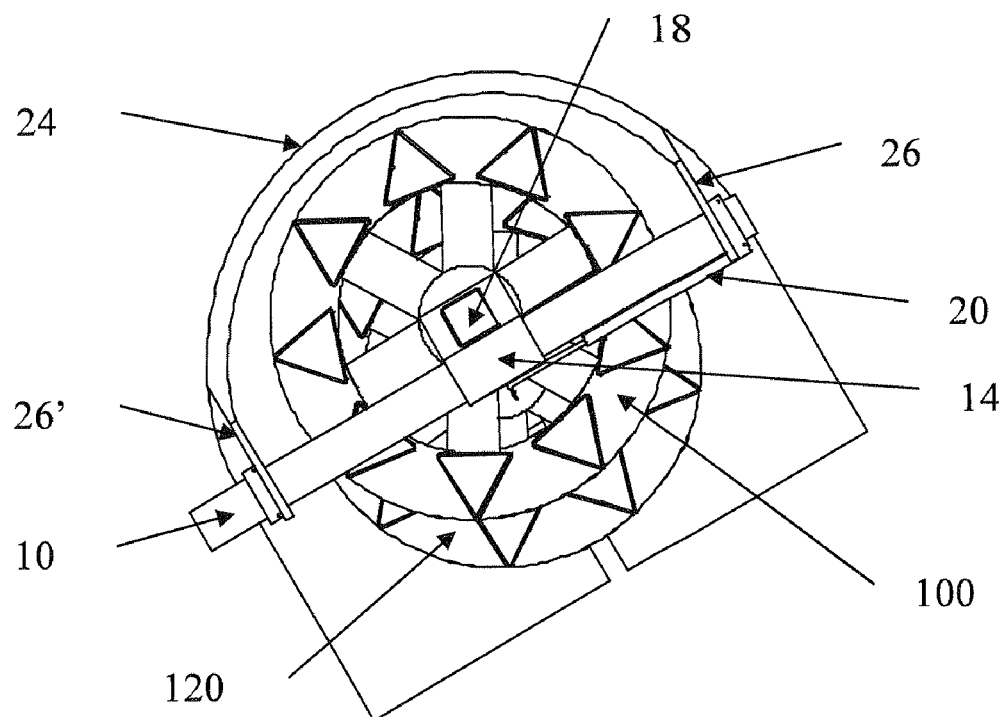
FIG. 15 is a perspective view showing left tilt of whirling wheel housing resulting in upward and leftward thrusts.

FIG. 15 shows an alternate way of achieving a force directed upward and toward the left. In this arrangement, the housing of the whirling wheel is rotated about an axis parallel to the axis of the back wheel 120 with the arc side of the housing pointing left. The wheels 100 and 120 do not need to slide. Therefore, the actuator arms 20 and 40 and roller housings 12, 42 and 42' could be eliminated in this arrangement.

Figure 16:
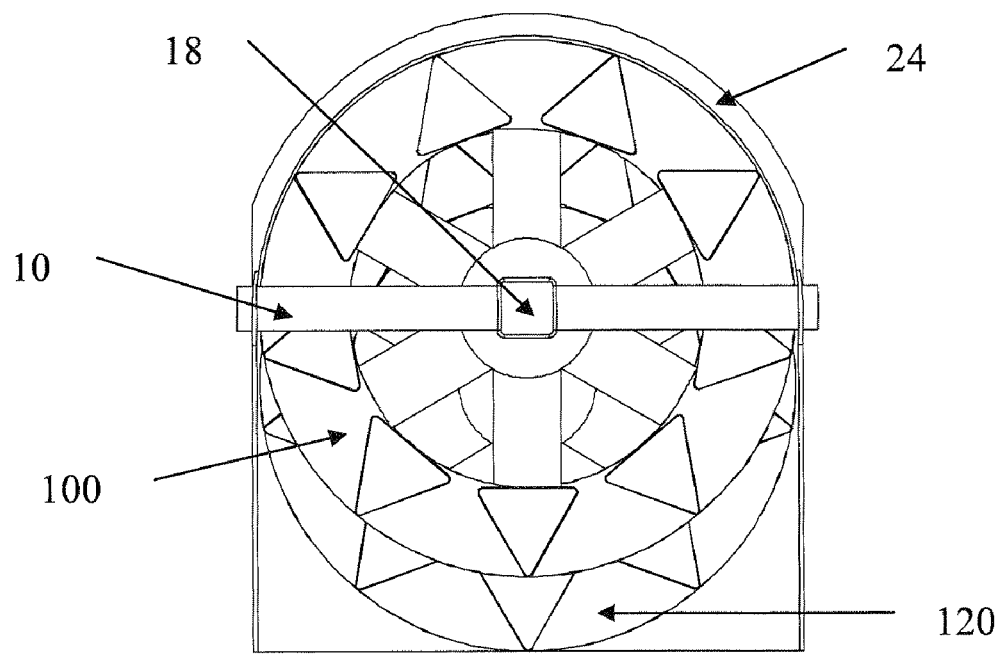
FIG. 16 is a front plan view showing whirling wheels inside a tightly fitting housing to produce more pressure.

FIG. 16 shows whirling wheels and housing that would achieve higher pressures under the arc 24 and therefore higher thrust. In this arrangement, the escape areas for the air in the compressed volume have been reduced considerably by allowing small clearances between the wheels and the housing. This tight-fitting arrangement may be used when the housing is rotated about an axis parallel to the axis of the rear wheel 120 in order to achieve various directions for the thrust.

FIGS. 17-22 illustrate construction details in building a tilting-body whirling wheel thruster with extra turbine blades and also incorporating a means of implementing the tilts.

Figure 17:
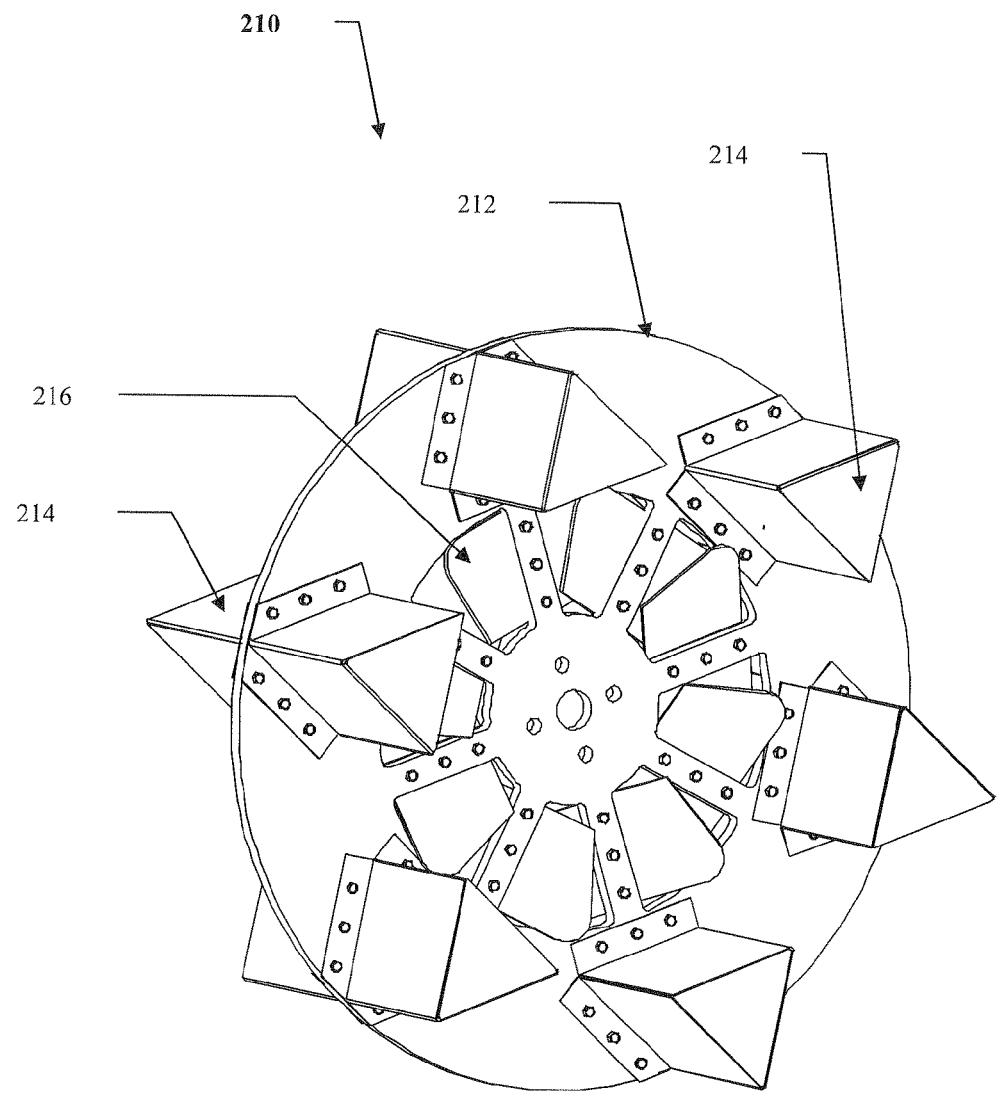
FIG. 17 is a perspective view showing vanes and turbine blades of a whirling wheel.
Figure 17:

In FIG. 17, the whirling wheel 210 consists of a cylindrical plate 212 and a multiplicity of vanes 214, attached on both sides, for radial compression of air and turbine blades 216 for axial compression of air as the whirling wheel 210 turns.

Figure 18:
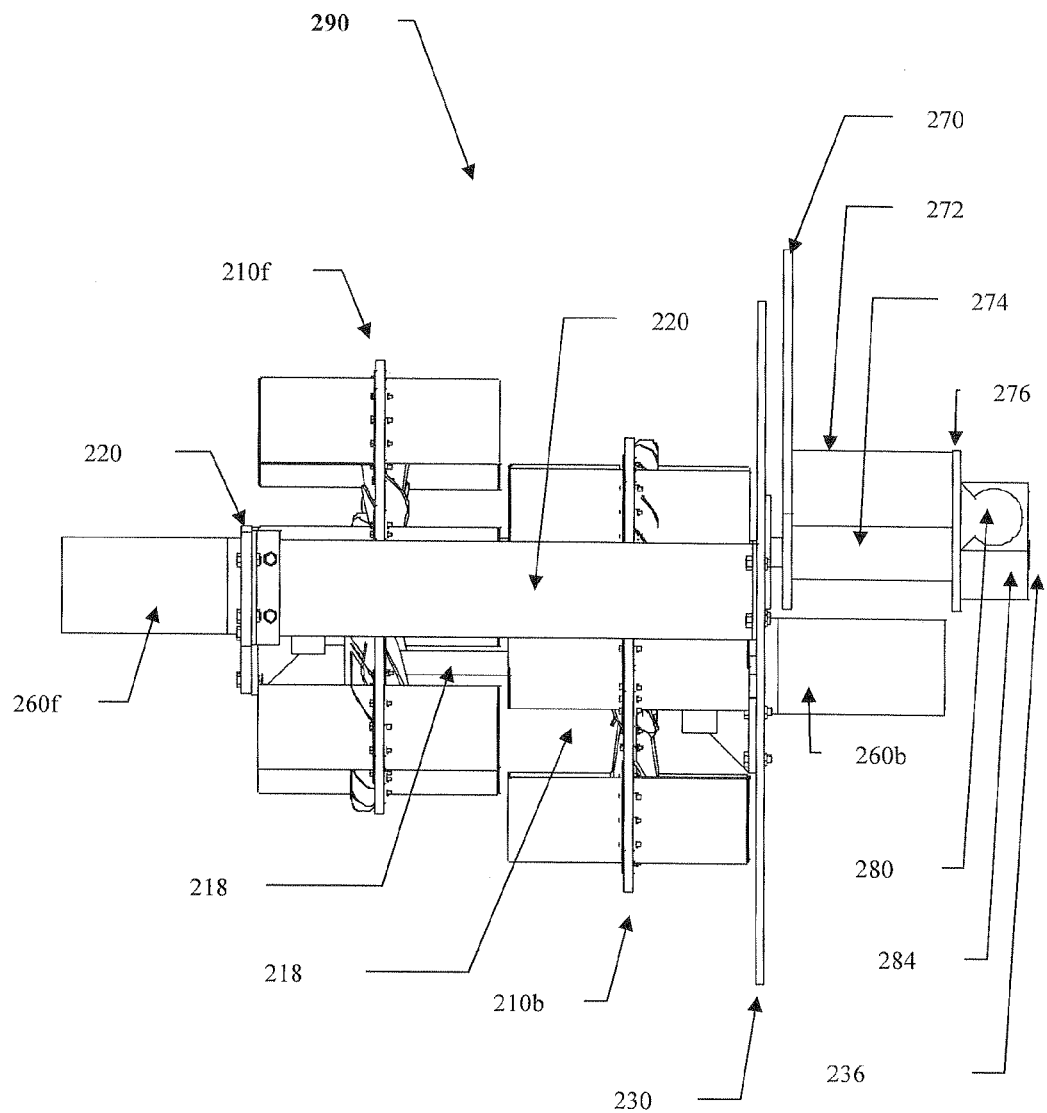
FIG. 18 is a perspective view showing whirling wheel arrangement without outer housing.
Figure 18:

FIG. 18 shows the whirling wheel arrangement 290 without its outside housing. The whirling wheel arrangement 290 consists of two whirling wheels 210*f* and 210*b* side-by-side but vertically displaced from each other by a small distance, and driven by separate electrical motors 260*f* and 260*b*. The front whirling wheel 210*f* and its motor 260*f* are supported on a mounting framework 220 and the back motor 260*b* and its whirling wheel 210*b* are mounted on the back wall 230 of the housing. Extra turbines 218 mounted on shafts driving the whirling wheels 210*f* and 210*b* aid in further axial compression of air towards the back wall 230. A pocket of high pressure air exists on top of the back whirling wheel 210*b* and escapes along the top of the front whirling wheel 210*f*, the inner walls 240 of the outer housing shown in FIG. 19*a*, and also along the back wall 230. The portion of high pressure air escaping via the top of the front whirling wheel 210*f* undergoes radial compression by the front whirling wheel 210*f*. The net gage pressure under the top curved surface of the outer housing produces the thrust. The inner walls 240 and outer walls 244 of the outer housing are affixed to a multiplicity of structural members 250 which are firmly secured to the back wall 230.

Sometimes it would be necessary to produce an outward force on the thruster to be used in steering the vehicle to which it is attached. Incorporating an extra steering vane 245 and tilting it so that the top part of the steering vane 245 points outward, as shown in FIG. 19*b*, produces an outward component of force on the thruster as the downward draft from the whirling wheels impinges on it. The orientation of the steering vane 245 is accomplished by using a servo motor 247 attached to the shaft of the vane. No sideways force acts on the steering vane 245 when it is aligned with the draft, i.e., vertical. However, when the top portion of the steering vane 245 is oriented inwards as shown in FIG. 19*c*, the resulting sideways force on the thruster is also inward directed.

FIG. 20 shows how the whirling wheel arrangement 290 is attached to the vehicle it would fly. First, a shaft 236 is attached to the back wall 230 of the housing. The shaft goes through an attachment unit which is one solid piece consisting of a mounting plate 270, rib 272, a tubular member 274 and a rear plate 276. The other end of the shaft 236 is driven by the rotational positioning unit that consists of a gearbox 284 and stepper/servo motor 280 mounted on the rear plate 276. The shaft 236 turns in bearings fitted into the ends of the tubular member 274 of the attachment unit. The mounting plate 270 is the means of attaching the whirling wheel arrangement 290 onto the body of the vehicle it will fly. In some vehicles it is advantageous to use an I-beam mounting bar 271 shown in FIG. 19*b* and FIG. 19*c* for attachment instead of the mounting plate 270 shown in FIG. 19*a*.

Figure 21:
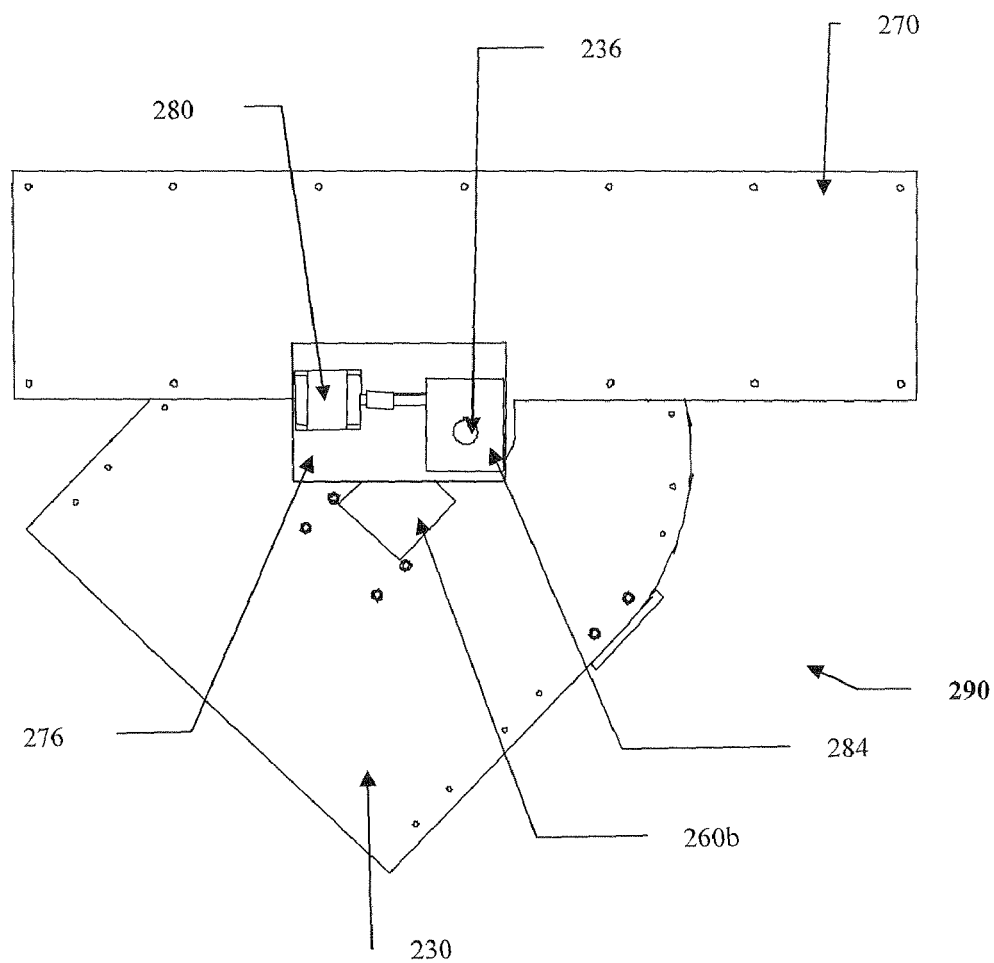
FIG. 21 is a rear plan view of tilted whirling wheel.

FIG. 21 is the back view of the tilted whirling wheel arrangement 290. The tilting is accomplished by the rotational positioning unit that consists of a motor 280 and gearbox 284.

Figure 22:
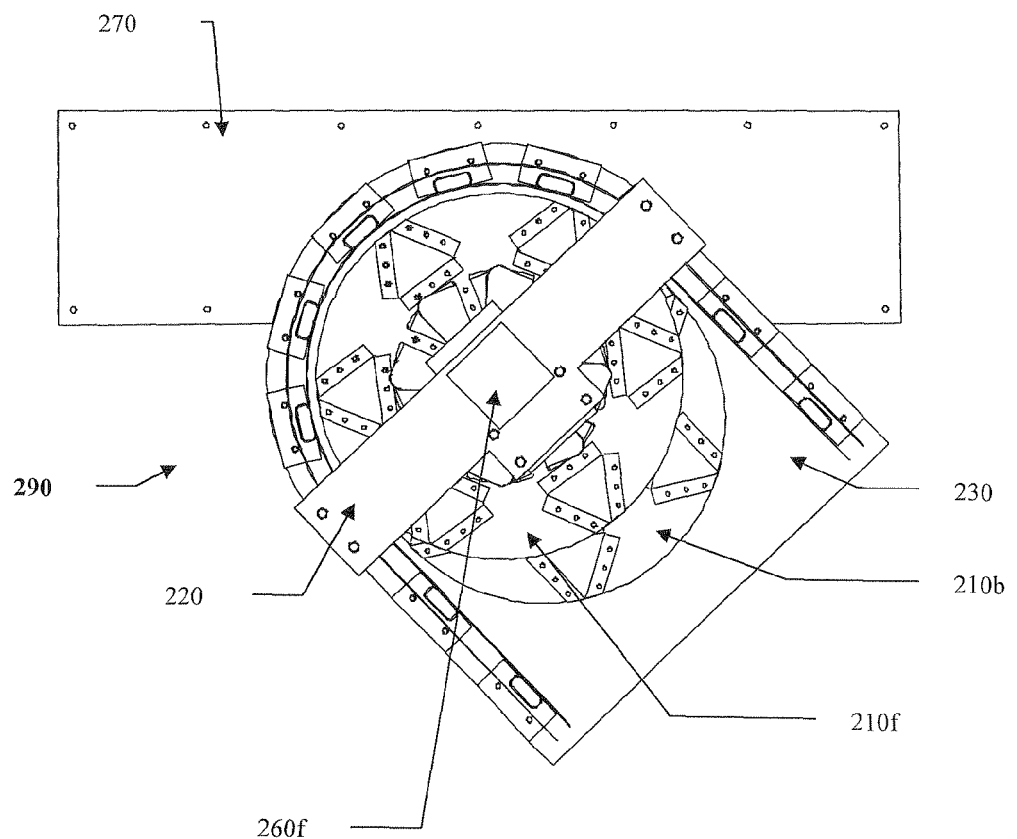
FIG. 22 is a front plan view of tilted whirling wheel.
Figure 22:

FIG. 22 shows the front view of the tilted whirling wheel arrangement 290. Tilting directs the thrust to the direction of the tilt thus permitting both vertical and lateral motions of the vehicle to which the mounting plate 270 or mounting bar 271 is attached.

Part C: Vehicles

Whirling wheel arrangements produce both vertical and horizontal thrusts on airborne vehicles to which they are attached. This results in vertical takeoff and landing of the airborne vehicle. This invention involves vertical-takeoff-and-landing (VTOL) vehicles for transportation by air. In the descriptions that follow, either type (or both types) of the whirling wheel thrusters may be used but for simplicity, we use mainly one type in describing each application.

1. Omni-Directional Air-Borne Vehicle

Figure 23:
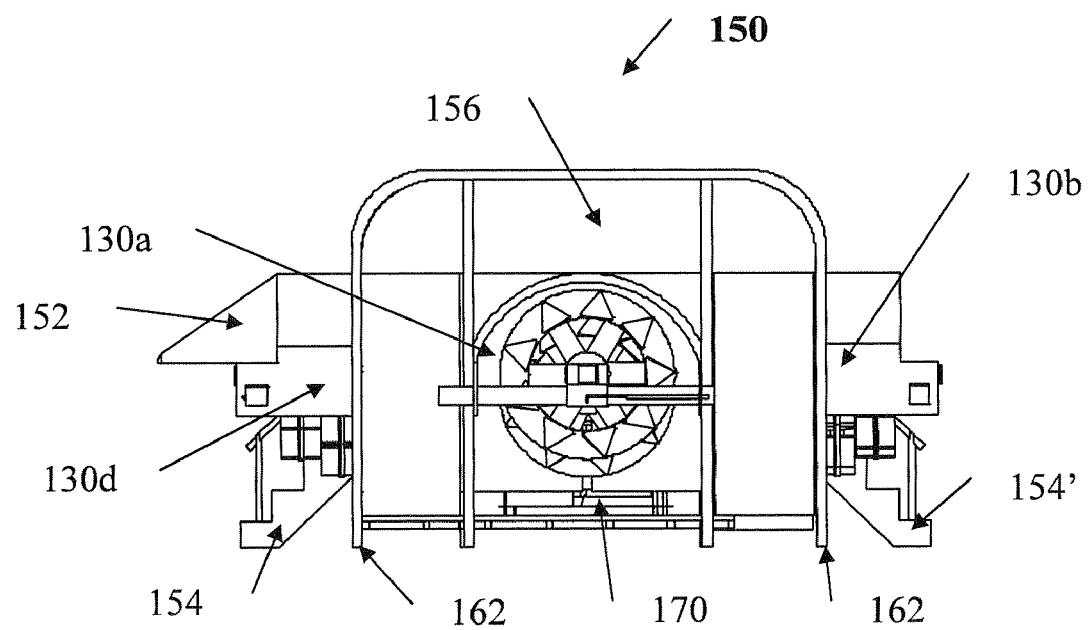
FIG. 23 is a side view of the omni-directional air-borne vehicle.
Figure 24:
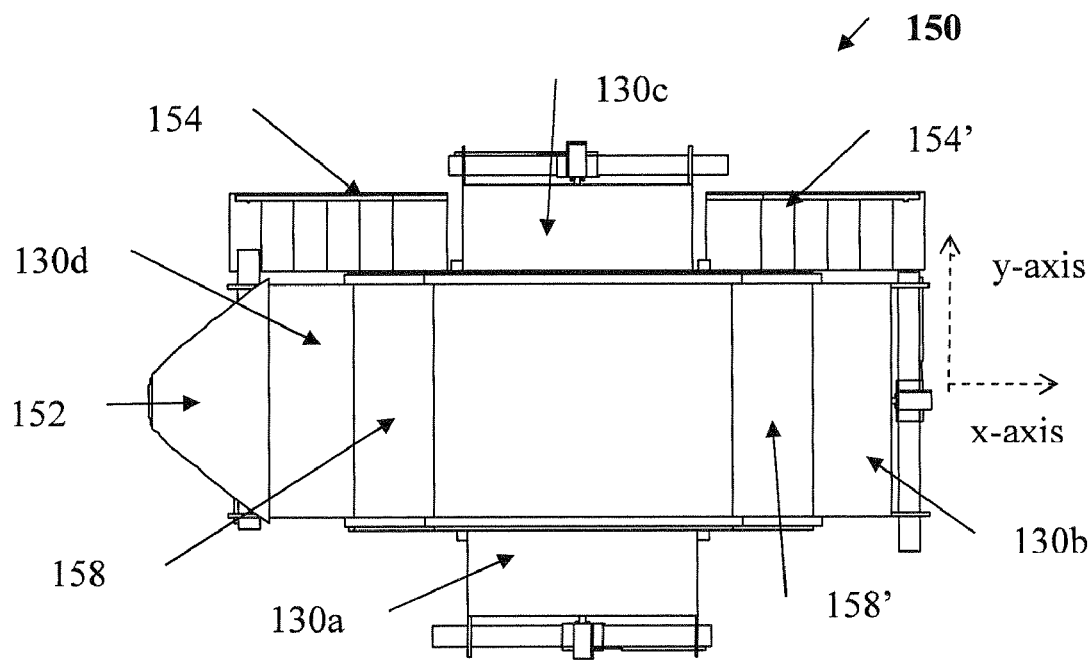
FIG. 24 is a top view of the omni-directional air-borne vehicle.

FIG. 23 shows a side view of an omni-directional air-borne vehicle 150. The figure shows three of the four whirling wheel arrangements 130*a*, 130*b*, and 130*d* that power the vehicle. FIG. 24 is the top view of the vehicle and clearly shows the positions of all four whirling wheel arrangements 130*a*, 130*b*, 130*c*, and 130*d*. A whirling wheel arrangement produces both vertical and horizontal thrusts to move the vehicle up and in a horizontal direction. Using the four whirling wheel arrangements arranged in this rectangular formation results in vertical take-off and landing of this airborne vehicle and movement in any horizontal direction.

In FIG. 24, wheels 130*a* and 130*c* would be used to move the vehicle either to the left or to the right (i.e., along the x-axis) once it is air-borne. Wheels 130*b* and 130*d* would be used to move the vehicle sideways (i.e., along the y-axis of the page).

Hence, motion in any direction on the horizontal (x-y) plane is achieved by the resultants of the motions produced in the x-direction and the y-direction. The magnitudes and directions of the horizontal forces along both axes are independently controllable by the speeds and lateral displacements inside the individual whirling wheel arrangements or by the tilts of the housing depending on the type of thruster. This makes it possible to get the resultant force and motion in any direction in the horizontal plane. Vertical motion is accomplished from the vertical thrust component produced by the rotating wheels in the whirling wheel arrangements 130*a*, 130*b*, 130*c*, and 130*d*.

In FIG. 23 through FIG. 27, an aerodynamic hood 152 shown over one of the wheel arrangements on a narrow side of the vehicle (130*d* in this case) gives a preferred front end to the vehicle. On one broad side of the vehicle, two means of entering or exiting the passenger compartment of the vehicle are provided. These are shown here as stairs 154 and 154'.

Figure 25:
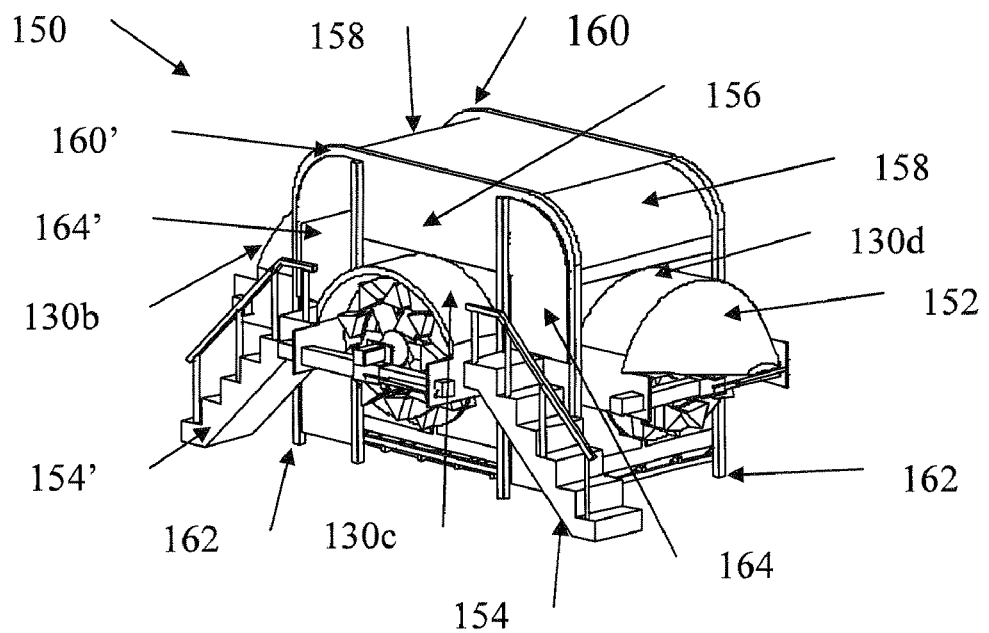
FIG. 25 is an isometric view of the omni-directional airborne vehicle.

FIG. 25 shows an isometric view of the vehicle. The top portion of the vehicle has the front windshield 158, the rear window is 158' and side window 156. There is also the framework 160 and 160' to support these glass windows and give mechanical strength to the upper portion of the vehicle. The vehicle lands on feet 162 which form part of the framework. Sliding doors, 164 and 164' are located above the stairs on one broad side of the vehicle. Landing gear consisting of tires, cushioning springs and shock absorbers (not shown) could be attached to the feet.

Figure 26:
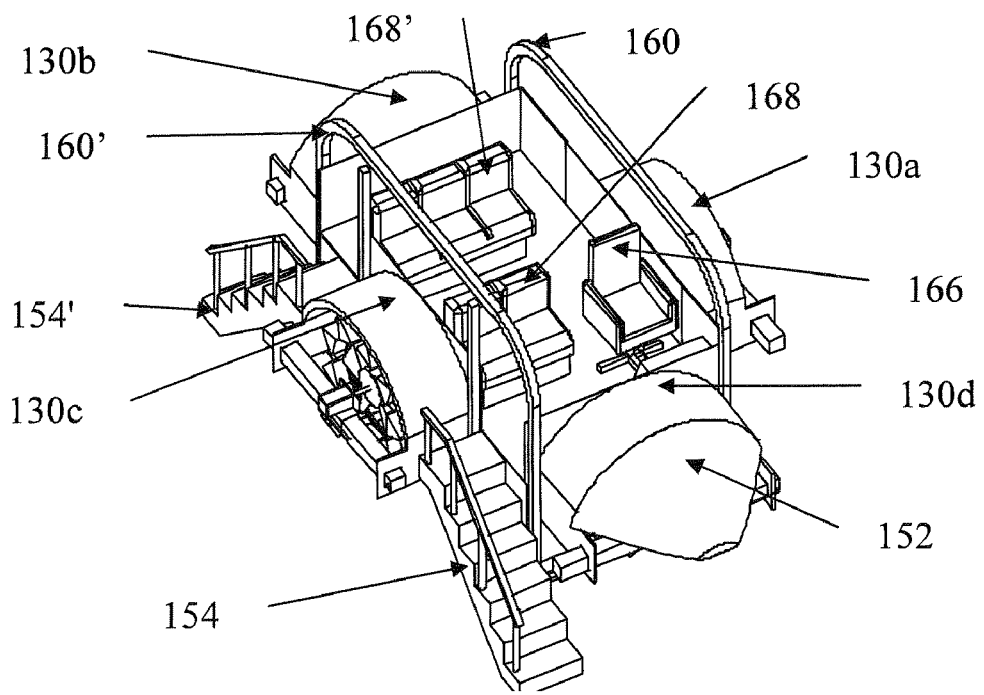
FIG. 26 is an isometric view of the omni-directional airborne vehicle with the top removed.

FIG. 26 shows the vehicle with the top covering removed exposing the passenger compartment with seats 168 and 168'. The swivel chair 166 enables the driver (pilot) to easily turn in any direction the vehicle is headed.

Figure 27:
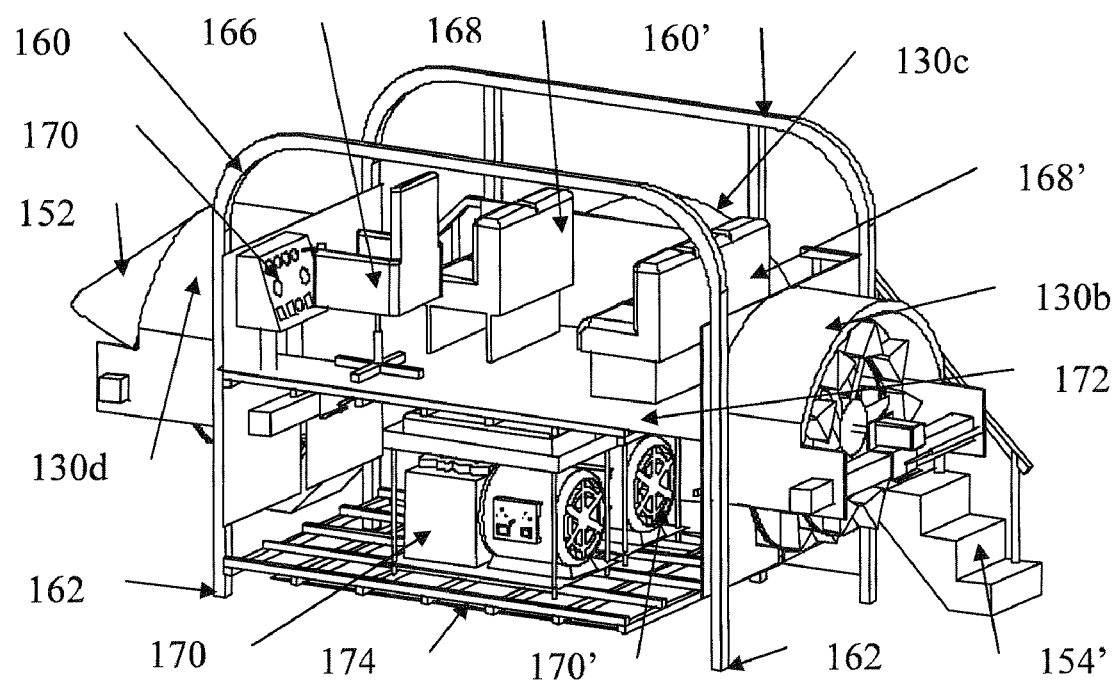
FIG. 27 is a view of the omni-directional air-borne vehicle with the top and one side panel removed.

FIG. 27 shows the two compartments of the vehicle. The lower compartment houses the electric generators 170 and 170' needed for powering the motors that drive the wheels and for supplying power to other accessories of the vehicle. All accessories like air conditioning, pneumatic pumps, control circuits are located in this lower compartment. Using two electric generators assures there is a backup power source for this air-borne vehicle. Floor structures for both the lower deck 174 and upper deck 172 are firmly welded to the framework 160 and 160'. Next to the swivel chair 166 in the upper compartment is the control and instrument panel 170. The control and instrument panel is where the driver (pilot) operates the vehicle.

Figure 28:
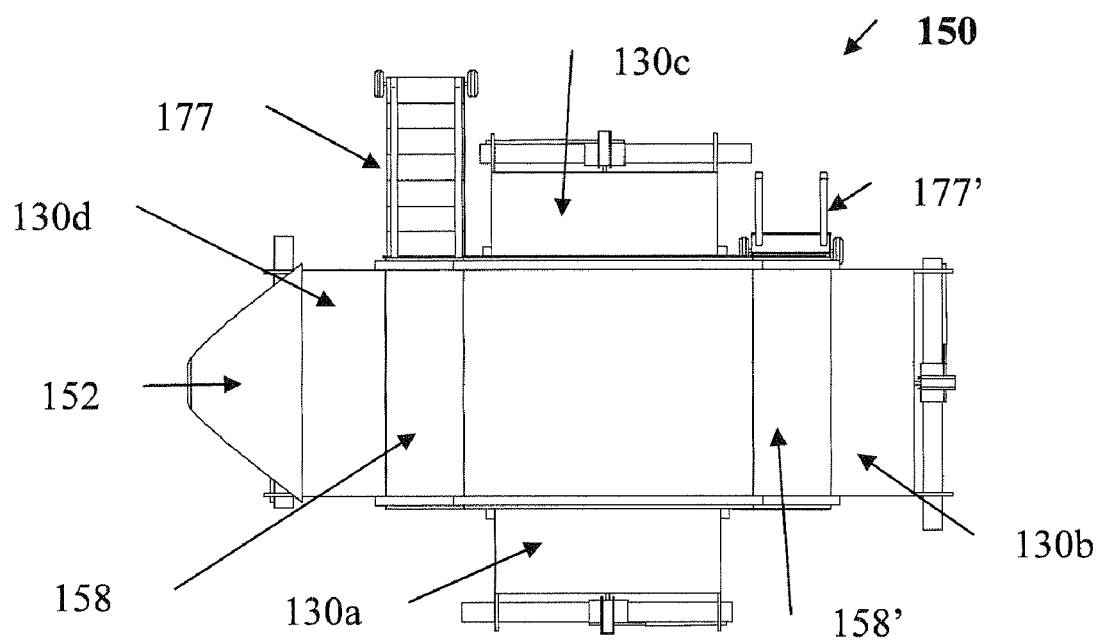
FIG. 28 is a top view of vehicle showing one retractable stairs rolled out.

FIG. 28 shows the omni-directional vehicle fitted with retractable means of entry in form of rolling stairs 177 and 177'. The stairs would be rolled out when the vehicle has landed and would be retracted to the side of the vehicle for flight.

Figure 29:
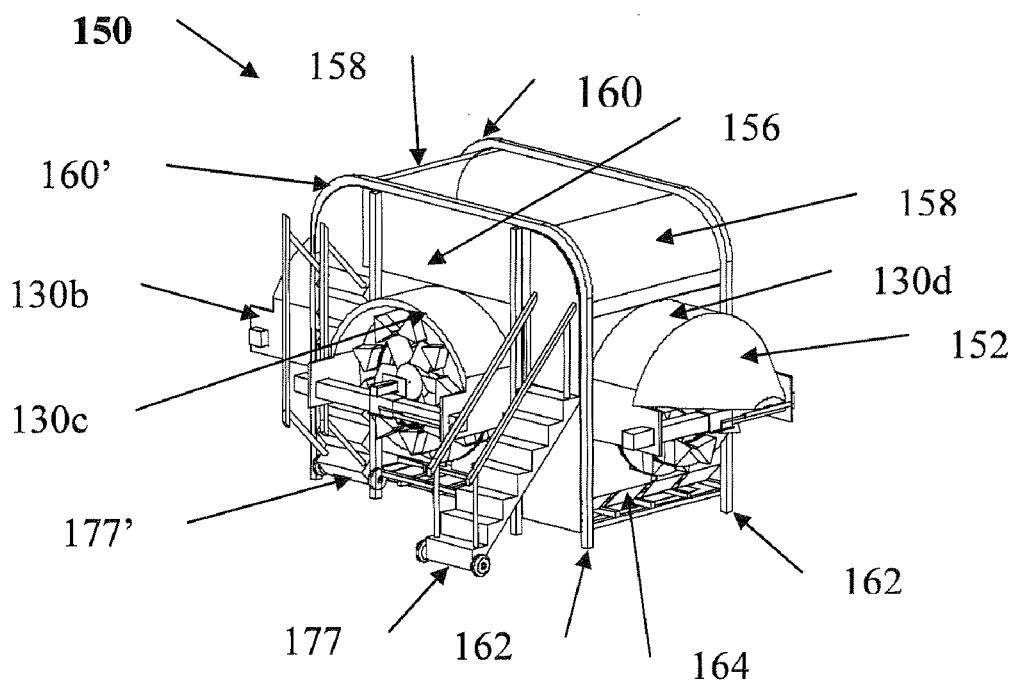
FIG. 29 is another view of omni-directional vehicle with retractable stairs.

FIG. 29 shows another view of the vehicle with one stair 177' retracted and the other stair 177 rolled out.

2. Flying Vehicle with Dual-in-Line Whirling Wheel Thrusters

Figure 30:
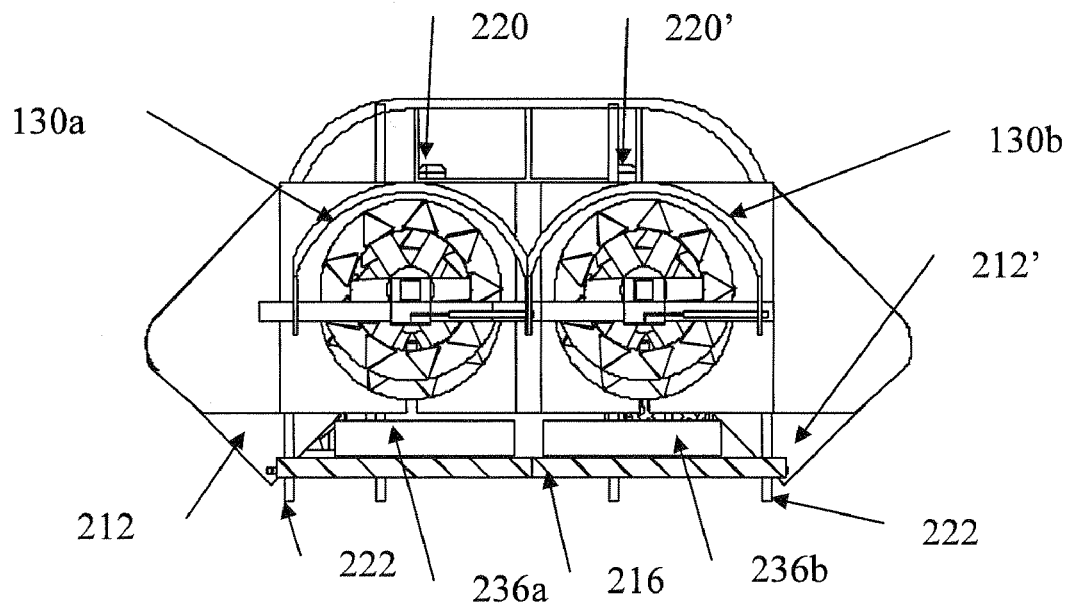
FIG. 30 is a side view of flying vehicle with dual-in-line whirling wheel thrusters.

FIG. 30 shows a side view of a flying vehicle with dual-in-line whirling wheels. The vehicle has four whirling wheel arrangements 130a, 130b, 130c, and 130d with two such wheel arrangements on each side. The vehicle has seats 220 and 220' located in a passenger compartment and there is also a lower engine compartment which houses all the accessories. Retractable wedges 236a and 236b are located in the engine compartment. The vehicle also has stairs 212 and 212' that can either be folded or stretched out. They are shown in their folded position in this figure. When the whirling wheels turn and produce upward lift, some of the "exhaust" air comes downwards from the wheels. On the lower sides of the vehicle are vanes 216 slanted at appropriate angles so that the high-pressure "exhaust" air from the wheels impinge on them to produce forward propulsion. This propulsion adds to that obtained from various other portions of the vehicle. The angle of slanting is adjustable, thus varying this component of the propulsion between zero and a maximum value. Also shown are the feet 222 on which the vehicle stands when it is on the ground. In this case too, landing gear consisting of tires, cushioning springs and shock absorbers (not shown) could be attached to the feet.

Figure 31:
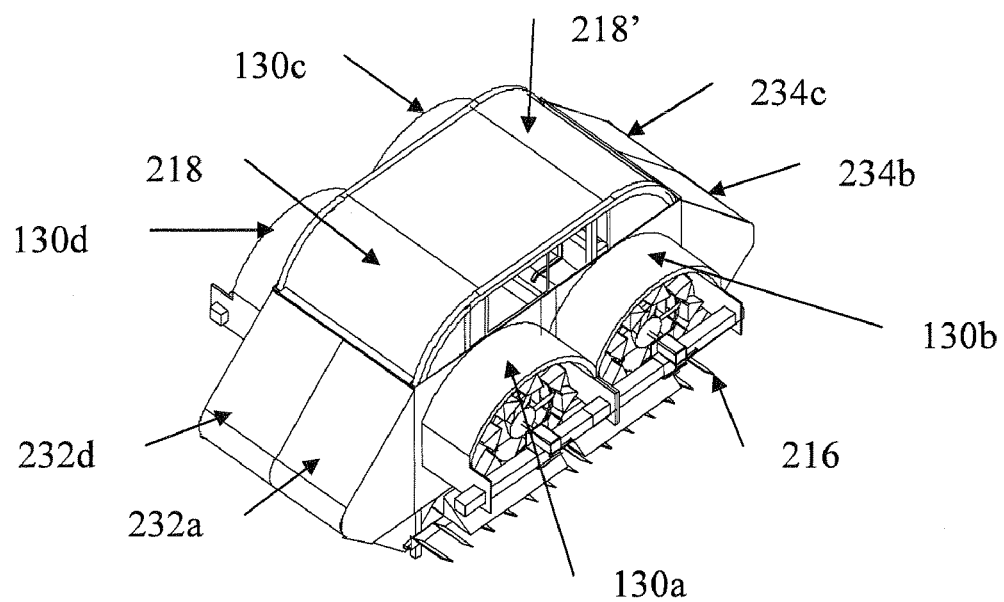
FIG. 31 is an isometric view of flying vehicle with dual-in-line whirling wheel thrusters.

FIG. 31 shows an isometric view of the vehicle. The vehicle has front hoods 232a and 232d in addition to rear hoods 234b and 234c. These hoods also serve as doors. These hoods cover stairs 212 and 212' (shown in FIG. 30) folded during flight. The passenger compartment has a windshield 218 and a rear window 218'.

Figure 32:
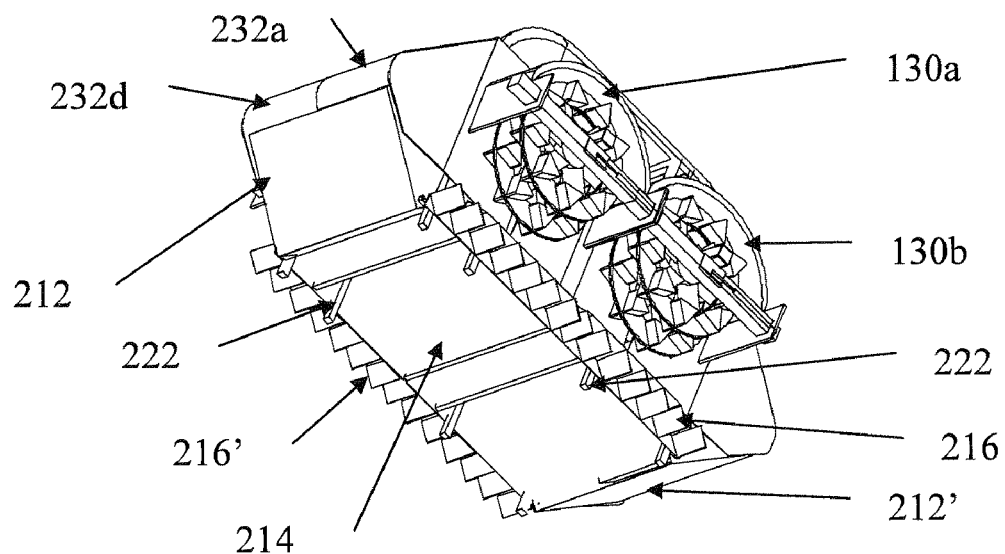
FIG. 32 is a perspective view of flying vehicle showing its underside.

FIG. 32 shows a view from the bottom and side. The bottom plate 214 and the legs 222 on which the vehicle lands are shown.

Figure 33:
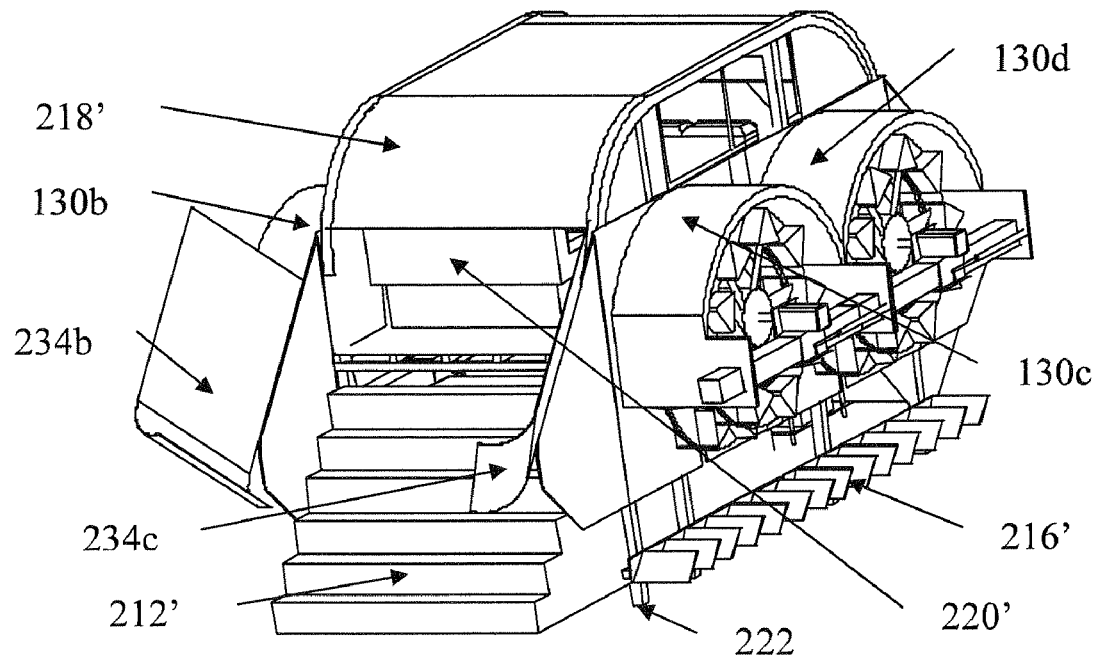
FIG. 33 is a perspective view from the back of flying vehicle with dual-in-line whirling wheel thrusters.

FIG. 33 shows the vehicle with the rear doors 234b and 234c open and the rear stair 212' unfolded for entering or exiting the vehicle as may be the case when it is on the ground.

Figure 34:
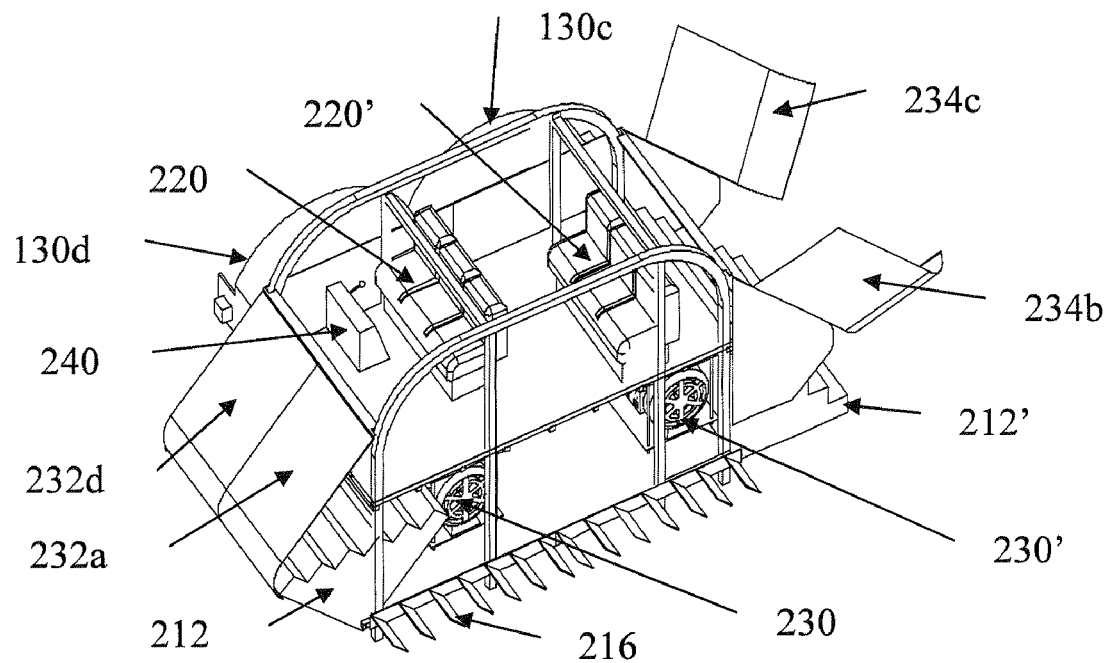
FIG. 34 is an isometric view of flying vehicle with the top covering and one side panel removed and the rear stairs unfolded.

FIG. 34 shows the vehicle with many parts stripped away to expose other parts. The top and windows are removed exposing the passenger compartment with seats 220 and 220'. Also shown is the instrument and control panel 240. The rear doors 234b and 234c are open and the rear stair 212' is unfolded in this figure. The side panel of the front hood 232a has also been removed to show the front stair 212 in its folded position. Finally, the whirling wheel arrangements 130a and 130b have been removed to expose the upper and lower compartments. All accessories in the lower compartment are removed to highlight the generators 230 and 230'. More than one generator is used for backup purposes and added reliability. The lower compartment also houses the air conditioning equipment, motor controllers and all other accessories.

Figure 35:
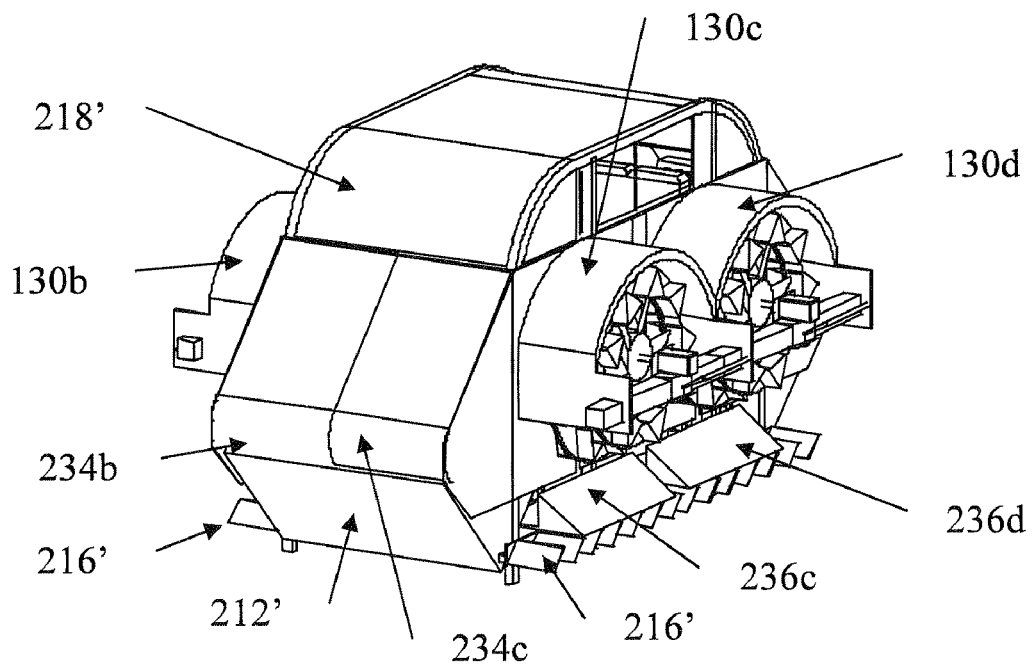
FIG. 35 is an isometric view of flying vehicle showing wedges extended beneath the whirling wheel thrusters.

FIG. 35 shows retractable wedges 236c and 236d which are used to move the vehicle from side to side. In fact, there are two additional such retractable wedges (236a and 236b) on the other side but are not shown in the figure. When retractable wedges 236c and 236d are extended (as shown), exhaust air from the wheels impinging on them forces the vehicle to move towards the left. Rightward movement is achieved by extending only the two other wedges (236a and 236b not shown) located on the left side of the vehicle. Extending all four wedges simultaneously by the same amount would result in a downward force that would subtract from the lift produced by the wheels. Extending only two diagonal wedges (say, front left 236a and right rear 236c) would produce a clockwise turning force on the vehicle if the force is viewed from the top. These wedges are usually retracted inside the engine compartment until they are needed for positioning or turning (steering) the vehicle.

Figure 36:
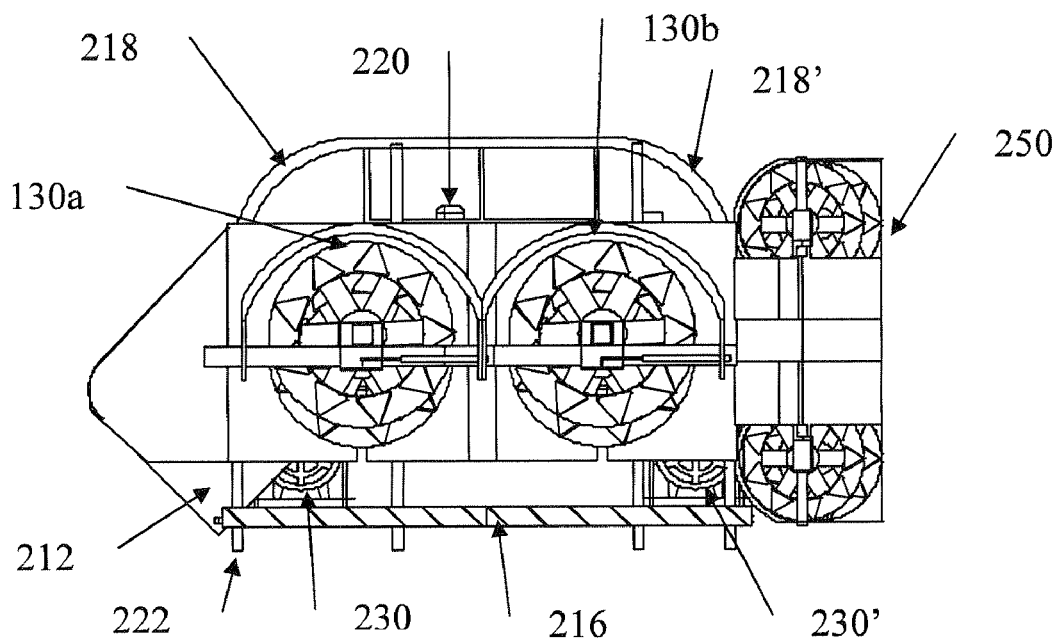
FIG. 36 is a side view of flying vehicle with rear-mounted whirling wheel thrusters.

FIG. 36 shows a propulsion arrangement, called a vector thruster 250, that is attached to the rear of the vehicle to give it a forward push. The vector thruster 250 is also made of a number of whirling wheel arrangements. The rear stairs and rear doors are removed in order to attach the vector thruster 250.

Figure 37:
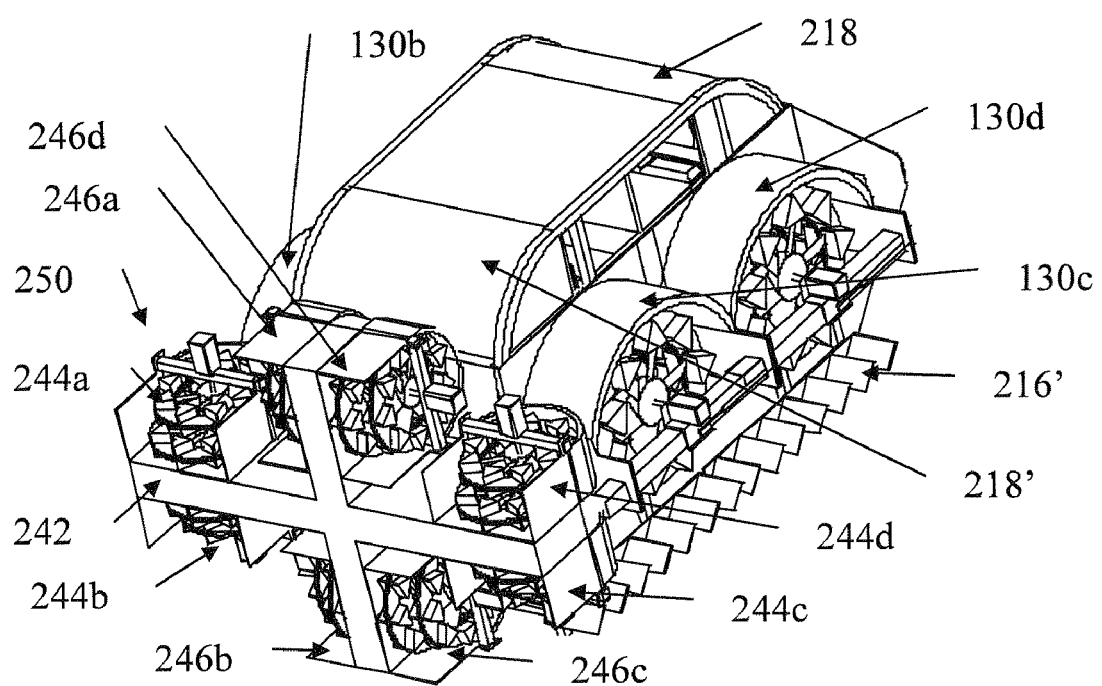
FIG. 37 is a rear view of flying vehicle with rear-mounted whirling wheel thrusters for faster speed.

FIG. 37 shows vector thruster 250 in greater detail when it is attached to the rear of the vehicle. Eight whirling wheel arrangements are mounted on a frame 242. Four of them 244a, 244b, 244c, and 244d push the airborne vehicle forward and also are capable of moving the rear of the vehicle to the left or to the right on the horizontal plane. Four other whirling wheel arrangements 246a, 246b, 246c, and 246d also push the vehicle forward and are also capable of moving the rear of the vehicle up or down on the vertical plane. Hence the vector thruster 250 also serves as a multi-directional rudder.

Other vector thrusters could be built to propel the vehicle. One example is a thruster that uses only two sets of whirling wheel arrangements placed in a T formation. Another vector thruster employs four whirling wheel arrangements placed in a rectangular formation.

Figure 38:
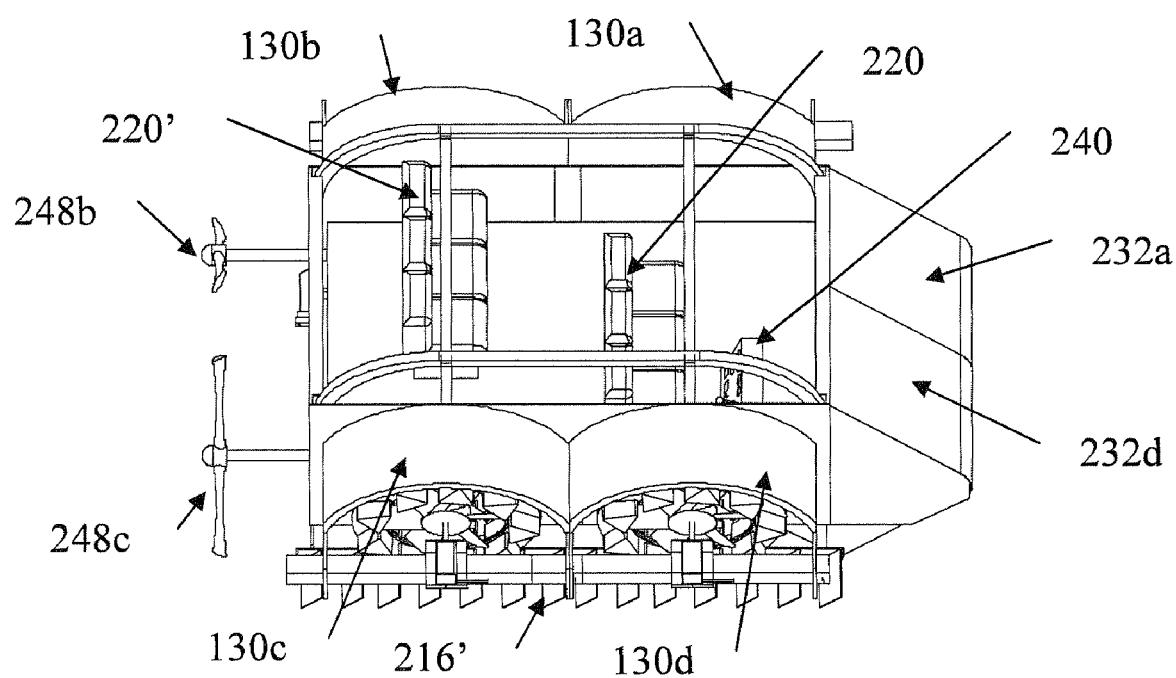
FIG. 38 is a perspective view of flying vehicle with rear-mounted propellers for faster speed.

FIG. 38 shows another way of increasing the forward speed of the vehicle by using two counter-rotating propellers mounted at the rear. The propellers 248b and 248c are driven by electric motors.

3. Air-Borne Bus

Figure 39:
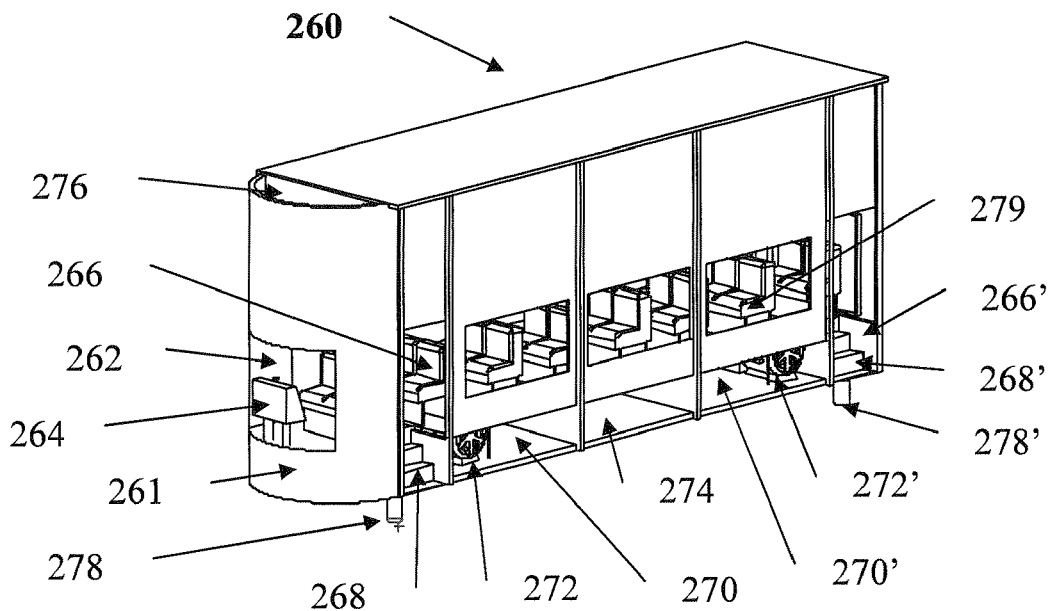
FIG. 39 is a perspective view showing a bus structure without whirling wheel thrusters.

FIG. 39 shows the basic structure of the air-borne bus 260. It has seats 279 in a passenger compartment and generators 272 and 272' in lower engine compartments 270 and 270'. There is storage space 274 for passenger luggage in the lower compartment.

There are also stairs 268 and 268' in doorways 266 and 266' for entering and exiting the bus. The fuel tanks (not shown)

are located beneath the stairs. The bus lands on multiplicity of feet designated as 278 and 278'. Additional landing gear consisting of tires and shock absorbers (not shown) could be attached to the feet. The front end of the bus has a rounded surface 261 and an opening 262 for the windshield. Located in this opening 262 is the control and instrument panel 264 and the driver's seat. Located above the conductor's seat is the glass-covered opening 276 through which the conductor might look up to see any obstructions in his way during take-off.

Figure 40:
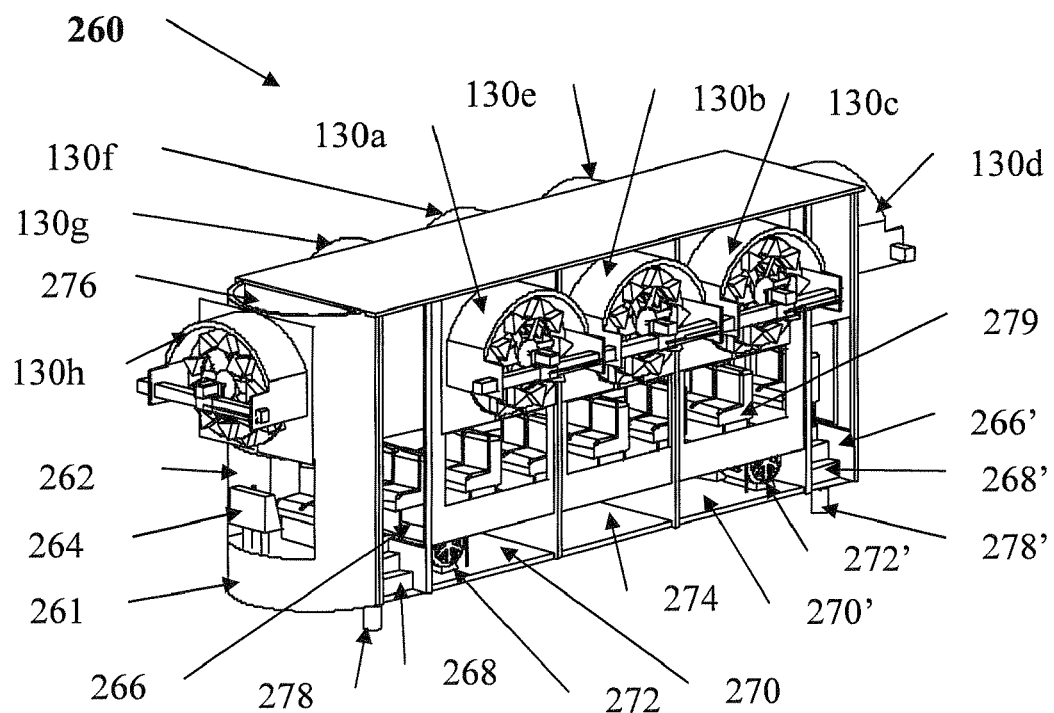
FIG. 40 is a perspective view showing another bus structure with whirling wheel thrusters mounted.

FIG. 40 shows the air-borne bus with a multiplicity of whirling wheel arrangements attached to its upper framework. The whirling wheel arrangements 130a, 130b, 130c, 130e, 130f, and 130g produce vertical and forward or backward motion. The other two wheel arrangements 130d and 130h produce vertical and lateral motions. They are used to orient or steer the vehicle and also to move it from side to side. For example, a leftward force produced by the front whirling wheel arrangement 130h and a rightward force produced by the rear whirling wheel arrangement 130d will rotate the vehicle in the horizontal plane to any desired orientation. Sideways motion is achieved by making the two whirling wheel arrangements 130d and 130h produce forces in the same direction, leftwards or rightwards simultaneously.

Take-off is achieved by increasing the rotational speeds of the wheels until the vertical lift produced by the wheels exceed the weight of the bus and contents. Landing is accomplished by smoothly slowing down the speeds of the wheels and gently bringing the craft down.

4. Air-Borne Truck

Figure 41:
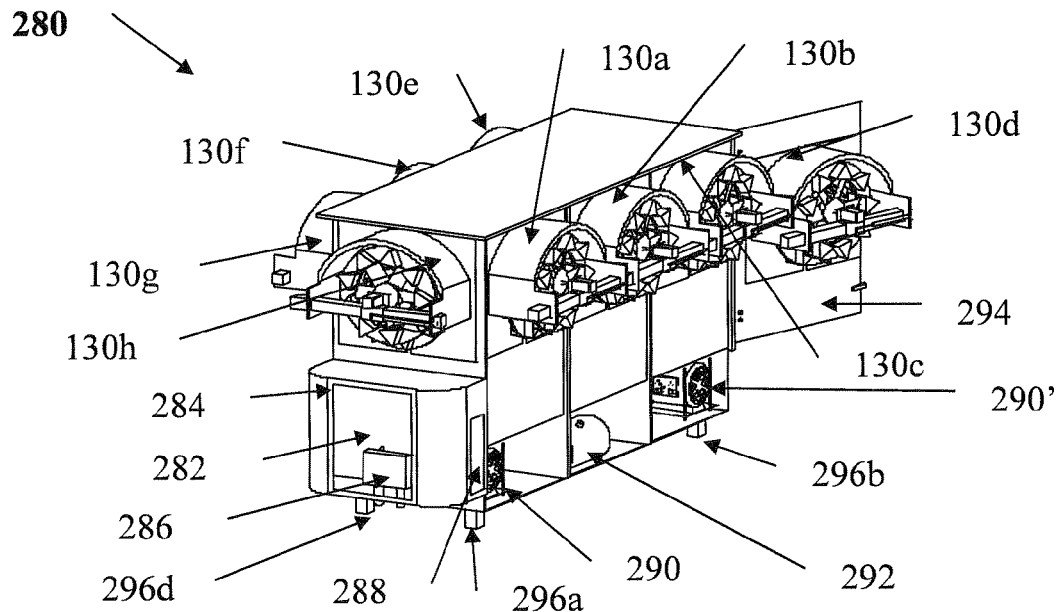
FIG. 41 is an isometric view of the air-borne truck with cargo door open.
Figure 42:
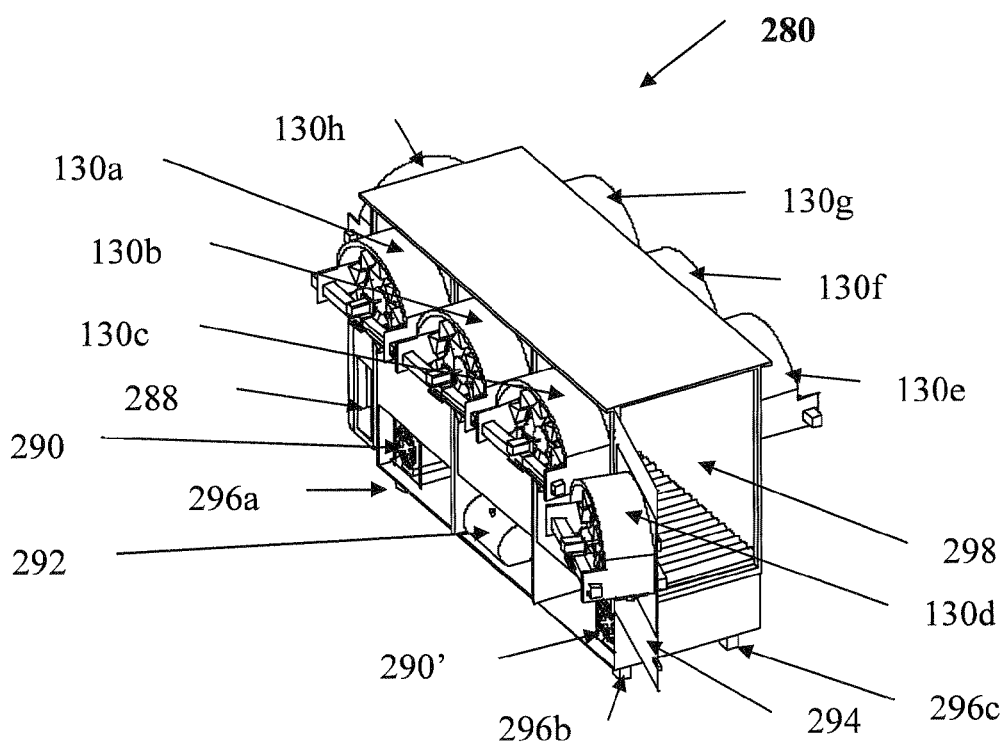
FIG. 42 is a perspective view from the back of the air-borne truck with cargo door open.

FIG. 41 is an isometric view of the air-borne truck 280 from the front, and FIG. 42 is the view from the back. This vehicle has a multiplicity of whirling wheel arrangements designated as 130a, 130b, 130c, 130d, 130e, 130f, 130g and 130h attached to and surrounding the upper portion of the vehicle, which is also the cargo compartment 298. The lower portion of the vehicle consists of multiplicity of electric generators designated 290, and 290' that operate in parallel for greater reliability. Other accessories like gas tanks 292 and control equipment are also located in this lower section. All the whirling wheel arrangements produce vertical forces for lift-off as the wheels turn at appropriate speeds. In addition, whirling wheel arrangements 130a, 130b, 130c on one side of the vehicle and 130e, 130f, 130g on the other side of the vehicle produce forces to move vehicle either forward or backwards. The number of wheel arrangements on the sides of the vehicle would depend on the length of the vehicle and the lifting forces required. Only three such wheels are shown here as an example. One distinguishing feature of this vehicle from other similar vehicles is the fact that the whirling wheel arrangement 130d is situated on a hinged door 294 that is always closed before take-off. This is the door to the cargo compartment 298. The whirling wheel arrangements 130d and 130h, which are on the front and back of the vehicle 280, produce the forces needed for moving the vehicle from side to side or for orienting and steering the vehicle 280 when it is in flight. For example, a leftward force produced by the front whirling wheel arrangement 130h and a rightward force by the rear whirling wheel arrangement 130d produces a leftward turning of the vehicle. The vehicle 280 moves to one side if the whirling wheels 130d and 130h simultaneously produce forces in the same direction. The vehicle lands on a multiplicity of spring-loaded straight feet designated in both figures as 296a, 296b, 296c and 296d.

A driver compartment 284 located at the front lower portion of the vehicle shows a doorway 288 for entering and exiting this compartment and the instrumentation and control stand 286 through the front windshield 282.

5. Air-Ship

Figure 43:
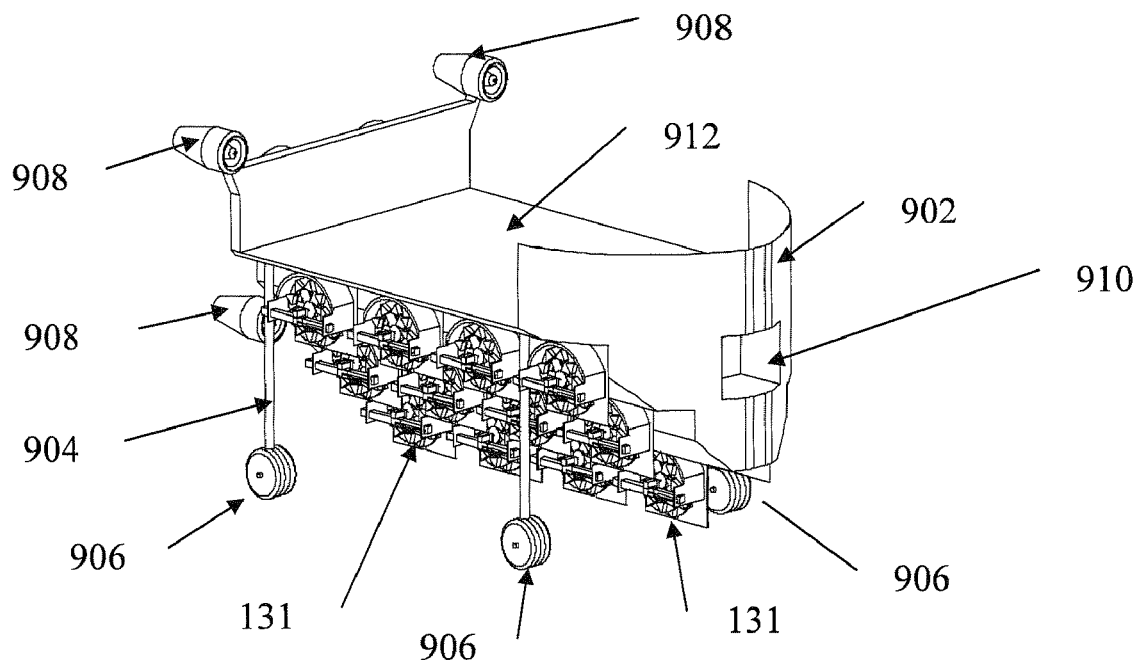
FIG. 43 is an isometric view of the air ship.

FIG. 43 is a drawing of the air ship 900. The air ship 900 provides an open loading deck 912 for quick loading and unloading of cargo. It has the basic shape of a boat with a hull 902. An opening 910 in the front of the hull serves as the cockpit of the vehicle. The vehicle lands on tires 906 which are mounted on the ends of supporting columns 904. Whirling wheel arrangements 131 are attached to the underside of the ship in rows on both sides of the air ship 900. These whirling wheel arrangements 131 give a vertical lift to the ship when they turn at appropriate speeds. They are also capable of propelling the ship forward. For more forward speed, secondary propulsion devices like jets 908 are added to boost propulsion.

Figure 44:
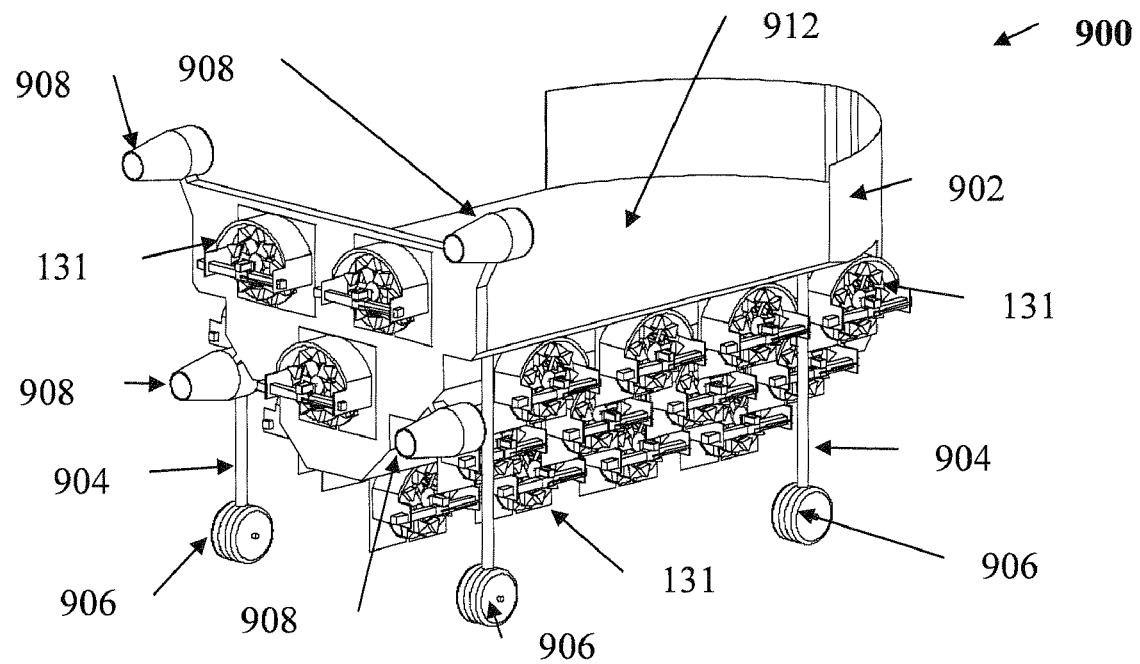
FIG. 44 is a rear view of the air ship.

FIG. 44 shows the rear of the ship where some additional whirling wheel arrangements 131 are attached. These are used as rudder because they can produce sideways directed forces on the rear of the ship in addition to vertical forces.

6. Vertical-Take-Off-and-Landing Plane

Figure 45:
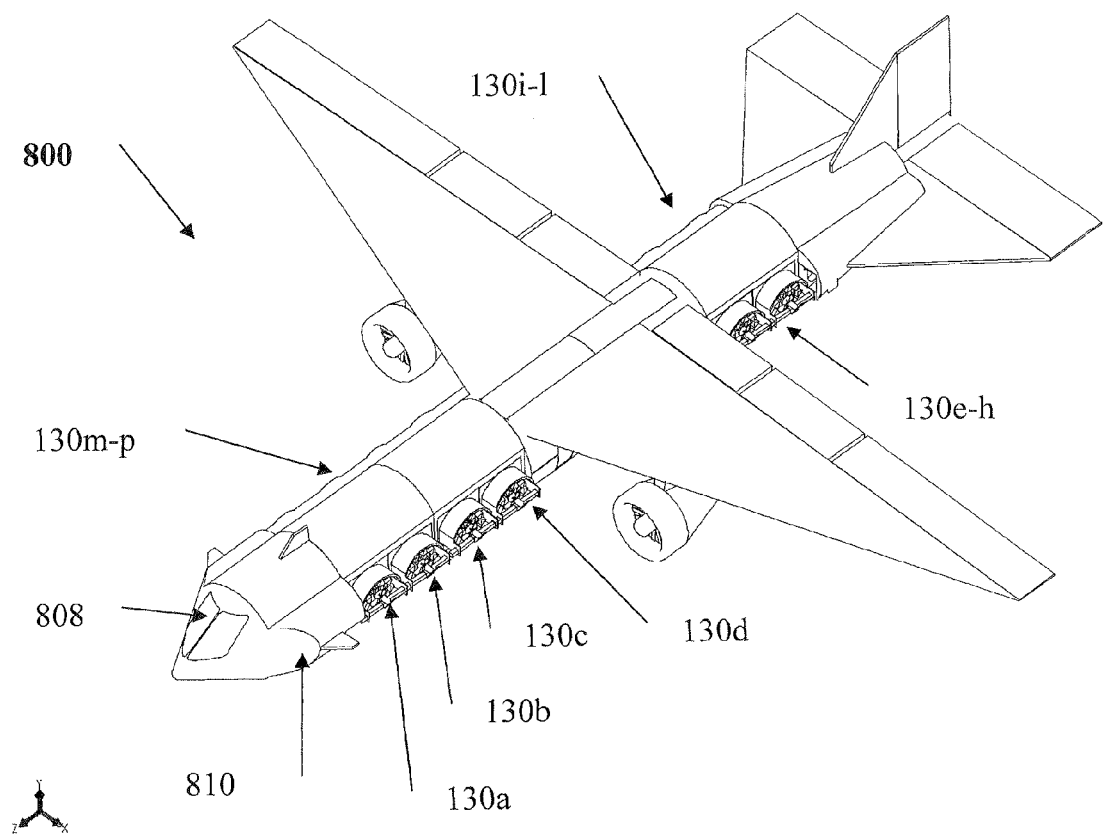
FIG. 45 is an isometric view of VTOL plane.

FIG. 45 shows an isometric view of the vertical-takeoff-and-landing (VTOL) plane 800. It has sets of whirling wheel arrangements designated here as: 130a-d, 130e-h, 130i-l, and 130m-p. These sets of whirling wheels are used to lift the plane off the ground when they are rotated at high enough speeds. The whirling wheel arrangements 130a-p could be used to propel the plane forward or backward or to stop the motion of the plane in mid-air. And finally, the whirling wheel arrangements 130a-p are used for vertical landing. The landing is accomplished by slowing down the speed of the rotating wheels. This reduces the vertical lift of the wheels below the weight of the plane and this brings it down in a controlled manner to land. The plane has a windshield 808 and enlarged "cheeks" 810 and 812 (shown in FIG. 49) which "shield" the whirling wheel thrusters attached to the side of the fuselage.

Figure 46:
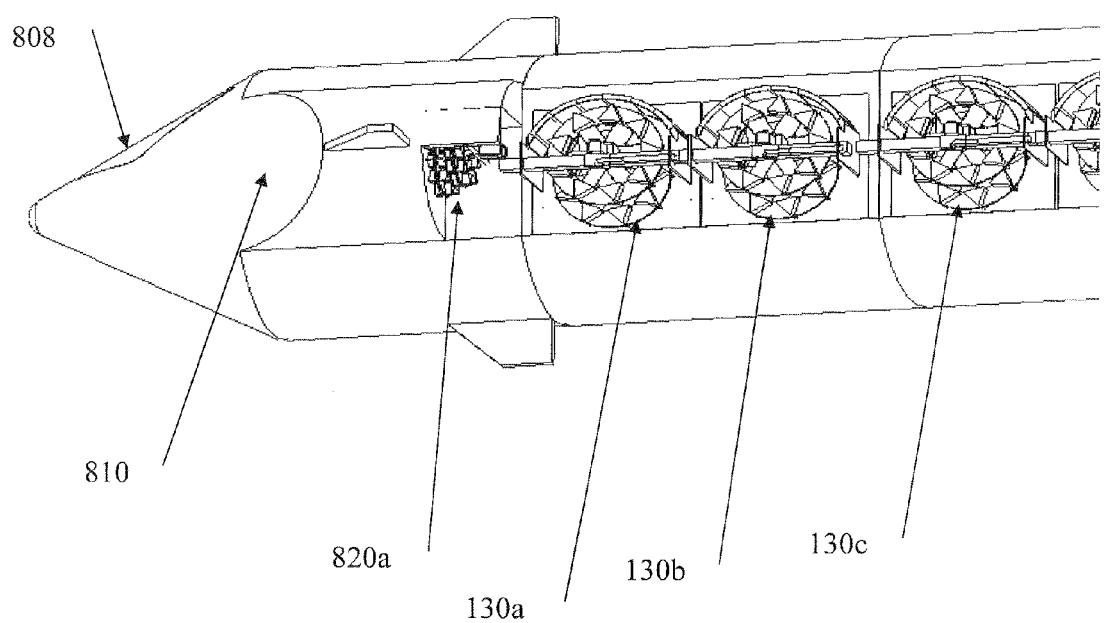
FIG. 46 is a perspective view of a front section of VTOL plane as seen from the side.
Figure 48:
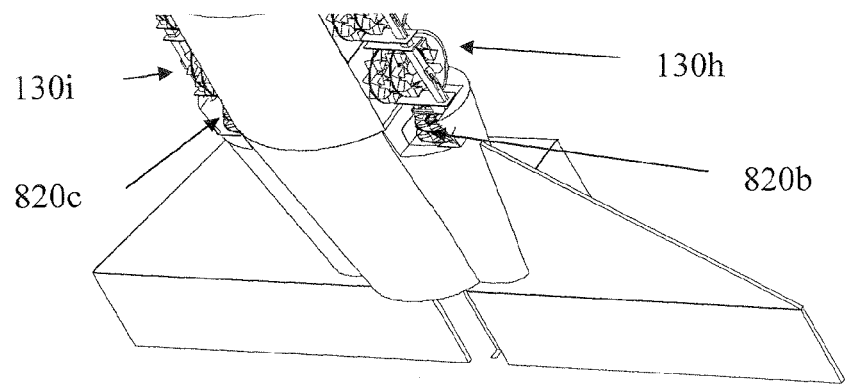
FIG. 48 is a perspective view of a tail section of VTOL plane.

FIG. 46 is another view of the front section of the plane as seen from the back. This figure also shows detailed views of the whirling wheel arrangements 130a, 130b, and 130c, on front left side of the fuselage. Shown nestled behind the "cheek" 810 is a whirling wheel arrangement 820a that is used to orient the plane especially when it is airborne but not moving. There are four such whirling wheel arrangements 820a-d (two in front behind "cheeks" 810 and 812 and two in the rear in the tail section as shown in FIG. 48) which are used to orient the plane in the horizontal plane once it is off the ground. These whirling wheel arrangements 820a-d are placed at right angles to the rest of the whirling wheel arrangements (thrusters) labeled 130a-p. (The 130 series produce forces in the forward, backward and vertical directions. The 820 series produce forces to the left, or right or vertical.) Rotation in the horizontal plane is accomplished by, say, making the front thrusters 820a and 820d (not shown, but located in front behind the other "cheek" 812) move the front leftwards and making the rear wheels 820b and 820c (shown in FIG. 48) move the rear rightwards. Lateral positioning of the plane is also achieved by causing all the wheels 820a-d to produce forces in the same direction simultaneously, leftwards or rightwards.

Figure 47:
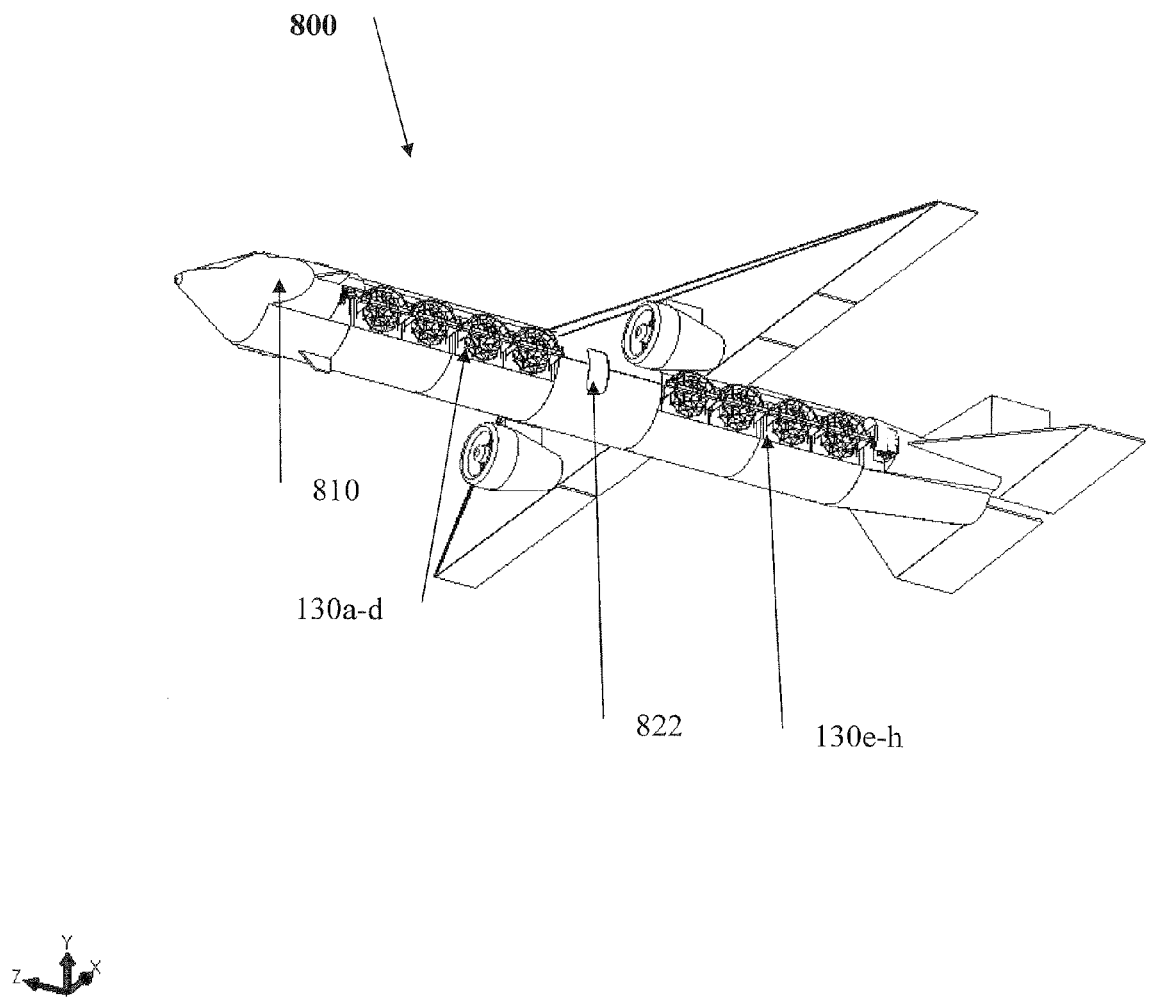
FIG. 47 is a perspective view of a underside of VTOL plane.

FIG. 47 is another side view of the VTOL plane from below. Side door 822 for passenger entry or exit is clearly shown.

FIG. 48 shows the tail section of the plane. The orienting whirling wheel arrangements 820b and 820c are clearly shown in their nestled positions. All figures are shown with the landing gear retracted.

Figure 49:
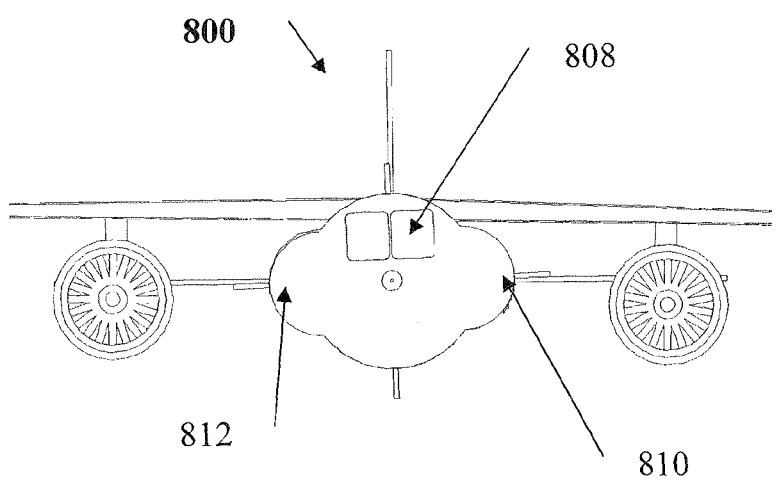
FIG. 49 is a perspective view of a front view of VTOL plane.

FIG. 49 shows the front view of the VTOL airplane. All the whirling wheel arrangements 130a-p and 820 a-d are shielded by the large "cheeks" 810 and 812.

7. Polygonal Flatbed Carrier

Figure 50:
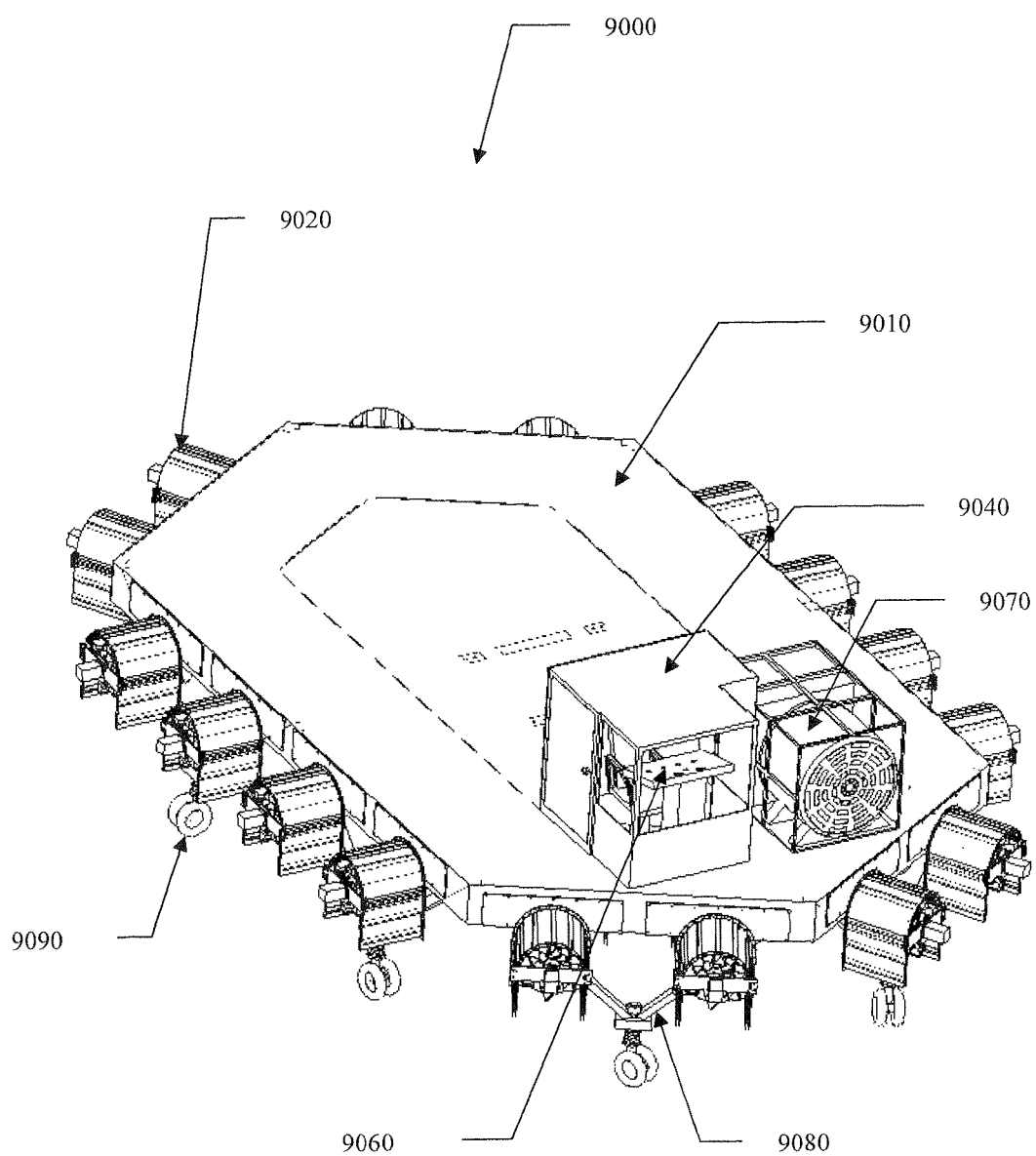
FIG. 50 is an isometric view of the airborne polygonal flatbed carrier.

FIG. 50 shows the polygonal flatbed carrier 9000 which consists of a structural vehicle flatbed 9010 with ribs underneath and on the sides where whirling wheel thrusters are affixed. The top side of the flatbed 9010 has the driver and control cabin 9040. The instrument board and control panel 9060 are in this driver and control cabin 9040. To the side of the driver and control cabin 9040 is the electric generator 9070 that powers the electric motors used for driving the whirling wheel thrusters 9020.

Figure 51:
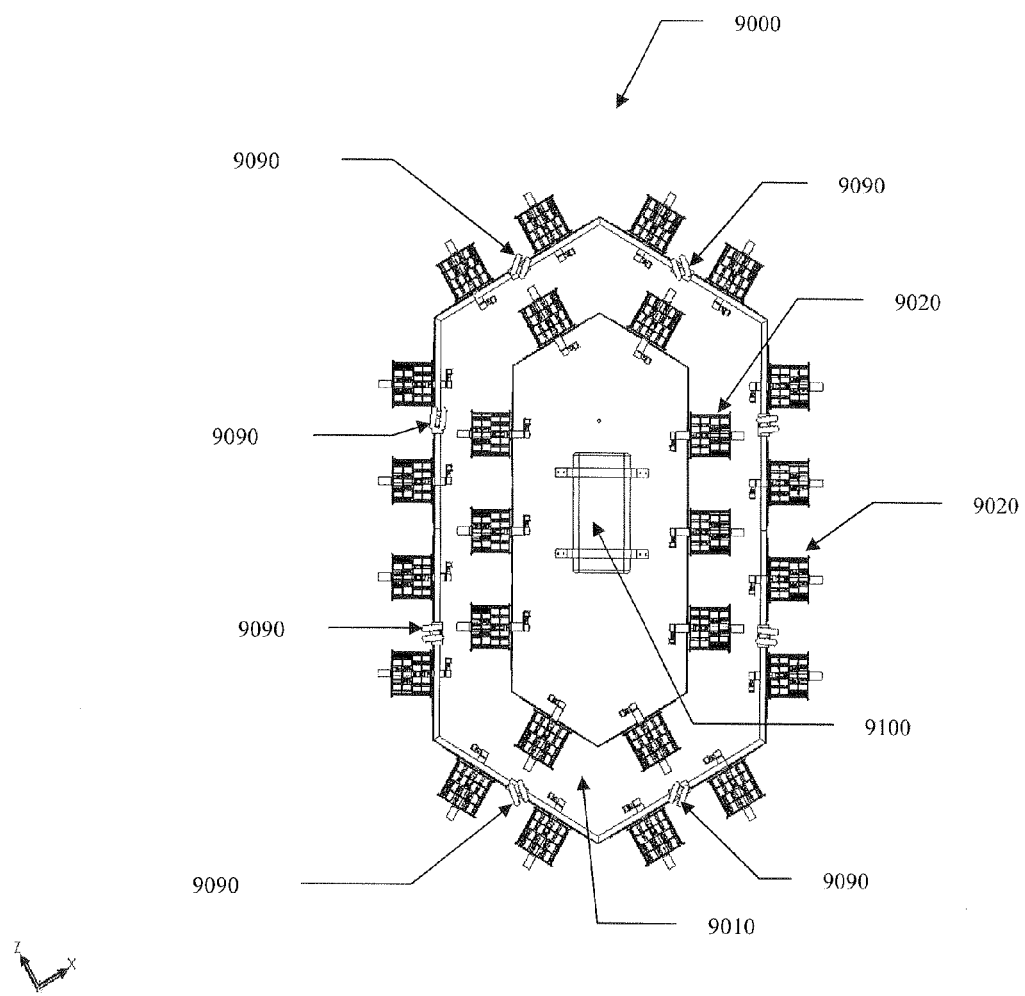
FIG. 51 is a perspective bottom view of the airborne polygonal flatbed carrier.

FIG. 51 shows the underside of the polygonal flatbed carrier 9000. A multiplicity of whirling wheel thrusters are attached to ribs on the underside of the flatbed in addition to those attached to the ribs on the sides of the flatbed 9010. The fuel tank 9100 is attached to the underside of the flatbed 9010. A number of tires 9090 are attached to the flatbed 9010 via trusses 9080 to form the landing gear.

Figure 52:
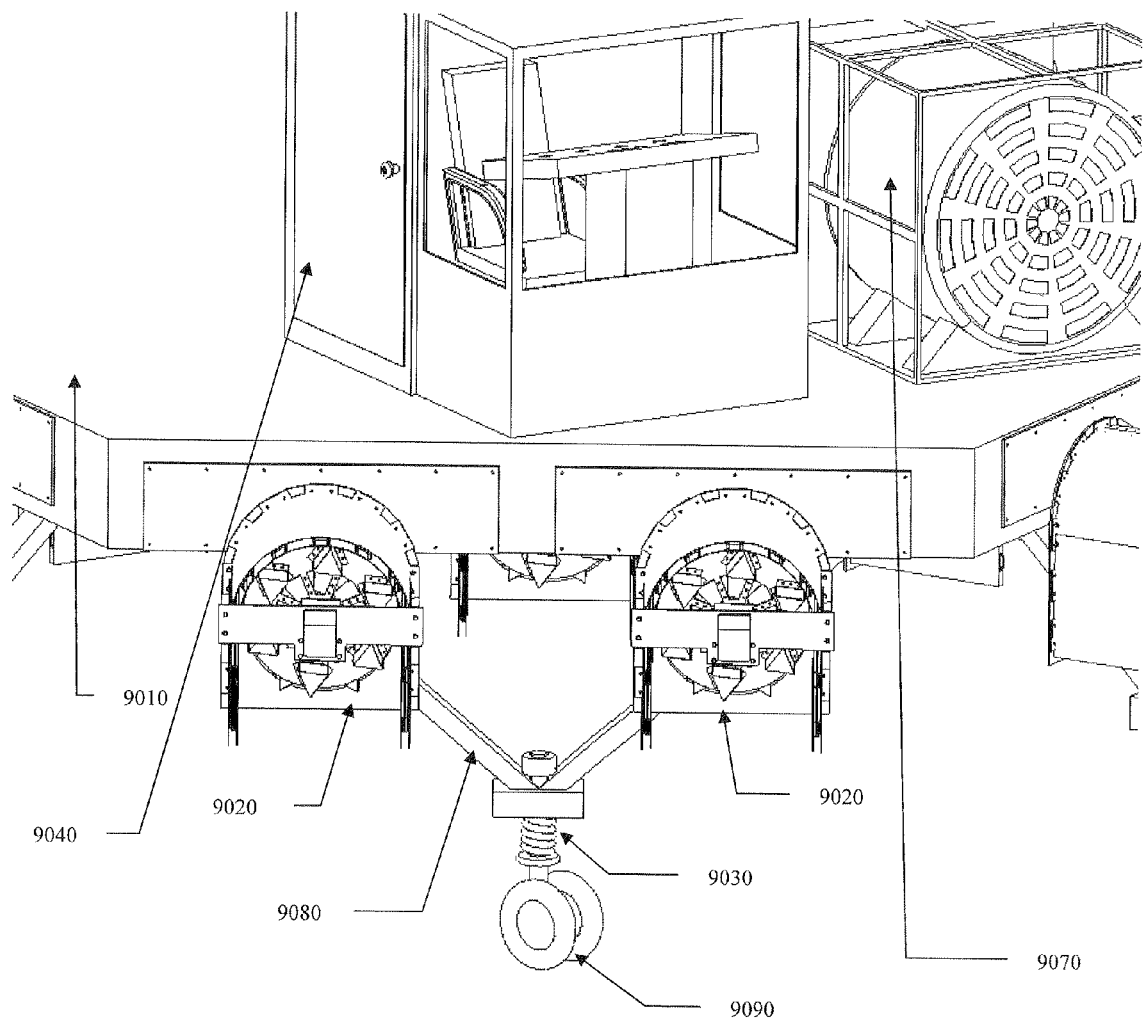
FIG. 52 is a perspective view of a landing gear of the polygonal flatbed carrier.

FIG. 52 shows more details of one leg of the landing gear consisting of tires 9090, spring 9030 and trusts 9080.

Figure 53:
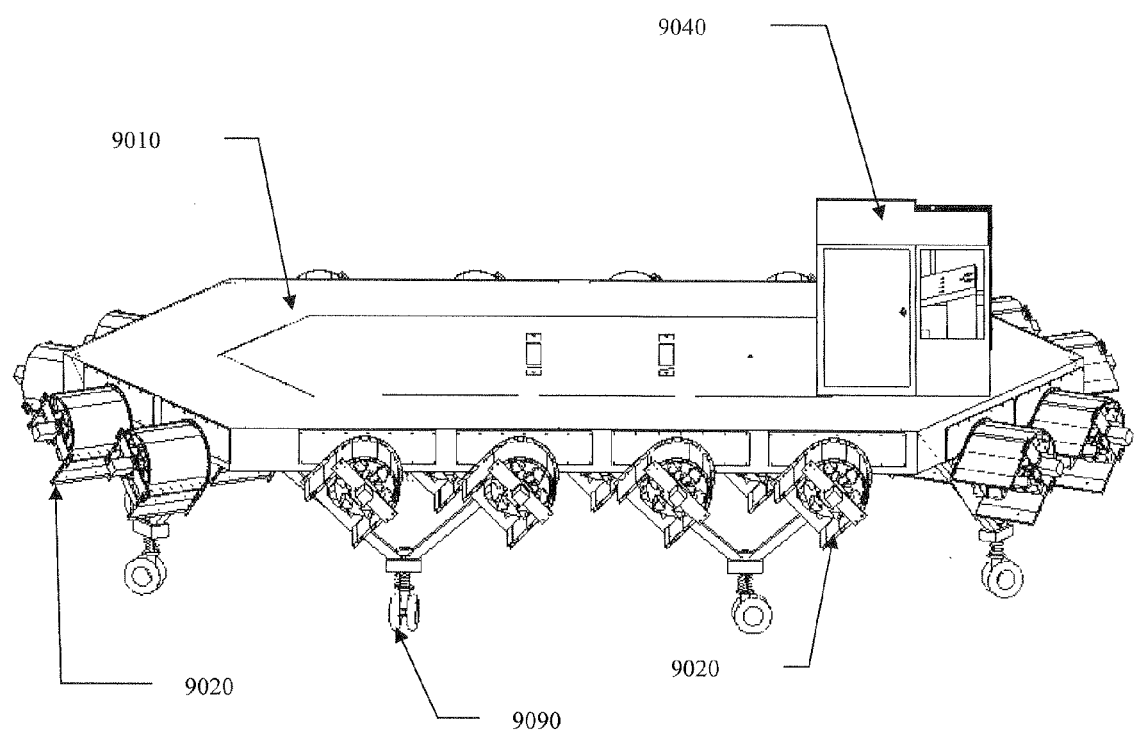
FIG. 53 is a perspective view showing tilt of whirling wheel thrusters for forward motion.

FIG. 53 shows the tilt of the whirling wheel thrusters for airborne forward motion. Similarly, reversing the tilts of the whirling wheel thrusters 9020 would brake any prior forward motion resulting first in stopping it and eventually in backward motion. Keeping the thrusters 9020 in the vertical position (as shown in FIG. 50) without any prior lateral motion would make the vehicle stop in mid air. Steering is accomplished by tilting any two sets of 'diametrically-opposite' thrusters in opposite directions.

8. Air Bike

Figure 54:
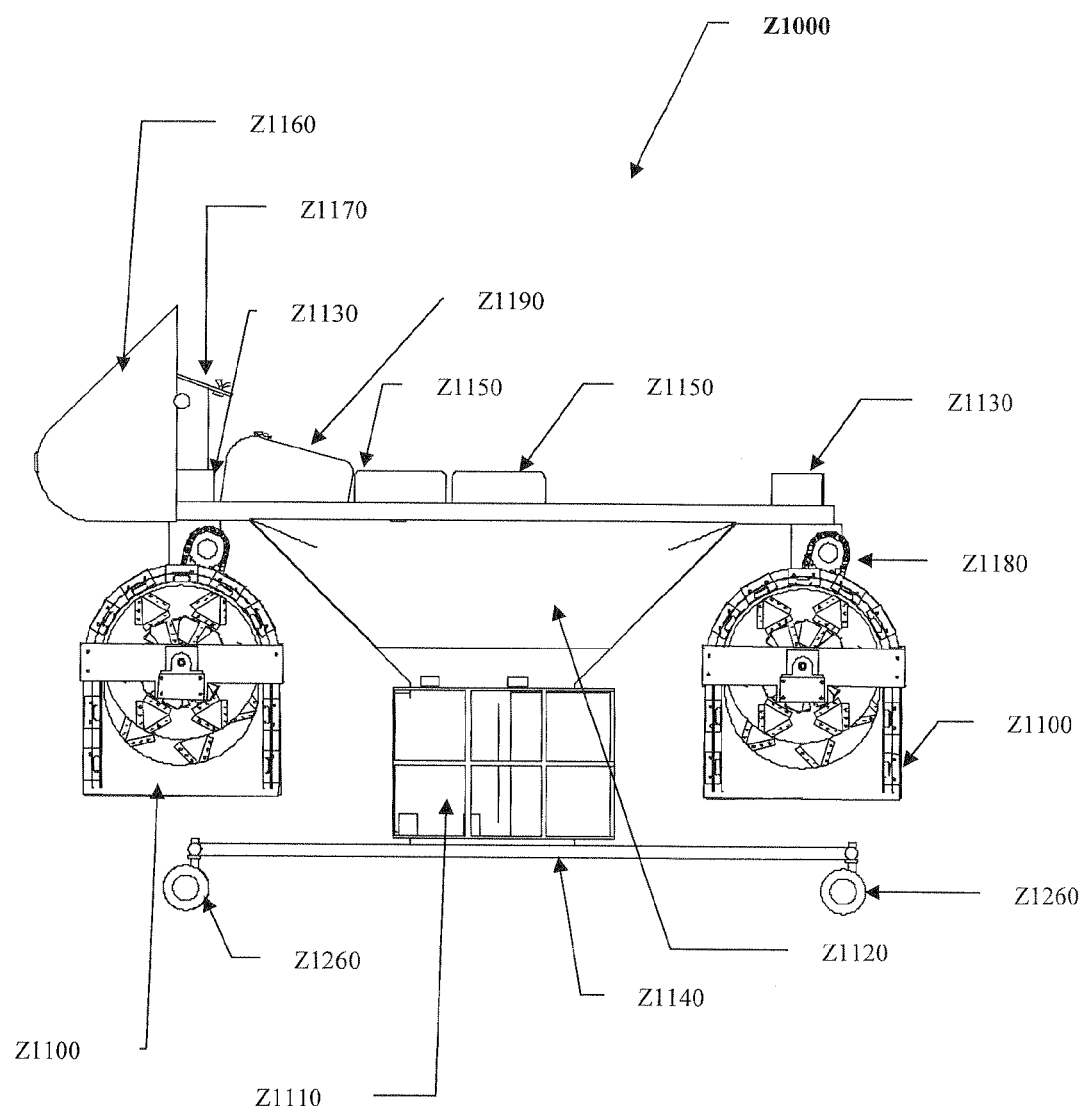
FIG. 54 is a perspective side view of air bike with whirling wheel thrusters in vertical position.

FIG. 54 is the side view of a vertical-take-off-and-landing air bike Z1000. The air bike Z1000 has an electric generator Z1110, which supplies power for operating the bike. There are also a minimum of four whirling wheel thrusters Z1100. FIG. 54 also shows the windshield Z1160, the control panel Z1170, the gas tank Z1190, the seats Z1150, and the control compartment Z1120 where the electrical, electronic and other controllers are located.

Figure 55:
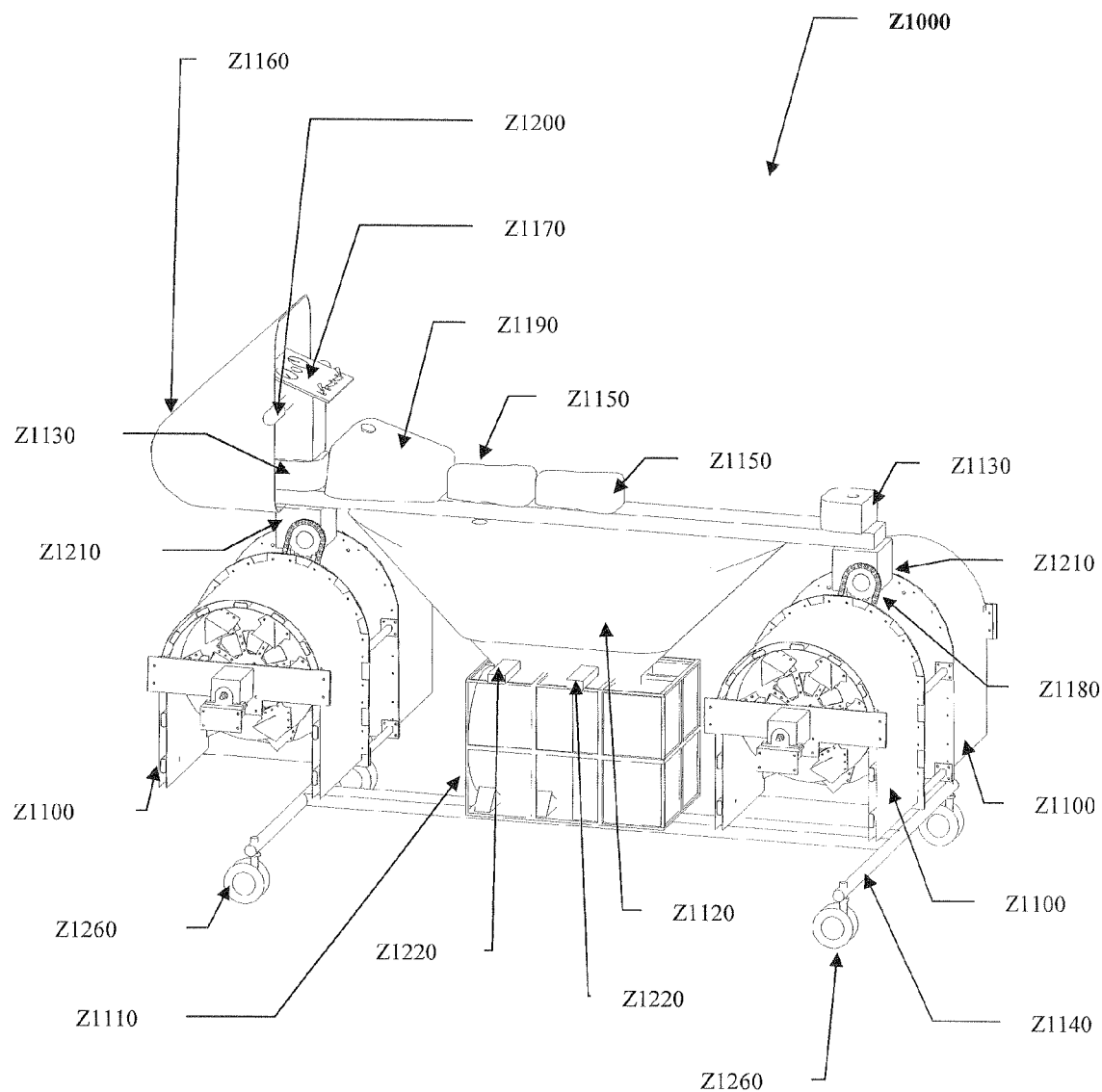
FIG. 55 is a perspective view of an air bike with whirling wheel thrusters in vertical position.
Figure 57:
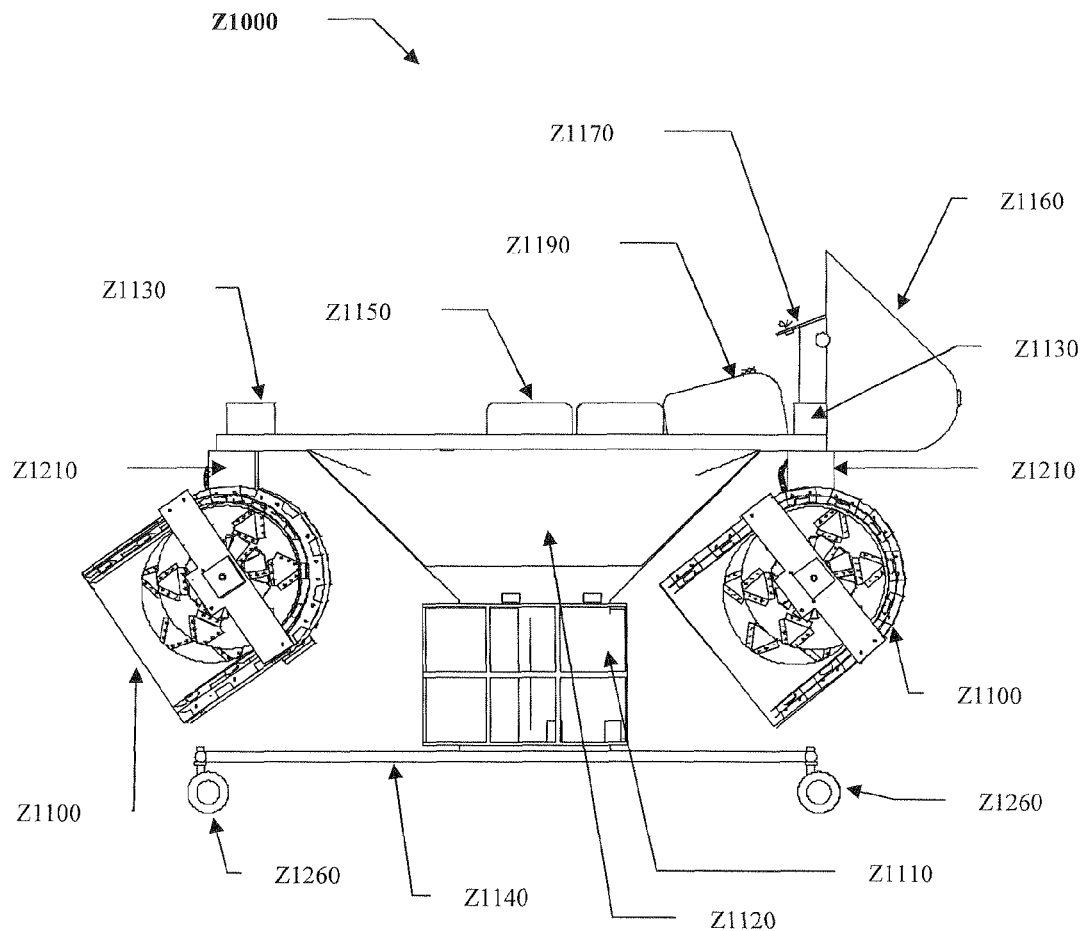
FIG. 57 is a perspective view of an air bike with whirling wheel thrusters positioned for forward and vertical motion.
Figure 57:
Figure 58:
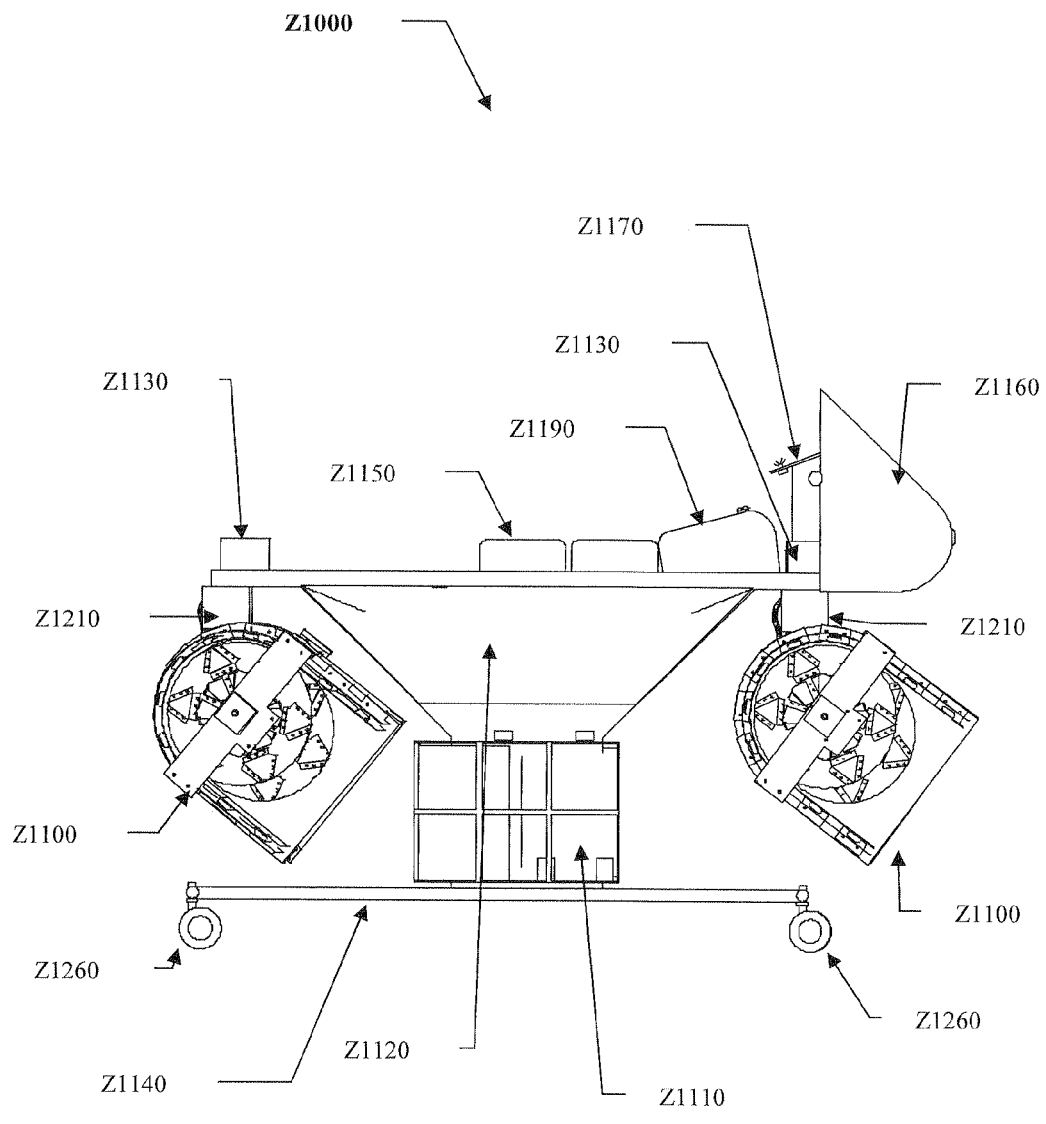
FIG. 58 is a perspective view of an air bike with whirling wheel thrusters positioned for backward and vertical motion in a temporary braking mode.

FIG. 55 more clearly shows other features like the handle bar Z1200, the front and rear power-assisted steering units Z1130, seats Z1150, landing platform Z1140, and chains Z1180 for tilting the whirling wheel thrusters Z1100 for forward or backward motion as shown in FIG. 57 and FIG. 58. The chain is driven by a rotary positioning servo Z1210. The power assisted steering units Z1130 are attached to the front and rear steering columns. The rear steering unit Z1130 is arranged to turn the rear whirling wheel arrangements Z1100 in the opposite direction of the front wheel arrangements Z1100.

Figure 56:
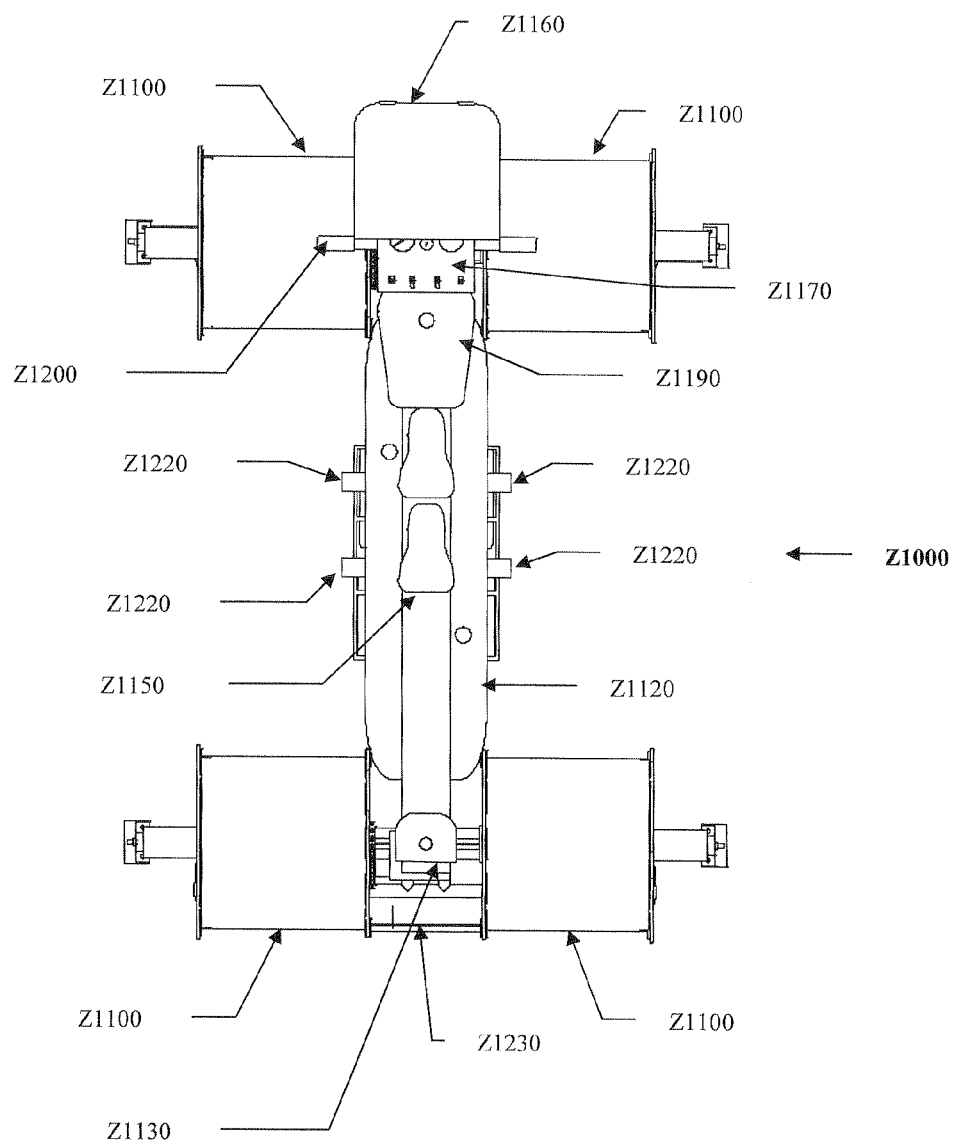
FIG. 56 is a perspective top view of air bike with whirling wheel thrusters in vertical position.

For ease of control and steering, the two front whirling wheel thrusters Z1100 are ganged with a multiplicity of connectors Z1230 (as shown in FIG. 56) and the rear whirling wheel thrusters Z1100 are similarly ganged. Tilting of the ganged thrusters is done differently from that of the other airborne vehicles. Chains Z1180 are used to tilt the ganged units instead of individual motors and gears.

FIG. 54 shows the positioning of the whirling wheel thrusters Z1100 for vertical take off or landing. Increasing the speed of rotation of the individual whirling wheels within each thruster arrangement Z1100 would result in a vertical thrust and takeoff. Decreasing the speed of rotation of individual whirling wheels in each thruster Z1100 would be for landing the bike as the weight of the bike would exceed the thrust produced at the lower speeds. Controllers govern the rate of descent to achieve gentle landing each time. Tires Z1260 attached to the landing platform Z1140 ease the moving of the air bike after landing.

FIG. 56 shows the top view of the air bike Z1000. The foot rests Z1220 for the riders are clearly shown in this figure.

FIG. 57 shows the tilting of the whirling wheel thrusters Z1100 for forward motion after liftoff. The angle of the tilt is such that the thrusters Z1100 produce both vertical and horizontal forces to keep the bike airborne and moving forward. The horizontal components of the force from all the thrusters Z1100 add to produce speed in the forward direction.

FIG. 58 shows the tilting of the thrusters Z1100 for braking action during a forward moving flight. This tilt produces thrust in the reverse direction to slow down the forward motion. After the bike Z1000 has achieved zero speed in the forward direction, the tilt will be changed to vertical in order to stop the bike Z1000 from going backwards but keep it airborne.

Figure 59:
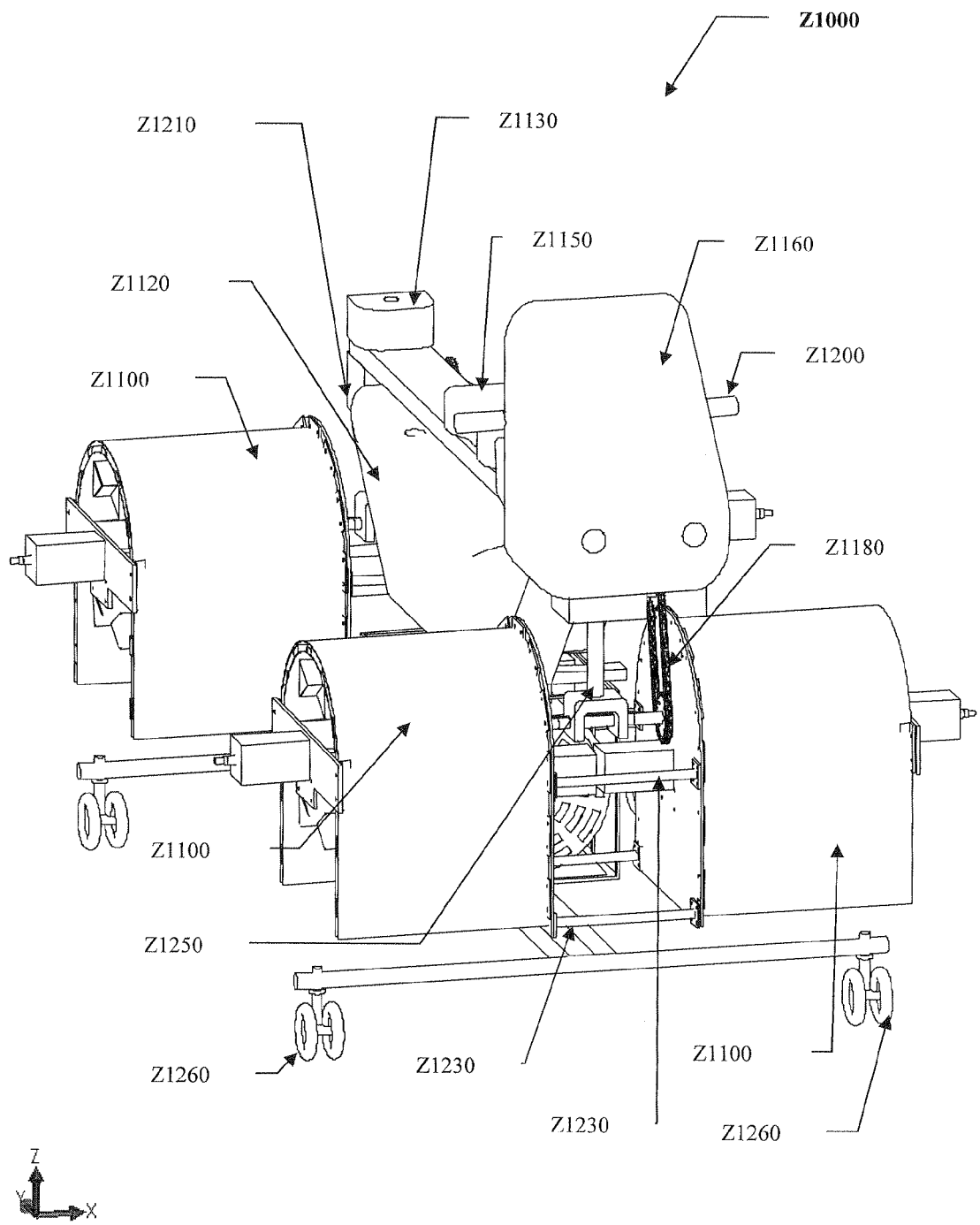
FIG. 59 is a perspective front view of an air bike.

FIG. 59 is a frontal view showing the steering column Z1250 which connects the whirling wheel thrusters Z1100 to the frame of the bike. Structural members Z1230 connect two opposite whirling wheel thrusters Z1100 to gang them. The figure also shows the chain Z1180 arrangement coming from the rotary positioning servo Z1130 to a sprocket attached to one of the thrusters Z1100. This chain arrangement Z1180 is used to tilt the thrusters to the desired position.

Figure 60:
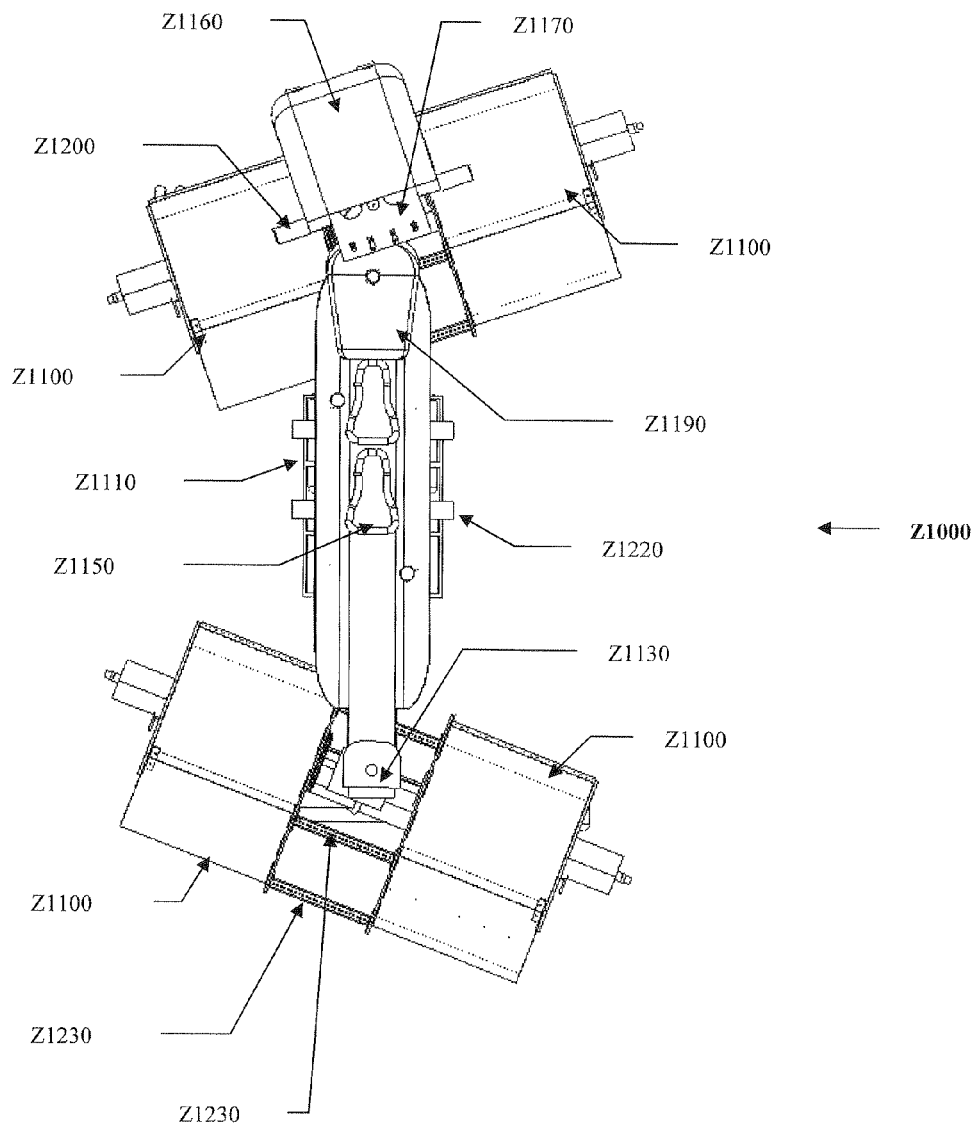
FIG. 60 is a perspective top view of a forward moving air bike making a left turn.
Figure 61:
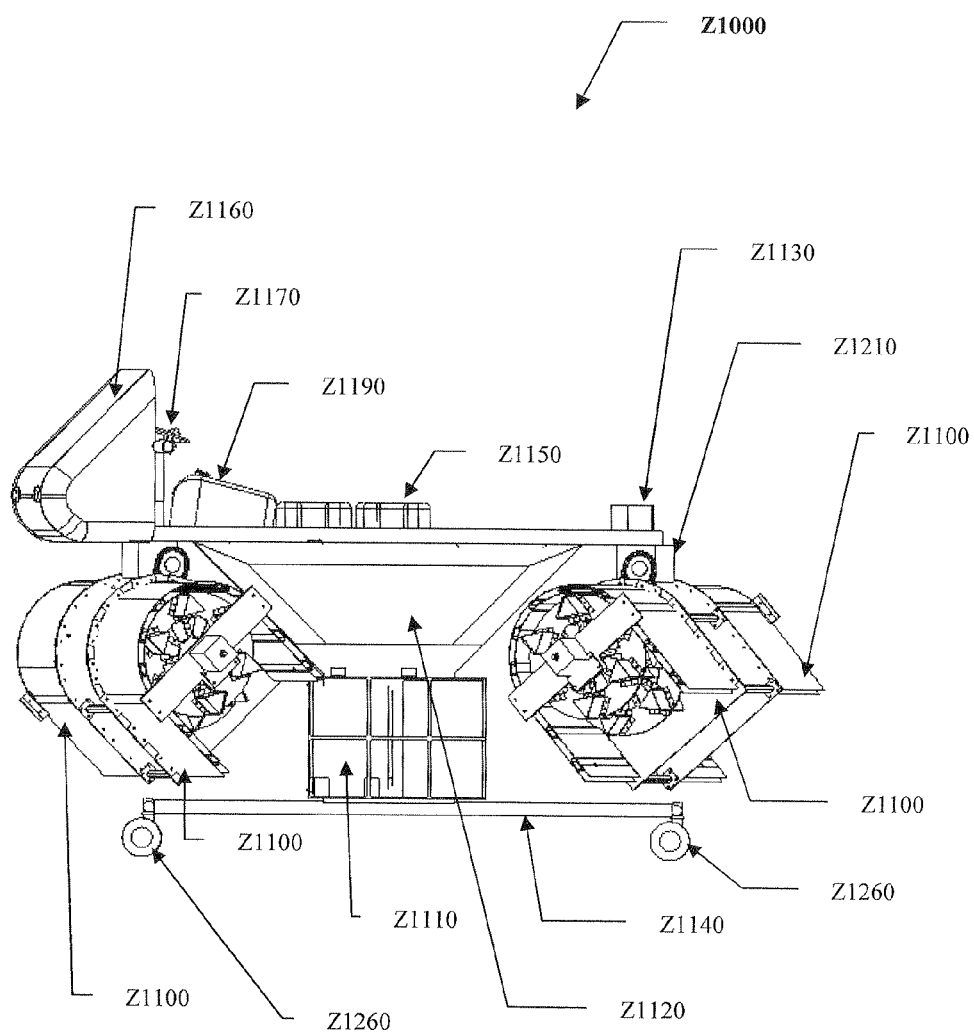
FIG. 61 is a perspective side view of a forward moving air bike making a left turn.
Figure 61:

FIG. 60 and FIG. 61 show the air bike Z1000 negotiating a left turn during a forward moving flight. The front whirling wheels Z1100 are steered into the turn. The rear whirling wheels Z1100 are steered out of the turn. Power assisted steering units Z1130 ease and accomplish steering both the front and back wheels. For a right turn, the wheels are turned in directions opposite to those shown in the figures.

9. Gondola-Type Air Vehicle

Figure 62:
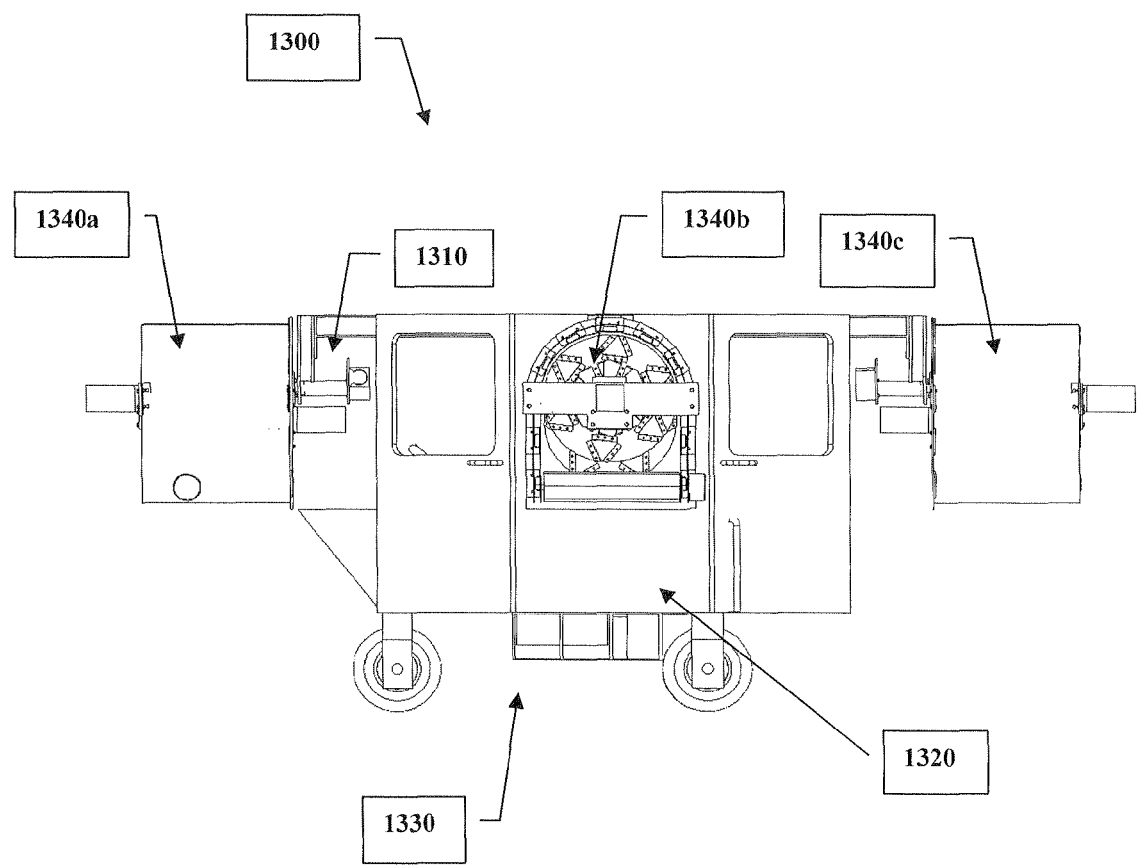
FIG. 62 is a perspective side view of a gondola type vehicle.

FIG. 62 shows the side view of a gondola-type air vehicle 1300 where the thrusters 1340a-c are attached to a framework 1310 and not to a fuselage. The fuselage 1320 separately hangs from the framework 1310. The generator 1330 is at the bottom of the fuselage.

Figure 63:
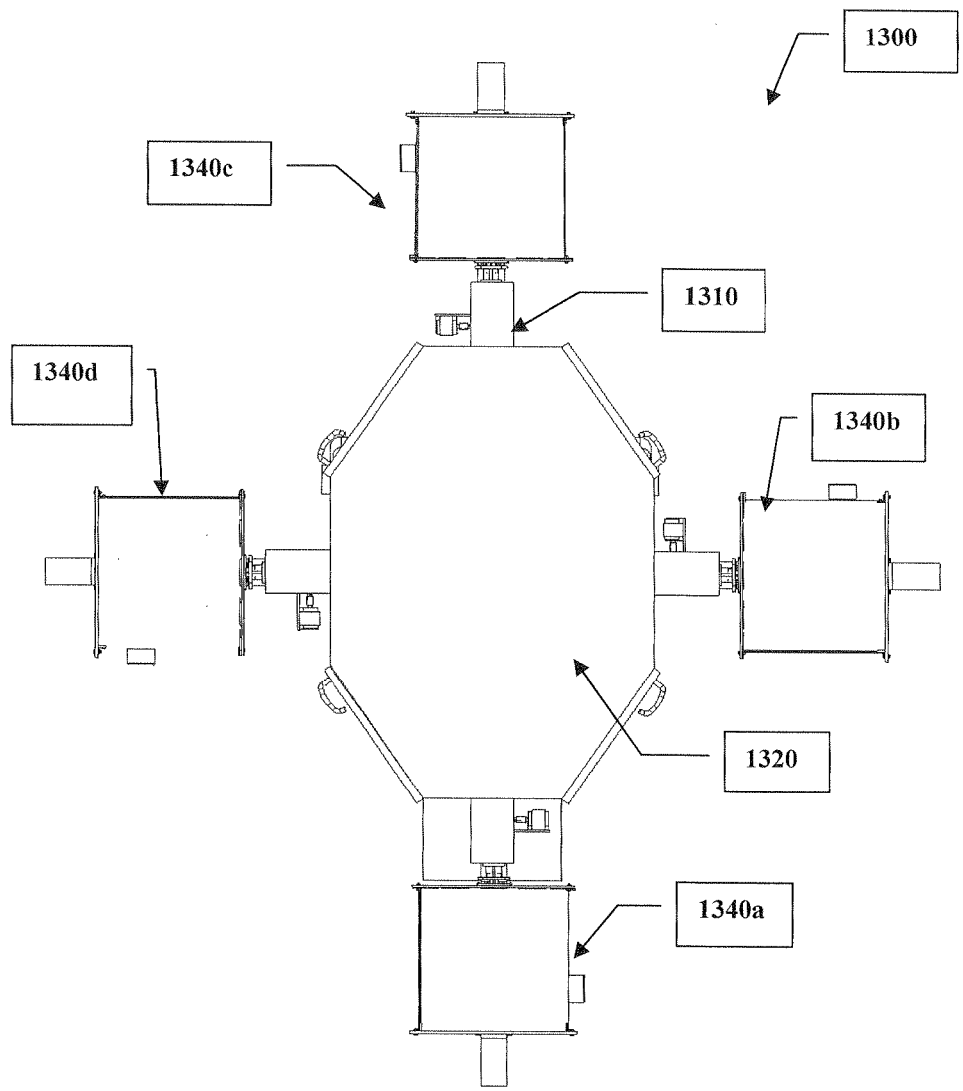
FIG. 63 is a perspective top view of a gondola type vehicle.

FIG. 63 is a top view of the gondola-type air vehicle 1300 showing the thrusters 1340a-d attached to ends of a cross-type support framework 1310 with the fuselage 1320 centered between the thrusters.

Figure 64:
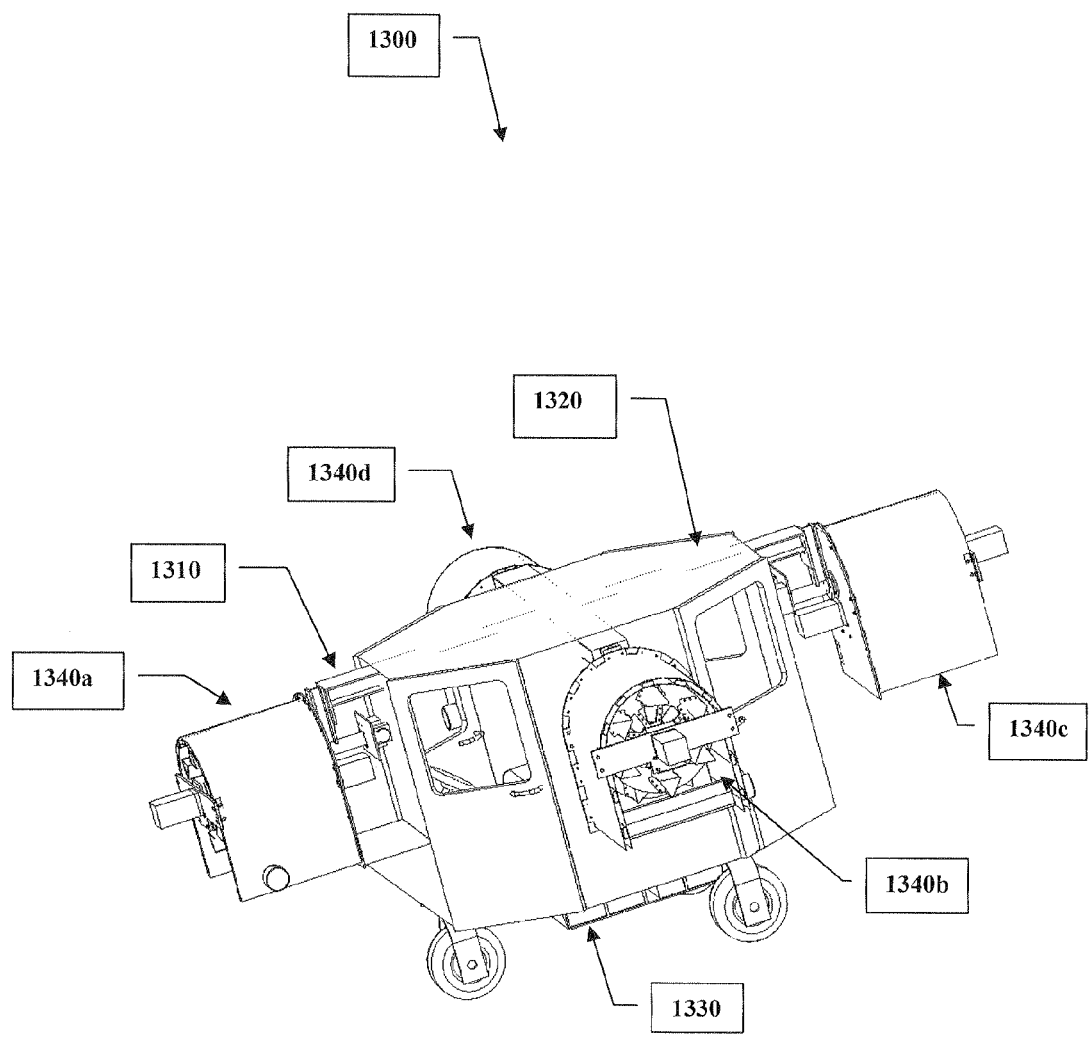
FIG. 64 is an isometric view of a gondola type vehicle.

FIG. 64 is a nearly isometric view of the gondola-type air vehicle.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A sliding-arm whirling wheel thruster for an airborne vehicle, comprising:
    a first whirling wheel about a first rotational axis;
    a second whirling wheel about a second rotational axis, wherein the second rotational axis is parallel to the first rotational axis; and
    a housing comprising an arc over an enclosed space into which the first and second whirling wheels fit,
    wherein air is blown outward by each of the whirling wheels and amassed inside the housing so as to make a pressure difference between the enclosed space and outside of the housing,
    wherein relative position of the first rotational axis is controlled to translate relative to the second rotational axis, and wherein the airborne vehicle is lifted by buoyant force caused by the pressure difference.

2. The sliding-arm whirling wheel thruster of claim 1, wherein each of the first and second whirling wheels comprises:
   a hub disposed along a corresponding rotational axis;
   a plurality of fan-like radial spokes, each of which extending from the hub;
   a flat rim portion provided around the plurality of fan-like radial spokes; and
   a plurality of vanes disposed on both sides of the flat rim portion and configured to push air radially outward.

3. The sliding-arm whirling wheel thruster of claim 2, wherein each of the fan-like radial spokes comprises a tilted surface to push air in a predetermined direction.

4. The sliding-arm whirling wheel thruster of claim 2, wherein each of the plurality of vanes comprises one or more radially tilted surface.

5. The sliding-arm whirling wheel thruster of claim 4, wherein each of the plurality of vanes comprises a flat triangular projection disposed on the flat rim portion.

6. The sliding-arm whirling wheel thruster of claim 4, wherein the housing comprises:
   a back plate;
   a cover, enclosing the enclosed space at a top portion and side portions along with the back plate at a rear portion, into which the first and second whirling wheels are fit;
   a front bar disposed in parallel to the back plate and installed at two arms extending from the cover;
   a first motor mounted on the front bar and configured to provide power to the first whirling wheel;
   a second motor mounted on the back plate and configured to provide power to the second whirling wheel;
   and a first repositioning slider disposed onto the front bar and configured to allow the first whirling wheel repositioned along a horizontal direction.

7. The sliding-arm whirling wheel thruster of claim 6, wherein the cover comprises a top arc-shaped portion and two side flat portions.

8. The sliding-arm whirling wheel thruster of claim 6, further comprising:
   a second repositioning slider disposed onto the rear bar and configured to allow the second whirling wheel repositioned along a horizontal direction; and
   a repositioning slot disposed on the back plate and configured to allow the second whirling wheel to be repositioned relative to the first whirling wheel,
   wherein the repositioning slot comprises a vertical slot and horizontal slot arranged so as to form a cross-shape.

9. The sliding-arm whirling wheel thruster of claim 6, further comprising:
   a first actuator disposed on the front bar and configured to actuate sliding motion of the first whirling wheel and the first motor along the first repositioning slider; and
   a second actuator disposed on the back plate and configured to actuate sliding motion of the second whirling wheel and the second motor along the repositioning slot.

10. The sliding-arm whirling wheel thruster of claim 6, wherein the first and second rotational axes of the first and second whirling wheels are displaced vertically and horizontally, with the second whirling wheel lower than the first whirling wheel so as to create the enclosed space that is enclosed by a top of the second whirling wheel, the second whirling wheel, the cover, and the first whirling wheel.

11. The sliding-arm whirling wheel thruster of claim 10, wherein, as the whirling wheels rotate, the plurality of fan-like spokes of the whirling wheels pull in air and compress against the second whirling wheel and the plurality of vanes deflect the air outwards so as to create a volume of compressed air under the cover, wherein the compressed air escapes from the volume along an inner wall of the housing, substantially from beneath an inner surface of the cover.

12. The sliding-arm whirling wheel thruster of claim 10, wherein the one or more radially tilted surfaces of the vanes are curved such that the deflected air increases pressure against the cover.

13. The sliding-arm whirling wheel thruster of claim 10, wherein the buoyant force is controlled by controlling the pressure difference through control parameters including angular speed of the whirling wheels, relative positions of the first and second rotational axes, and horizontal tilting the sliding-arm whirling wheel thruster.

14. The sliding-arm whirling wheel thruster of claim 13, wherein a net vertical force is obtained by aligning the first and second whirling wheels vertically without horizontal displacement between the first and second rotational axes.

15. The sliding-arm whirling wheel thruster of claim 13, wherein a horizontal force to a right side is obtained by sliding the first whirling wheel to the right and sliding the second whirling wheel to the left.

16. The sliding-arm whirling wheel thruster of claim 13, wherein a horizontal force to a left side is obtained by sliding the first whirling wheel to the left and sliding the second whirling wheel to the right.

17. The sliding-arm whirling wheel thruster of claim 13, wherein a horizontal force to a right side is obtained by aligning the first whirling wheel and the second whirling wheel vertically without a horizontal displacement of the first and second rotational axes against the housing and tilting the whole sliding-arm whirling wheel thruster to the right.

18. The sliding-arm whirling wheel thruster of claim 13, wherein a horizontal force to a left side is obtained by aligning the first whirling wheel and the second whirling wheel vertically without a horizontal displacement of the first and second rotational axes against the housing and tilting the whole sliding-arm whirling wheel thruster to the left.

19. The sliding-arm whirling wheel thruster of claim 13, further comprising:
   a mounting plate on which the back plate is mounted so as to allow the back plate to tilt sideways; and
   a vertical beam to which the mounting plate anchors so as to provide a given vertical direction against which the back plate tilts.

20. The sliding-arm whirling wheel thruster of claim 1, wherein the housing comprises:
   a back plate;
   a cover, enclosing an enclosed space at a top portion and side portions along with the back plate at a rear portion, into which the first and second whirling wheels are fit; and
   a steering vane disposed in a lower portion of the enclosed space below the first and second whirling wheels perpendicularly to the first and second rotational axes and configured to be tilted so as to produce an outward or inward component of force as the downward air blown from the whirling wheels impinges on a surface of the steering vane.

21. The whirling wheel airborne vehicle comprising:
   a fuselage; and
   a plurality of the sliding-arm whirling wheel thrusters according to claim 1, disposed on the fuselage or frame;
   wherein each of the plurality of the sliding-arm whirling wheel thrusters is configured to reposition the first and second whirling wheels and to be tilted sideways to obtain controlled buoyant force for flying the whirling wheel airborne vehicle.

* * * * *